(12) United States Patent
Ueki

(10) Patent No.: US 7,889,608 B2
(45) Date of Patent: Feb. 15, 2011

(54) INFORMATION-SIGNAL RECORDING AND REPRODUCING APPARATUS, RELATED METHOD, AND RELATED COMPUTER PROGRAM

(75) Inventor: Yasuhiro Ueki, Sagamihara (JP)

(73) Assignee: Victor Company of Japan, Ltd., Yokohama (JP)

( * ) Notice: Subject to any disclaimer, the term of this patent is extended or adjusted under 35 U.S.C. 154(b) by 2007 days.

(21) Appl. No.: 10/714,864

(22) Filed: Nov. 18, 2003

(65) Prior Publication Data

US 2004/0105351 A1    Jun. 3, 2004

(30) Foreign Application Priority Data

Nov. 29, 2002 (JP) ............................. 2002-347333
Jan. 30, 2003 (JP) ............................. 2003-021712

(51) Int. Cl.
*G11B 7/00* (2006.01)
(52) U.S. Cl. .................... 369/47.33; 369/47.34; 369/94
(58) Field of Classification Search ....................... None
See application file for complete search history.

(56) References Cited

U.S. PATENT DOCUMENTS

| | | | | |
|---|---|---|---|---|
| 5,640,382 A | * | 6/1997 | Florczak et al. | 369/275.1 |
| 6,178,147 B1 | * | 1/2001 | Fujinami | 369/47.16 |
| 6,219,311 B1 | | 4/2001 | Mitsuno | |
| 6,285,632 B1 | | 9/2001 | Ueki | |
| 6,295,409 B1 | | 9/2001 | Ikeda | |

FOREIGN PATENT DOCUMENTS

| | | |
|---|---|---|
| JP | 9-63190 | 3/1997 |
| JP | 9-69264 | 3/1997 |
| JP | 10-172241 | 6/1998 |
| JP | 10-208255 | 8/1998 |
| JP | 10-283640 | 10/1998 |
| JP | 11-16269 | 1/1999 |
| JP | 2001-167519 | 6/2001 |
| JP | 2001-283513 | 10/2001 |

* cited by examiner

*Primary Examiner*—Joseph Haley
(74) *Attorney, Agent, or Firm*—Louis Woo

(57) ABSTRACT

A recording medium includes a plurality of signal recording layers. A head reproduces two information signals from respective places in the recording medium on a time sharing basis. The reproduced signals are stored in a buffer memory before being outputted therefrom at first and second transfer rates respectively. The reproduced signals are transmitted from the head to the buffer memory on a time sharing basis and at a third transfer rate higher than the first and second transfer rates. Information amounts of the respective reproduced signals continuously transmitted from the head to the buffer memory are decided on the basis of a given relation among parameters including intra-layer seek times and inter-layer seek times related to the head, and the first, second, and third transfer rates.

3 Claims, 27 Drawing Sheets

FIG. 6

| A1 | A2 | A3 | A4 | A5 | A6 | A7 | A8 |
| A9 | A10 | A11 | A12 | A13 | A14 | A15 | A16 |

A17  A18

FIRST AREAS 13a

FIG. 7

| B1 | B2 | B3 | B4 | B5 | B6 | B7 | B8 |

B9  B10  B11

SECOND AREAS 13b

INFORMATION-SIGNAL RECORDING AND REPRODUCING APPARATUS, RELATED METHOD, AND RELATED COMPUTER PROGRAM

BACKGROUND OF THE INVENTION

1. Field of the Invention

This invention relates to a method, a computer program, and an apparatus for recording information signals on a recording medium having at least two signal recording layers. Also, this invention relates to a method, a computer program, and an apparatus for reproducing information signals from a recording medium having at least two signal recording layers. Furthermore, this invention relates to a method, a computer program, and an apparatus for recording and reproducing information signals on and from a recording medium having at least two signal recording layers.

2. Description of the Related Art

Optical-disc apparatuses include a DVD player, a DVD recorder, a combination of a DVD player and a DVD recorder, and a personal computer provided with a DVD drive and a software for recording and reproducing an information signal on and from a DVD via the DVD drive.

A typical optical-disc apparatus handles an information signal containing at least one of video information and audio information. The video information represents, for example, a movie. The audio information represents, for example, music.

The typical optical-disc apparatus operates as follows. During a recording mode of operation of the apparatus, an original information signal is compressed into a compression-resultant information signal. An optical pickup (an optical head) in the apparatus records the compression-resultant information signal on an optical disc. During a playback mode of operation of the apparatus, the optical pickup reproduces a recorded information signal from an optical disc. The reproduced information signal is expanded into an original information signal.

Japanese patent application publication numbers 2001-167519 and 2001-283513 which correspond to U.S. Pat. No. 6,285,632 B1 disclose an optical-disc apparatus able to handle a plurality of information signals including a first information signal and a second information signal.

The optical-disc apparatus in Japanese applications 2001-167519 and 2001-283513 operates as follows. During a plural-signal recording mode of operation of the apparatus, plural original information signals are compressed into plural compression-resultant information signals respectively. An optical pickup (an optical head) in the apparatus records the plural compression-resultant information signals on an optical disc on a time sharing basis. During a plural-signal playback mode of operation of the apparatus, the optical pickup reproduces plural recorded information signals from an optical disc on a time sharing basis. The plural reproduced information signals are expanded into plural original information signals respectively. During a signal recording/playback mode of operation of the apparatus, a first original information signal is compressed into a first compression-resultant information signal. The optical pickup records the first compression-resultant information signal on an optical disc and reproduces a second recorded information signal from the optical disc on a time sharing basis. The second reproduced information signal is expanded into a second original information signal.

The optical-disc apparatus in Japanese applications 2001-167519 and 2001-283513 includes a buffer memory provided between the optical pickup and an encoder/decoder for signal compression and expansion. The buffer memory has divided areas for temporarily storing the respective information signals transmitted between the optical pickup and the encoder/decoder. The bit rate of signal transfer to and from an optical disc differs from the bit rates of compression-resultant information signals outputted from the encoder/decoder and the bit rates of reproduced information signals to be inputted to the encoder/decoder. These bit rate differences are absorbed by the buffer memory. Each of the information signals transmitted between the optical disc and the buffer memory is divided into blocks having equal sizes (equal information amounts). The transmission of each of the information signals is on a block-by-block basis. For the simultaneous and continuous playback or recording of the information-signal contents, the sizes (the information amounts) of blocks of the respective information signals are decided on the basis of a given relation among parameters including seek times taken by the optical pickup to move among different optical-disc areas assigned to the respective information signals, and the above-indicated bit rates.

Basically, the optical-disc apparatus in Japanese applications 2001-167519 and 2001-283513 is designed to access different areas of one signal recording surface (one signal recording layer) of an optical disc during the plural-signal recording mode of operation, the plural-signal playback mode of operation, or the signal recording/playback mode of operation.

There is a large-capacity optical disc which has two different recording layers.

SUMMARY OF THE INVENTION

It is a first object of this invention to provide an improved method of recording information signals on a recording medium having at least two signal recording layers.

It is a second object of this invention to provide an improved computer program for recording information signals on a recording medium having at least two signal recording layers.

It is a third object of this invention to provide an improved apparatus for recording information signals on a recording medium having at least two signal recording layers.

It is a fourth object of this invention to provide an improved method of reproducing information signals from a recording medium having at least two signal recording layers.

It is a fifth object of this invention to provide an improved computer program for reproducing information signals from a recording medium having at least two signal recording layers.

It is a sixth object of this invention to provide an improved apparatus for reproducing information signals from a recording medium having at least two signal recording layers.

It is a seventh object of this invention to provide an improved method of recording and reproducing information signals on and from a recording medium having at least two signal recording layers.

It is an eighth object of this invention to provide an improved computer program for recording and reproducing information signals on and from a recording medium having at least two signal recording layers.

It is a ninth object of this invention to provide an improved apparatus for recording and reproducing information signals on and from a recording medium having at least two signal recording layers.

A first aspect of this invention provides a method of reproducing information from a recording medium having first and second places on which first and second information signals are recorded respectively. The recording medium includes at least first and second signal recording layers accessible from one side. The method comprises the steps of rotating the recording medium; enabling a head to reproduce the first and second information signals from the first and second places in the recording medium on a time sharing basis to get first and second reproduced signals respectively; temporarily storing the first and second reproduced signals in a buffer memory; outputting the first and second reproduced signals from the buffer memory at first and second transfer rates respectively; transmitting the first and second reproduced signals from the head to the buffer memory on a time sharing basis and at a third transfer rate higher than the first and second transfer rates; and deciding at least one of (1) an information amount of the first reproduced signal continuously transmitted from the head to the buffer memory and (2) an information amount of the second reproduced signal continuously transmitted from the head to the buffer memory on the basis of a given relation among parameters including (a) a time interval taken by the head to move from the first place to the second place as viewed on one of the first and second signal recording layers, (b) a time interval taken by the head to move from the second place to the first place as viewed on one of the first and second signal recording layers, (c) a time interval taken by the head to move its focus from the first signal recording layer to the second signal recording layer, (d) a time interval taken by the head to move its focus from the second signal recording layer to the first signal recording layer, (e) the first transfer rate, (f) the second transfer rate, and (g) the third transfer rate.

A second aspect of this invention provides a method of recording information on a recording medium including at least first and second signal recording layers accessible from one side. The method comprising the steps of rotating the recording medium; storing first and second information signals into a buffer memory at first and second transfer rates respectively; reading out the first and second information signals from the buffer memory on a time sharing basis to get first and second read-out signals respectively; enabling a head to record the first and second read-out signals on first and second places in the recording medium respectively on a time sharing basis and at a third transfer rate higher than the first and second transfer rates; and deciding at least one of (1) an information amount of the first read-out signal continuously transmitted from the buffer memory to the head and (2) an information amount of the second read-out signal continuously transmitted from the buffer memory to the head on the basis of a given relation among parameters including (a) a time interval taken by the head to move from the first place to the second place as viewed on one of the first and second signal recording layers, (b) a time interval taken by the head to move from the second place to the first place as viewed on one of the first and second signal recording layers, (c) a time interval taken by the head to move its focus from the first signal recording layer to the second signal recording layer, (d) a time interval taken by the head to move its focus from the second signal recording layer to the first signal recording layer, (e) the first transfer rate, (f) the second transfer rate, and (g) the third transfer rate.

A third aspect of this invention provides a method of recording and reproducing information on and from a recording medium having a first place on which a first information signal is recorded. The recording medium includes at least first and second signal recording layers accessible from one side. The method comprises the steps of rotating the recording medium; enabling a head to reproduce the first information signal from the first place in the recording medium to get a reproduced signal; temporarily storing the reproduced signal in a buffer memory; outputting the reproduced signal from the buffer memory at a first transfer rate; storing a second information signal into the buffer memory at a second transfer rate; transmitting the reproduced signal from the head to the buffer memory at a third transfer rate higher than the first and second transfer rates; reading out the second information signal from the buffer memory to get a read-out signal; enabling the head to record the read-out signal on a second place in the recording medium which differs from the first place at the third transfer rate and on a time sharing basis with respect to the reproduction of the first information signal from the first place; and deciding at least one of (1) an information amount of the reproduced signal continuously transmitted from the head to the buffer memory and (2) an information amount of the read-out signal continuously transmitted from the buffer memory to the head on the basis of a given relation among parameters including (a) a time interval taken by the head to move from the first place to the second place as viewed on one of the first and second signal recording layers, (b) a time interval taken by the head to move from the second place to the first place as viewed on one of the first and second signal recording layers, (c) a time interval taken by the head to move its focus from the first signal recording layer to the second signal recording layer, (d) a time interval taken by the head to move its focus from the second signal recording layer to the first signal recording layer, (e) the first transfer rate, (f) the second transfer rate, and (g) the third transfer rate.

BRIEF DESCRIPTION OF THE DRAWINGS

FIG. 6 is a diagram of first areas in an optical disc.

FIG. 7 is a diagram of second areas in the optical disc.

FIG. 23 is a diagram of sub-areas in a first area of an optical disc.

FIG. 24 is a diagram of sub-areas in a second area of the optical disc.

FIG. 25 is a diagram of sub-areas in an n-th area of the optical disc.

FIG. 26 is a diagram of sub-areas in a management area of the optical disc.

DETAILED DESCRIPTION OF THE INVENTION

First Embodiment

Figure 1:
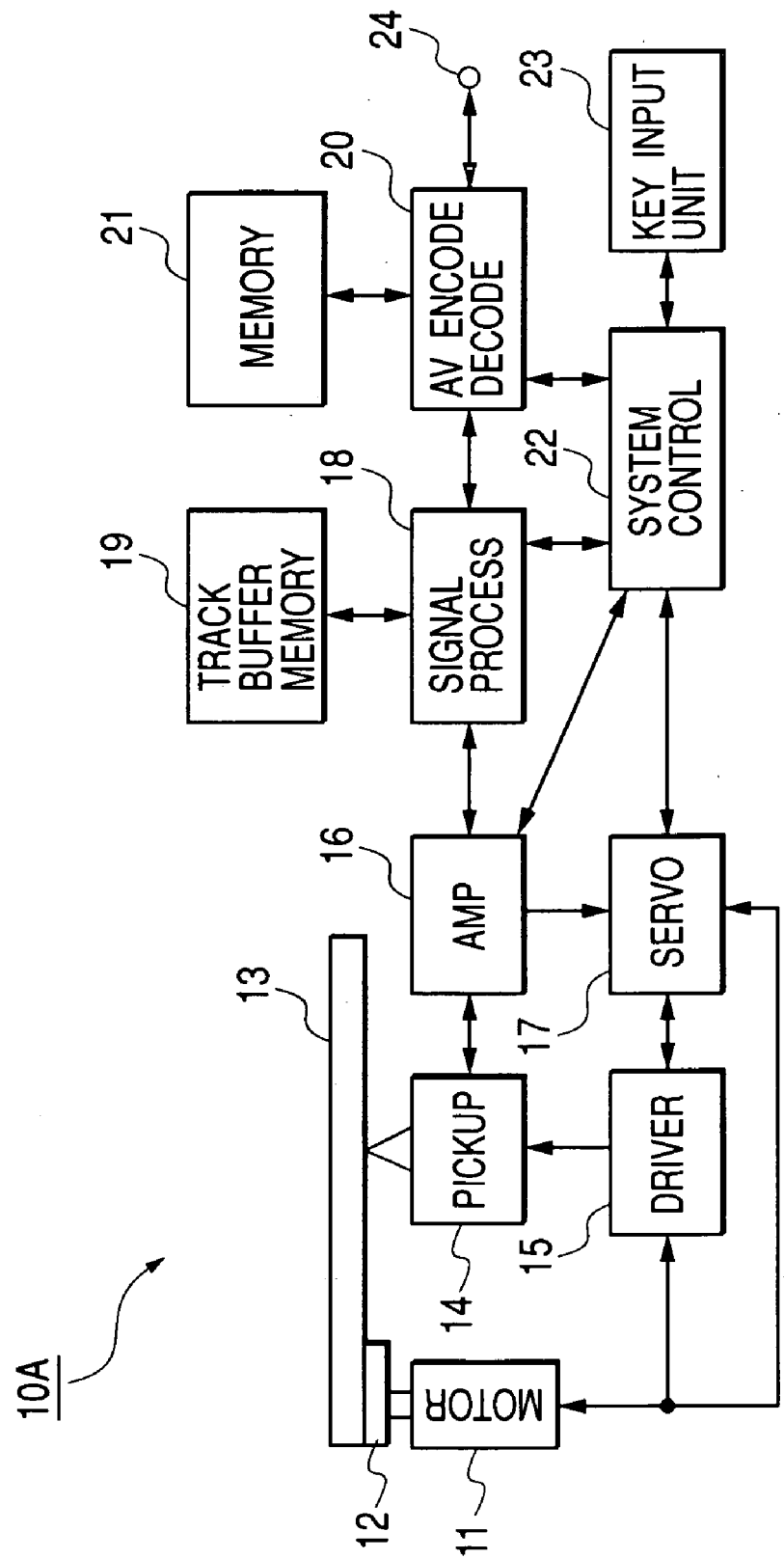
FIG. 1 is a block diagram of an information-signal recording and reproducing apparatus according to a first embodiment of this invention.

FIG. 1 shows an information-signal recording and reproducing apparatus 10A according to a first embodiment of this invention. The apparatus 10A operates on an information-signal recording medium including an optical disc having a plurality of signal recording layers. Examples of the optical disc are a DVD-ROM, a DVD-RAM, a DVD-RW, a DVD-R, a DVD+RW, a DVD+R, an HD-DVD (a high-definition DVD), and a blue-ray disc. Alternatively, the information-signal recording medium may include a magnetic disc having a plurality of signal recording layers. The apparatus 10A is, for example, an optical-disc recorder/player.

As shown in FIG. 1, the apparatus 10A includes a spindle motor 11, and a turntable 12 connected to the shaft of the spindle motor 11. An optical disc (an information-signal recording medium) 13 can be placed on the turntable 12. Preferably, the optical disc 13 is a DVD-RW having two signal recording layers which can be accessed from one side. The optical disc 13 is of either a type "1" or a type "2".

Figure 2:
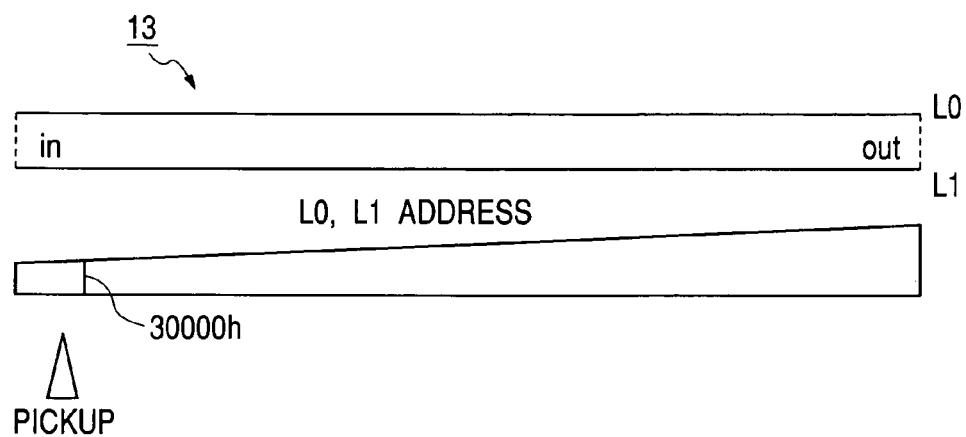
FIG. 2 is a diagram of signal recording layers in an optical disc of a first type in FIG. 1, and address changes in the signal recording layers.

As shown in FIG. 2, the optical disc 13 of the type "1" has signal recording layers L0 and L1 extending in parallel to each other. When the optical disc 13 of the type "1" is placed in position on the turntable 12, the signal recording layer L1 is closer to an optical pickup than the signal recording layer L0 is. The signal recording layer L1 is semitransparent. The signal recording layers L0 and L1 have spiral grooves which extend from the innermost disc position ("in") toward the outermost disc position ("out") as viewed in an address increasing direction. Each of the signal recording layers L0 and L1 has an information recording area with addresses starting and increasing from an address of 30000h. Thus, the signal recording layers L0 and L1 are in a parallel relation regarding address variation.

Figure 3:
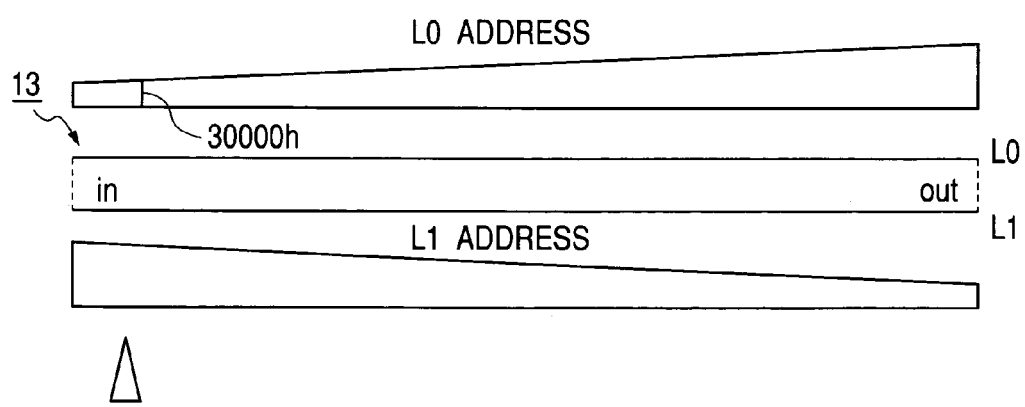
FIG. 3 is a diagram of signal recording layers in an optical disc of a second type in FIG. 1, and address changes in the signal recording layers.

As shown in FIG. 3, the optical disc 13 of the type "2" has signal recording layers L0 and L1 extending in parallel to each other. When the optical disc 13 of the type "2" is placed in position on the turntable 12, the signal recording layer L1 is closer to an optical pickup than the signal recording layer L0 is. The signal recording layer L1 is semitransparent. The signal recording layer L0 has a spiral groove which extends from the innermost disc position ("in") toward the outermost disc position ("out") as viewed in an address increasing direction. The signal recording layer L0 has an information recording area with addresses starting and increasing from an address of 30000h. The signal recording layer L1 has a spiral groove which extends from the outermost disc position ("out") toward the innermost disc position ("in") as viewed in an address increasing direction. The signal recording layer L1 has an information recording area with addresses starting and increasing from one immediately following the greatest address in the signal recording layer L0. Thus, the signal recording layers L0 and L1 are in an opposite relation regarding address variation. The addresses in the signal recording layer L1 may be expressed by numerical values using complements.

With reference back to FIG. 1, the apparatus 10A further includes an optical pickup (an optical head) 14, a driver 15, an amplifier unit 16, a servo unit 17, a signal processor 18, a track buffer memory 19, an audio-video encoding and decoding unit 20, a buffer memory 21, a system controller 22, a key input unit 23, and an input/output terminal 24.

When the optical disc 13 is placed on the turntable 12, the spindle motor 11 rotates the turntable 12 and the optical disc 13. In the case where the optical disc 13 is of a rewritable type, the optical pickup 14 writes and reads information thereon and therefrom. In the case where the optical disc 13 is of a read-only type, the optical pickup 14 only reads information therefrom. The spindle motor 11 is connected to the driver 15 and the servo unit 17. The optical pickup 14 is connected to the amplifier unit 16 and the driver 15. The amplifier unit 16 is connected to the servo unit 17 and the signal processor 18.

The driver 15 is connected to the servo unit 17. The signal processor 18 is connected to the track buffer memory 19 and the audio-video encoding and decoding unit 20. The audio-video encoding and decoding unit 20 is connected to the buffer memory 21 and the input/output terminal 24. The system controller 22 is connected to the amplifier unit 16, the servo unit 17, the signal processor 18, the audio-video encoding and decoding unit 20, and the key input unit 23.

The spindle motor 11 is driven and controlled by the driver 15. The spindle motor 11 rotates the turntable 12 and the optical disc 13. The spindle motor 11 is provided with an FG generator and a rotational position sensor (an angular position sensor). The rotational position sensor includes, for example, a Hall element. The FG generator outputs an FG signal (a rotational speed signal). The Hall element outputs a rotational position signal. The FG signal and the rotational position signal are fed back to the driver 15 and the servo unit 17 as rotation servo signals.

The optical pickup (the optical head) 14 faces the optical disc 13 placed on the turntable 12. A feed motor (not shown) moves the optical pickup 14 radially with respect to the optical disc 13. The feed motor is driven by the driver 15. The optical pickup 14 includes a semiconductor laser, a collimator lens, and an objective lens. The semiconductor laser acts as a source for emitting a laser beam. The emitted laser beam is focused into a laser spot on the optical disc 13 by the collimator lens and the objective lens. The optical pickup 14 includes an actuator for driving the objective lens to implement focusing and tracking of the laser spot with respect to the optical disc 13. The semiconductor laser is driven by a laser drive circuit in the optical pickup 14. In the case where an information signal such as an audio signal or a video signal is recorded, the information signal is subjected to waveform correction by a waveform correction circuit in the amplifier unit 16 before being fed to the laser drive circuit. The above-mentioned actuator in the optical pickup 14 is driven by the driver 15.

The key input unit 23 includes a plurality of keys which can be operated by a user. The key input unit 23 generates command signals in accordance with its operation by the user. The command signals are transmitted from the key input unit 23 to the system controller 22. The command signals include a command signal for starting a recording mode of operation of the apparatus 10A, and a command signal for starting a playback mode of operation of the apparatus 10A. The key input unit 23 generates control data in accordance with its operation by the user. The control data are transmitted from the key input unit 23 to the system controller 22.

The system controller 22 includes, for example, a microcomputer or a similar device which operates in accordance with a control program stored in its internal ROM. The system controller 22 controls the amplifier unit 16, the servo unit 17, the signal processor 18, and the audio-video encoding and decoding unit 20 in response to the command signals fed from the key input unit 23. The ROM within the system controller 22 is loaded with information representing seek times Tab, Tba, Fab, and Fba, and a predetermined constant transfer rate Rp which will be mentioned later.

Control data can be fed to the system controller 22 via an input terminal (not shown). The control data fed to the system controller 22 via the input terminal, and the control data fed to the system controller 22 from the key input unit 23 include a signal for adjusting the resolution of pictures represented by contents information to be recorded, a signal for separating quickly-moving scenes such as car racing scenes represented by contents information, and a signal for giving priority to a recording time. Preferably, the control data contain information about the rate of compression of each recorded information signal which determines the resolution of pictures represented by the compression-resultant information signal. The system controller 22 changes an actual recording time in accordance with the control data. The system controller 22 enables the setting of the actual recording time to be selected by the user.

When the apparatus 10A is requested to start operating in the playback mode, the key input unit 23 is actuated to generate the playback start command signal. The playback start command signal is transmitted from the key input unit 23 to the system controller 22. The system controller 22 controls the amplifier unit 16 and the servo unit 17 in response to the playback start command signal, thereby starting the playback mode of operation of the apparatus 10A. The control of the servo unit 17 includes steps of controlling the driver 15. Firstly, the system controller 22 starts rotation of the optical disc 13 and application of a laser spot thereon through the control of the driver 15. The optical pickup 14 is controlled by the driver 15, thereby reading out address information from the optical disc 13. For example, the address information is contained in management information stored in a management area of the optical disc 13. The read-out address information is transmitted from the optical pickup 14 to the system controller 22 via the amplifier unit 16. The system controller 22 finds or decides a target sector (a target track portion) to be played back by referring to the address information. The system controller 22 controls the optical pickup 14 via the servo unit 17, the driver 15, and the feed motor, thereby moving the optical pickup 14 radially with respect to the optical disc 13 and hence moving the laser spot to the target sector on the optical disc 13. When the movement of the laser spot to the target sector is completed, the system controller 22 operates to start the reproduction of a requested signal from the target sector on the optical disc 13. In this way, the playback mode of operation of the apparatus 10A is started. During the playback mode of operation, the target sector is repetitively changed from one to another.

During the playback mode of operation of the apparatus 10A, the optical pickup 14 scans the optical disc 13 and generates an RF signal containing information read out therefrom. A unit of generation of the RF signal corresponds to one error correction block (one ECC block) of the information recorded on the optical disc 13. The optical pickup 14 outputs the RF signal to the amplifier unit 16. The amplifier unit 16 enlarges the RF signal. In addition, the amplifier unit 16 generates a main reproduced signal, and tracking and focusing servo signals (tracking error and focusing error signals) from the enlarged RF signal. The amplifier unit 16 includes an equalizer for optimizing the frequency aspect of the main reproduced signal. Also, the amplifier unit 16 includes a PLL (phase locked loop) circuit for extracting a bit clock signal from the equalized main reproduced signal, and for generating a speed servo signal from the equalized main reproduced signal. Furthermore, the amplifier unit 16 includes a jitter generator for comparing the time bases of the bit clock signal and the equalized main reproduced signal, and for detecting jitter components from the results of the time-base comparison. A signal of the detected jitter components is transmitted from the amplifier unit 16 to the system controller 22. The tracking and focusing servo signals and the speed servo signal are transmitted from the amplifier unit 16 to the servo unit 17. The equalized main reproduced signal is transmitted from the amplifier unit 16 to the signal processor 18.

The servo unit 17 receives the speed servo signal and the tracking and focusing servo signals from the amplifier unit 16. The servo unit 17 receives the rotation servo signals from the spindle motor 11. In response to these servo signals, the servo unit 17 implements corresponding servo control processes.

Specifically, the servo unit 17 generates a rotation control signal on the basis of the speed servo signal and the rotation servo signals. The rotation control signal is transmitted from the servo unit 17 to the spindle motor 11 via the driver 15. The spindle motor 11 rotates at a speed depending on the rotation control signal. The rotation control signal is designed to rotate the optical disc 13 at a given constant linear velocity.

In addition, the servo unit 17 generates servo control signals on the basis of the focusing and tracking servo signals. The servo control signals are transmitted from the servo unit 17 to the actuator in the optical pickup 14 via the driver 15. The actuator in the optical pickup 14 controls the laser spot on the optical disc 13 in response to the servo control signals, and thereby implements the focusing and tracking of the laser spot with respect to the optical disc 13.

The optical pickup 14 can be subjected to focus jump control providing movement of the laser spot between the signal recording layers L0 and L1 of the optical disc 13. The focus jump control is as follows. When the on-disc position currently accessed by the optical pickup 14 is required to move between the signal recording layers L0 and L1 of the optical disc 13, the system controller 22 controls the servo unit 17 to generate a focusing control signal on the basis of the focusing error signal (the focusing servo signal). The focusing control signal is transmitted from the servo unit 17 to the actuator in the optical pickup 14 via the driver 15. The actuator in the optical pickup 14 adjusts the focusing of the laser spot with respect to the optical disc 13 in response to the focusing control signal, and thereby implements the required movement of the laser spot between the signal recording layers L0 and L1 of the optical disc 13 along a vertical direction.

During the playback mode of operation of the apparatus 10A, the signal processor 18 receives the main reproduced signal from the amplifier unit 16. The signal processor 18 is controlled by the system controller 22, thereby converting the main reproduced signal into a corresponding reproduced digital signal. The signal processor 18 detects a sync signal from the reproduced digital signal. The signal processor 18 decodes an EFM+ signal (an 8-16 modulation signal) of the reproduced digital signal into NRZI data, that is, non-return-to-zero-inverted data. The signal processor 18 subjects the NRZI data to an error correction process for every error correction block (every ECC block), thereby generating a sector address signal and first and second information signals. The sector address signal represents the address of a currently-accessed sector on the optical disc 13. The sync signal and the sector address signal are fed from the signal processor 18 to the system controller 22. It should be noted that the first and second information signals generated by the signal processor 18 correspond to first and second information signals resulting from compression at variable transfer rates (variable transmission rates) during a recording mode of operation.

During the playback mode of operation of the apparatus 10A, the signal processor 18 temporarily stores the first and second information signals in the track buffer memory 19 on a correction-block by correction-block basis. Thus, the signal processor 18 writes the first and second information signals into the track buffer memory 19, and reads the first and second information signals therefrom. Writing and reading the first and second information signals into and from the track buffer memory 19 are controlled to absorb a time-domain change in the transfer rates of the first and second information signals. The track buffer memory 19 includes, for example, a DRAM having a capacity of 64 MB. The signal processor 18 outputs the read-out signals (the first and second information signals read out from the track buffer memory 19) to the audio-video encoding and decoding unit 20.

In the case where the first and second information signals fed from the track buffer memory 19 via the signal processor 18 are compressed MPEG2 data in which audio data and video data are multiplexed, the audio-video encoding and decoding unit 20 separates the first and second information signals into compressed audio data and compressed video data. The audio-video encoding and decoding unit 20 expands and decodes the compressed audio data into non-compressed audio data. In addition, the audio-video encoding and decoding unit 20 expands and decodes the compressed video data into non-compressed video data. During the expansively decoding process, the audio-video encoding and decoding unit 20 temporarily stores signals and data in the buffer memory 21. The buffer memory 21 includes, for example, a DRAM having a capacity of 64 MB. The audio-video encoding and decoding unit 20 converts the non-compressed audio data into a corresponding analog audio signal through digital-to-analog conversion. Also, the audio-video encoding and decoding unit 20 converts the non-compressed video data into a corresponding analog video signal through digital-to-analog conversion. It should be noted that the conversion of the non-compressed audio and video data into the analog audio and video signals may be implemented by digital-to-analog converters provided externally of the audio-video encoding and decoding unit 20. The audio-video encoding and decoding unit 20 applies the analog audio signal and the analog video signal to the input/output terminal 24. The analog audio signal and the analog video signal are transmitted to an external via the input/output terminal 24.

The data rate of the expansively decoding process by the audio-video encoding and decoding unit 20, that is, the data transfer rate (the data transmission rate) in the expansively decoding process, is equalized to an expansion data rate which is set in accordance with the type of the related recording mode of operation of the apparatus 10A. Specifically, the audio-video encoding and decoding unit 20 can implement the expansively decoding process at an expansion data rate which can be changed among plural different expansion data rates. The audio-video encoding and decoding unit 20 selects one from the plural different expansion data rates as a desired expansion data rate in accordance with the type of the related recording mode of operation of the apparatus 10A. The audio-video encoding and decoding unit 20 executes the expansively encoding process at the desired expansion data rate. Information of the type of the recording mode of operation of the apparatus 10A which includes information about a recording compression rate or rates is recorded on the optical disc 13 as control data. During an initial stage of the playback of the optical disc 13, the control data are read out therefrom before being transmitted to the system controller 22. The system controller 22 sets the expansion data rate in the audio-video encoding and decoding unit 20 in accordance with the control data.

When the apparatus 10A is requested to start operating in the recording mode, the key input unit 23 is actuated to generate the recording start command signal. The recording start command signal is transmitted from the key input unit 23 to the system controller 22. The system controller 22 controls the amplifier unit 16 and the servo unit 17 in response to the recording start command signal, thereby starting the recording mode of operation of the apparatus 10A. The control of the servo unit 17 includes steps of controlling the driver 15. Firstly, the system controller 22 starts rotation of the optical disc 13 and application of a laser spot thereto through the control of the driver 15. The optical pickup 14 is controlled by the driver 15, thereby reading out address information from the optical disc 13. For example, the address information is contained in the management information stored in the management area of the optical disc 13. The read-out address information is transmitted from the optical pickup 14 to the system controller 22 via the amplifier unit 16. The system controller 22 finds or decides a target sector (a target track position), on which a signal is to be recorded, by referring to the address information. The system controller 22 controls the optical pickup 14 via the servo unit 17, the driver 15, and the feed motor, thereby moving the optical pickup 14 radially with respect to the optical disc 13 and hence moving the laser spot to the target sector on the optical disc 13. During the recording mode of operation of the apparatus 10A, the target sector is repetitively changed from one to another.

During the recording mode of operation of the apparatus 10A, an audio signal and a video signal to be recorded are fed via the input/output terminal 24 to the audio-video encoding and decoding unit 20. The audio-video encoding and decoding unit 20 converts the audio signal into corresponding digital audio data through analog-to-digital conversion. In addition, the audio-video encoding and decoding unit 20 converts the video signal into corresponding digital video data through analog-to-digital conversion. It should be noted that the conversion of the audio and video signals into the digital audio and video data may be implemented by analog-to-digital converters provided externally of the audio-video encoding and decoding unit 20. The audio-video encoding and decoding unit 20 compressively encodes the audio data and the video data into MPEG2 audio data and MPEG2 video data at a rate depending on the type of the recording mode. The audio-video encoding and decoding unit 20 multiplexes the MPEG2 audio data and the MPEG2 video data to form multiplexed MPEG2 data. The audio-video encoding and decoding unit 20 outputs the multiplexed MPEG2 data to the signal processor 18. The data rate of the compressively encoding process by the audio-video encoding and decoding unit 20, that is, the data transfer rate (the data transmission rate) in the compressively encoding process, is equalized to a compression data rate which is selected from plural different rates in accordance with the type of the recording mode of operation of the apparatus 10A. During the compressively encoding process, the audio-video encoding and decoding unit 20 temporarily stores data in the buffer memory 21.

It should be noted that the multiplexed MPEG2 data may be replaced by still-picture data or computer data such as program file data. In this case, the still-picture data or the computer data are transmitted to the system controller 22 via an interface (not shown). The system controller 22 transfers the still-picture data or the computer data to the signal processor 18.

During the recording mode of operation of the apparatus 10A, the signal processor 18 adds error correction code signals (ECC signals) to the multiplexed MPEG2 data, the still-picture data, or the computer data. The signal processor 18 subjects the ECC-added data to NRZI and EFM+ encoding processes. The signal processor 18 adds a sync signal to the encoding-resultant data to form sync-added data. The sync signal is fed from the system controller 22. The sync-added data are temporarily stored in the track buffer memory 19. The sync-added data are read out from the track buffer memory 19 at a data rate corresponding to a data rate of signal recording on the optical disc 13. The signal processor 18 subjects the read-out data to given modulation for record. The signal processor 18 outputs the modulation-resultant signal to the amplifier unit 16. The amplifier unit 16 corrects the waveform of the output signal of the signal processor 18. The amplifier unit 16 outputs the waveform-correction-resultant signal to the laser drive circuit in the optical pickup 14. The optical pickup 14 records the output signal of the amplifier unit 16 on the target sector (the target track position) on the optical disc 13.

As previously mentioned, during the playback mode of operation of the apparatus 10A, the amplifier unit 16 informs the system controller 22 of detected jitter components. The system controller 22 subjects the detected jitter components to analog-to-digital conversion to generate a measured jitter value. During the recording mode of operation of the apparatus 10A, the system controller 22 adjusts the degree or characteristic of the waveform correction by the amplifier unit 16 in response to the measured jitter value and an asymmetry value.

Operation of the apparatus 10A can be changed among various modes. During a first mode of operation which corresponds to the previously-mentioned playback mode of operation, the apparatus 10A reproduces an audio signal (audio signals) or an audio-video signal (audio-video signals) from the optical disc 13. During a second mode of operation which corresponds to the previously-mentioned recording mode of operation, the apparatus 10A records an audio signal (audio signals) or an audio-video signal (audio-video signals) on the optical disc 13. During a third mode of operation, the apparatus 10A records an audio signal or an audio-video signal on a first area of the optical disc 13 while reproducing another audio signal or another audio-video signal from a second area of the optical disc 13 which is separate from the first area thereof. During a fourth mode of operation, the apparatus 10A reproduces an audio signal or an audio-video signal from a first area of the optical disc 13 while reproducing another audio signal or another audio-video signal from a second area of the optical disc 13 which is separate from the first area thereof. During a fifth mode of operation, the apparatus 10A records an audio signal or an audio-video signal on a first area of the optical disc 13 while recording another audio signal or another audio-video signal on a second area of the optical disc 13 which is separate from the first area thereof. These various modes of operation of the apparatus 10A meet user's requests for the implementation of a picture-in-picture process, a two-signal simultaneous playback process, a time-shift playback process, an after-recording process, and a different-channel-program recording process.

The apparatus 10A can record first and second information signals on different areas of the optical disc 13, respectively, on a time sharing basis. The apparatus 10A can record only one of the first and second information signals on the optical disc 13. The apparatus 10A can reproduce first and second information signals from different areas of the optical disc 13, respectively, on a time sharing basis. The apparatus 10A can reproduce only one of the first and second information signals from the optical disc 13. Preferably, the first and second information signals are first and second audio-video information signals. For example, the first and second audio-video information signals represent different movies respectively. Alternatively, the first and second information signals may be first and second audio information signals. For example, the first and second audio information signals represent different musical compositions respectively.

Figure 4:
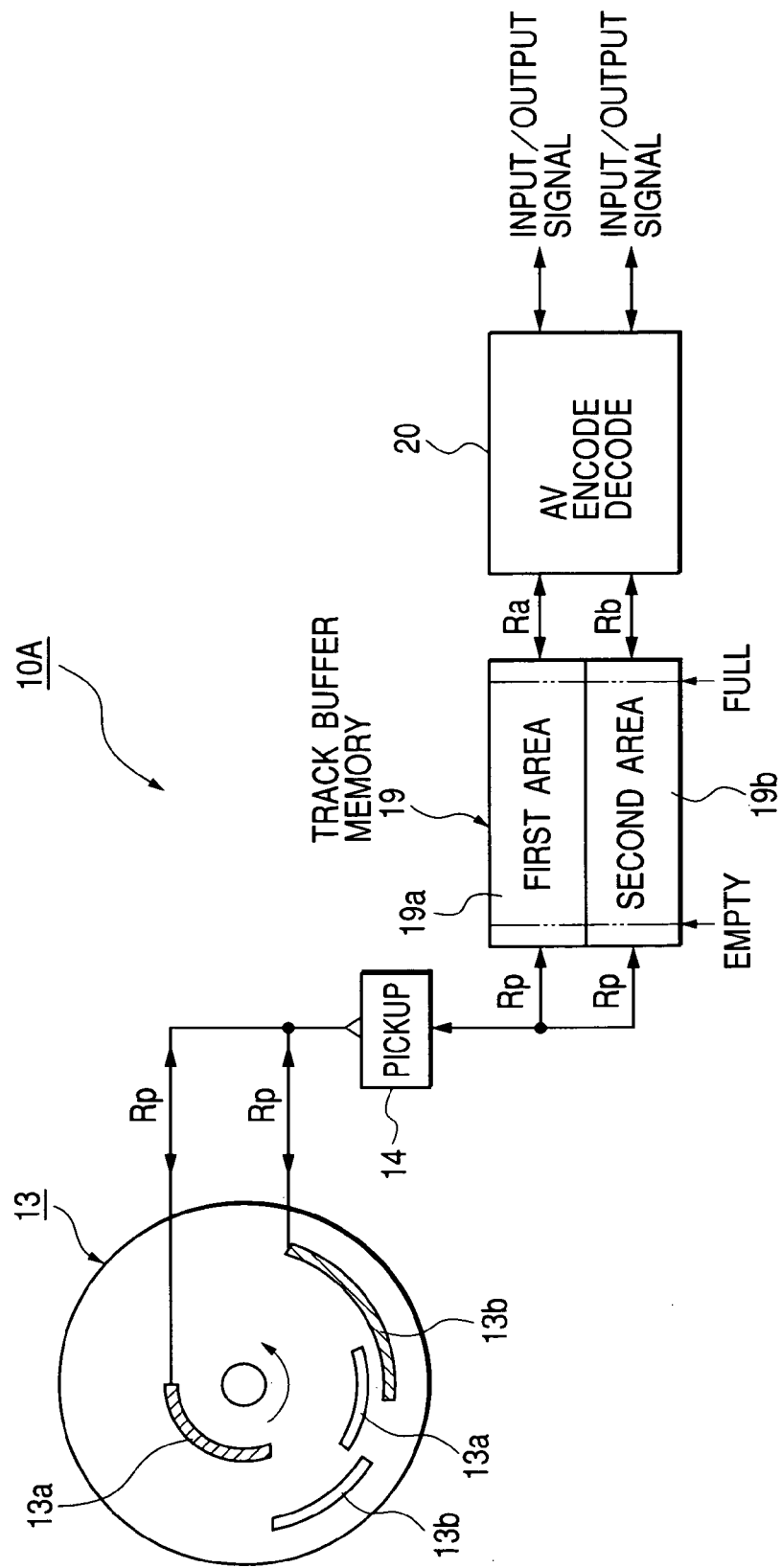
FIG. 4 is a diagram of a portion of the apparatus in FIG. 1.

FIG. 4 shows a portion of the apparatus 10A. The amplifier unit 16 and the signal processor 18 (see FIG. 1) are omitted from FIG. 4 for a better understanding. As shown in FIG. 4, the optical disc 13 has first areas 13a assigned to a first information signal "A", and second areas 13b assigned to a second information signal "B". The first areas 13a have equal sizes, and are separate from each other. The second areas 13b have equal sizes, and are separate from each other. The second areas 13b are separate from the first areas 13a. The first information signal "A" is divided into blocks each having a predetermined size (a predetermined total number of bits) Ya. The predetermined size Ya is a unit (a unit capacity) for continuous reproduction (or continuous recording) of information contents. The predetermined size Ya is also referred to as the unit information amount Ya or the minimum information amount Ya. The first areas 13a are allocated to the blocks of the first information signal "A", respectively. The second information signal "B" is divided into blocks each having a predetermined size (a predetermined total number of bits) Yb equal to or different from the predetermined size Ya. The predetermined size Yb is a unit (a unit capacity) for continuous reproduction (or continuous recording) of information contents. The predetermined size Yb is also referred to as the unit information amount Yb or the minimum information amount Yb. The second areas 13b are allocated to the blocks of the second information signal "B", respectively. The first information signal "A" and the second information signal "B" are related or unrelated to each other. Each of the first and second information signals "A" and "B" has audio data, video data, audio-video data, or computer data.

According to a first example, the first areas 13a and the second areas 13b extend on the signal recording layer L0 in the optical disc 13. According to a second example, the first areas 13a and the second areas 13b extend on the signal recording layer L1 in the optical disc 13. According to a third example, the first areas 13a extend on the signal recording layer L0 in the optical disc 13 while the second areas 13b extend on the signal recording layer L1 therein. According to a fourth example, the first areas 13a extend on the signal recording layer L1 in the optical disc 13 while the second areas 13b extend on the signal recording layer L0 therein.

Preferably, a predetermined portion of the optical disc 13 has a management area for storing address information of the blocks of the first information signal "A" on the optical-disc first areas 13a, address information of the blocks of the second information signal "B" on the optical-disc second areas 13b, and information about unoccupied areas in the optical disc 13 which can be used for the recording of a new information signal. For example, the management area extends in an innermost portion of the optical disc 13.

The track buffer memory 19 has a first area 19a assigned to the first information signal "A", and a second area 19b assigned to the second information signal "B".

With reference to FIG. 4, the optical pickup 14 transfers the first information signal "A" and the second information signal "B" between the optical disc 13 and the track buffer memory 19 on a time sharing basis and at a predetermined constant transfer rate Rp. The predetermined constant transfer rate Rp is equal to, for example, 25 Mbps.

The first information signal "A" is transferred between the track buffer memory 19 and the audio-video encoding and decoding unit 20 at a transfer rate Ra selected from predetermined values. All the predetermined values are lower than the predetermined constant transfer rate Rp related to the optical pickup 14. The second information signal "B" is transferred between the track buffer memory 19 and the audio-video encoding and decoding unit 20 at a transfer rate Rb changeable among the above-indicated predetermined values.

As will be mentioned later, the apparatus 10A can substantially continuously and simultaneously record or reproduce the contents of the first and second information signals "A" and "B".

In more detail, each of the transfer rates Ra and Rb is selected from a value of 8 Mbps which corresponds to a recording time of 2 hours and a high picture quality, a value of 4 Mbps which corresponds to a recording time of 4 hours and a slightly high picture quality, and a value of 2 Mbps which corresponds to a recording time of 8 hours and a normal picture quality. Ones of these values can be designated as desired values of the transfer rates Ra and Rb according to user's operation of the key input unit 23. During the recording of the first and second information signals "A" and "B" on the optical disc 13, the transfer rates Ra and Rb are set to the desired values designated by user's operation of the key input unit 23. During the reproduction of the first and second information signals "A" and "B" from the optical disc 13, information of recording compression rates is derived from control data for the information signals "A" and "B", and the transfer rates Ra and Rb are set in response to the recording compression rates. Alternatively, during the reproduction of the information signals "A" and "B" from the optical disc 13, control data representative of transfer rates Ra and Rb used in the recording are reproduced from the optical disc 13, and the reproduction transfer rates Ra and Rb are set in accordance with the reproduced control data.

The system controller 22 accesses and controls the track buffer memory 19 via the signal processor 18. The system controller 22 virtually divides or partitions the track buffer memory 19 into the first and second areas 19a and 19b. Specifically, the system controller 22 sets the first and second areas 19a and 19b in the track buffer memory 19 in response to the values of the transfer rates Ra and Rb. The ratio in capacity between the first and second areas 19a and 19b depends on the ratio "Ra:Rb", that is, the ratio between the transfer rates Ra and Rb. Regarding the first area 19a in the track buffer memory 19, the system controller 22 sets an empty value and a full value in response to the value of the transfer rate Ra. The empty value corresponds to a slightly occupied state or a substantially empty state of the first area 19a. The full value corresponds to a fully occupied state of the first area 19a. Regarding the second area 19b in the track buffer memory 19, the system controller 22 sets an empty value and a full value in response to the value of the transfer rate Rb. The empty value corresponds to a slightly occupied state or a substantially empty state of the second area 19b. The full value corresponds to a fully occupied state of the second area 19b. The system controller 22 always monitors the degree of occupancy of each of the first and second areas 19a and 19b which varies between the related empty value and the related full value under normal conditions.

Alternatively, the division of the track buffer memory 19 into the first and second areas 19a and 19b may be responsive to the type of the mode of operation of the apparatus 10A. For example, in the case of the operation mode during which the apparatus 10A reproduces one of the information signals "A" and "B" and records the other information signal, greater one of the first and second areas 19a and 19b is assigned to the information signal to be recorded while smaller one is assigned to the reproduced information signal. This design reliably prevents the occurrence of an interruption of the continuously recording of the information-signal contents. The system controller 22 implements the division of the track buffer memory 19 into the first and second areas 19a and 19b when receiving a recording start command signal or a playback start command signal. Preferably, the system controller 22 implements the division of the track buffer memory 19 after confirming the absence of data from the track buffer memory 19 which are being reproduced or recorded.

Two-Signal Playback Mode

Figure 5:
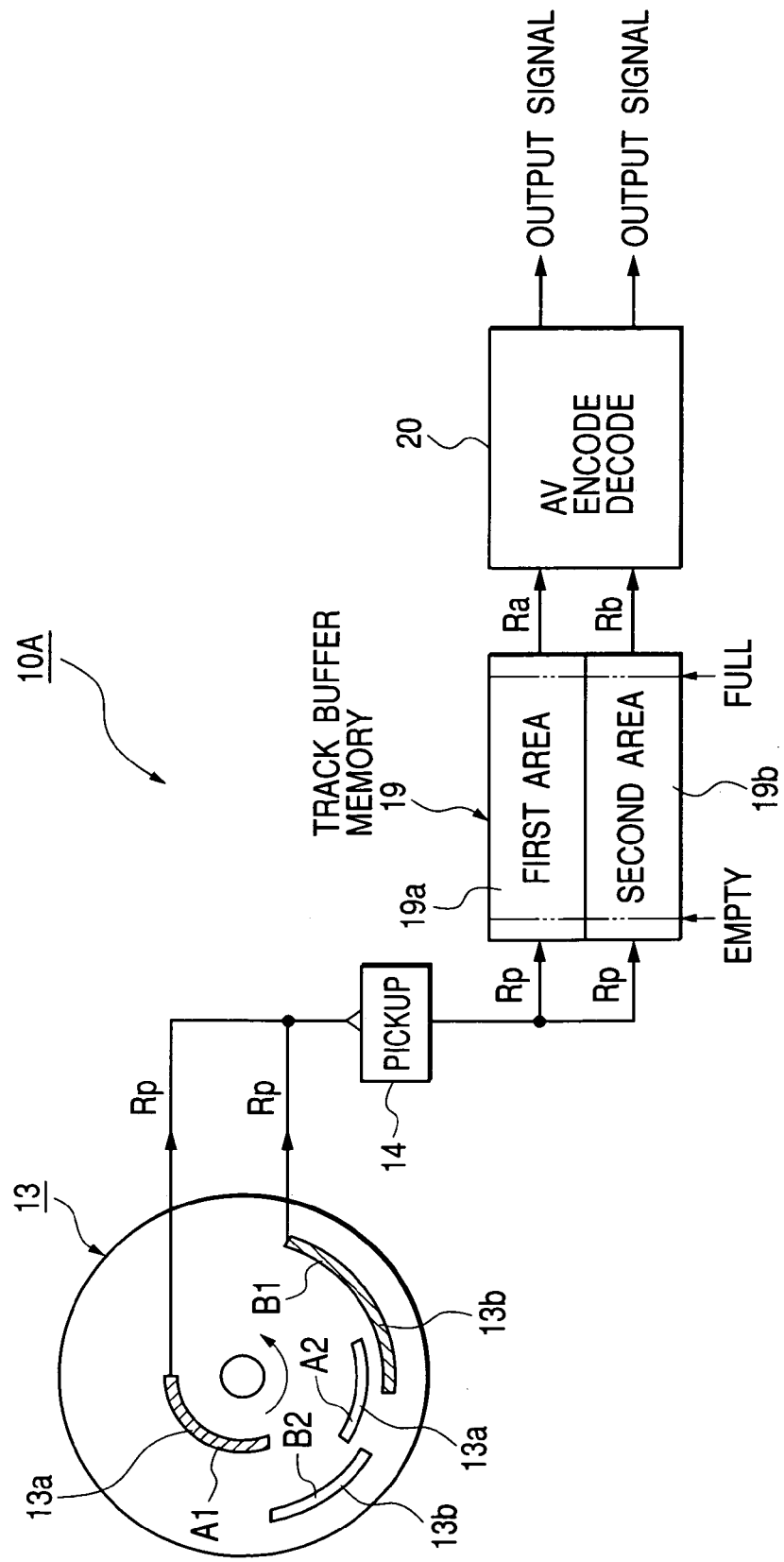
FIG. 5 is a diagram of a portion of the apparatus in FIG. 1 which is operating in a two-signal playback mode.

FIG. 5 shows a portion of the apparatus 10A which is operating in a two-signal playback mode. The amplifier unit 16 and the signal processor 18 (see FIG. 1) are omitted from FIG. 5 for a better understanding. With reference to FIG. 5, it is preferable that the optical disc 13 is of the read-only type. The optical disc 13 may be of another type. The optical disc 13 has the first areas 13a on which blocks of the first information signal "A" are previously recorded respectively. In addition, the optical disc 13 has the second areas 13b on which the blocks of the second information signal "B" are previously recorded respectively. Each of the blocks of the first information signal "A" has a predetermined size (a predetermined total number of bits) Ya. Each of the blocks of the second information signal "B" has a predetermined size (a predetermined total number of bits) Yb equal to or different from the predetermined size Ya.

As previously mentioned, there are four different types of the assignment of the first areas 13a and the second areas 13b to the signal recording layers L0 and L1 in the optical disc 13. According to the first assignment, the first areas 13a and the second areas 13b extend on the first signal recording layer L0. According to the second assignment, the first areas 13a and the second areas 13b extend on the signal recording layer L1. According to the third assignment, the first areas 13a extend on the signal recording layer L0 while the second areas 13b extend on the signal recording layer L1. According to the fourth assignment, the first areas 13a extend on the signal recording layer L1 while the second areas 13b extend on the signal recording layer L0.

As shown in FIG. 6, the first areas 13a of the optical disc 13 are given addresses A1, A2, A3, . . . , respectively. Thus, the first areas 13a are also referred to as the first areas A1, A2, A3, . . . . The blocks of the first information signal "A" are recorded on the first areas A1, A2, A3, . . . , respectively. Preferably, the size of the blocks of the first information signal "A" is equal to the size of the first areas A1, A2, A3, . . . . The placement of the first areas 13a is designed to meet requirements for a seek time. As shown in FIG. 7, the second areas 13b of the optical disc 13 are given addresses B1, B2, B3, . . . , respectively. Thus, the second areas 13b are also referred to as the second areas B1, B2, B3, . . . . The blocks of the second information signal "B" are recorded on the second areas B1, B2, B3, . . . , respectively. Preferably, the size of the blocks of the second information signal "B" is equal to the size of the second areas B1, B2, B3, . . . . The placement of the second areas 13b is designed to meet requirements for a seek time. First, a block of the first information signal "A" is reproduced from first one A1 (the first area 13a given the address A1) of the first areas 13a. Second, a block of the second information signal "B" is reproduced from first one B1 (the second area 13b given the address B1) of the second areas 13b. The first area A1 and the second area B1 are located relative to each other so that the optical pickup 14 can move therebetween in a predetermined time equal to, for example, about 0.7 second. The maximum seek time during which the optical pickup 14 moves between the first areas 13 and the second areas 13b is equal to the predetermined time (for example, about 0.7 second).

During an initial stage of the two-signal playback mode of operation of the apparatus 10A, the optical pickup 14 moves to a position of a designated track on the optical disc 13 and waits for a start sector. Then, the optical pickup 14 meets the start sector, and commences reproducing a signal from the optical disc 13. The system controller 22 detects control data in the reproduced signal. The control data relate to the information signals "A" and "B". The system controller 22 derives information of recording compression rates (information of transfer rates Ra and Rb) from the detected control data. The system controller 22 divides or partitions the track buffer memory 19 into a first area 19a and a second area 19b in response to the recording compression rates. Furthermore, the system controller 22 sets empty values and full values of the first and second areas 19a and 19b in response to the recording compression rates.

During a subsequent stage of the two-signal playback mode of operation, the optical pickup 14 alternatively reproduces the first information signal "A" and the second information signal "B" from the first areas 13a and the second areas 13b of the optical disc 13 on a time sharing basis. The reproduced first information signal "A" is stored into the first area 19a of the track buffer memory 19 from the optical pickup 14 at a predetermined constant transfer rate Rp (equal to, for example, 25 Mbps). The reproduced second information signal "B" is stored into the second area 19b of the track buffer memory 19 at the predetermined constant transfer rate Rp. Storing the reproduced first information signal "A" into the first area 19a of the track buffer memory 19 alternates with storing the reproduced second information signal "B" into the second area 19b of the track buffer memory 19.

The system controller 22 sets transfer rates Ra and Rb for the first and second information signals "A" and "B" on the basis of the recording compression rates. The transfer rates Ra and Rb are lower than the predetermined constant transfer rate Rp. The first information signal "A" is transmitted from the first area 19a of the track buffer memory 19 to the audio-video encoding and decoding unit 20 at the transfer rate Ra. The second information signal "B" is transmitted from the second area 19b of the track buffer memory 19 to the audio-video encoding and decoding unit 20 at the transfer rate Rb. Generally, the transmission of the first information signal "A" from the track buffer memory 19 and the transmission of the second information signal "B" from the track buffer memory 19 are implemented on a time sharing basis. The audio-vide encoding and decoding unit 20 expands and decodes the first information signal "A" into a first non-compressed information signal "A". Also, the audio-video encoding and decoding unit 20 expands and decodes the second information signal "B" into a second non-compressed information signal "B". The first non-compressed information signal "A" and the second non-compressed information signal "B" are transmitted from the audio-video encoding and decoding unit 20 to a display and a loudspeaker, being simultaneously converted into corresponding pictures and sounds.

Figure 8:
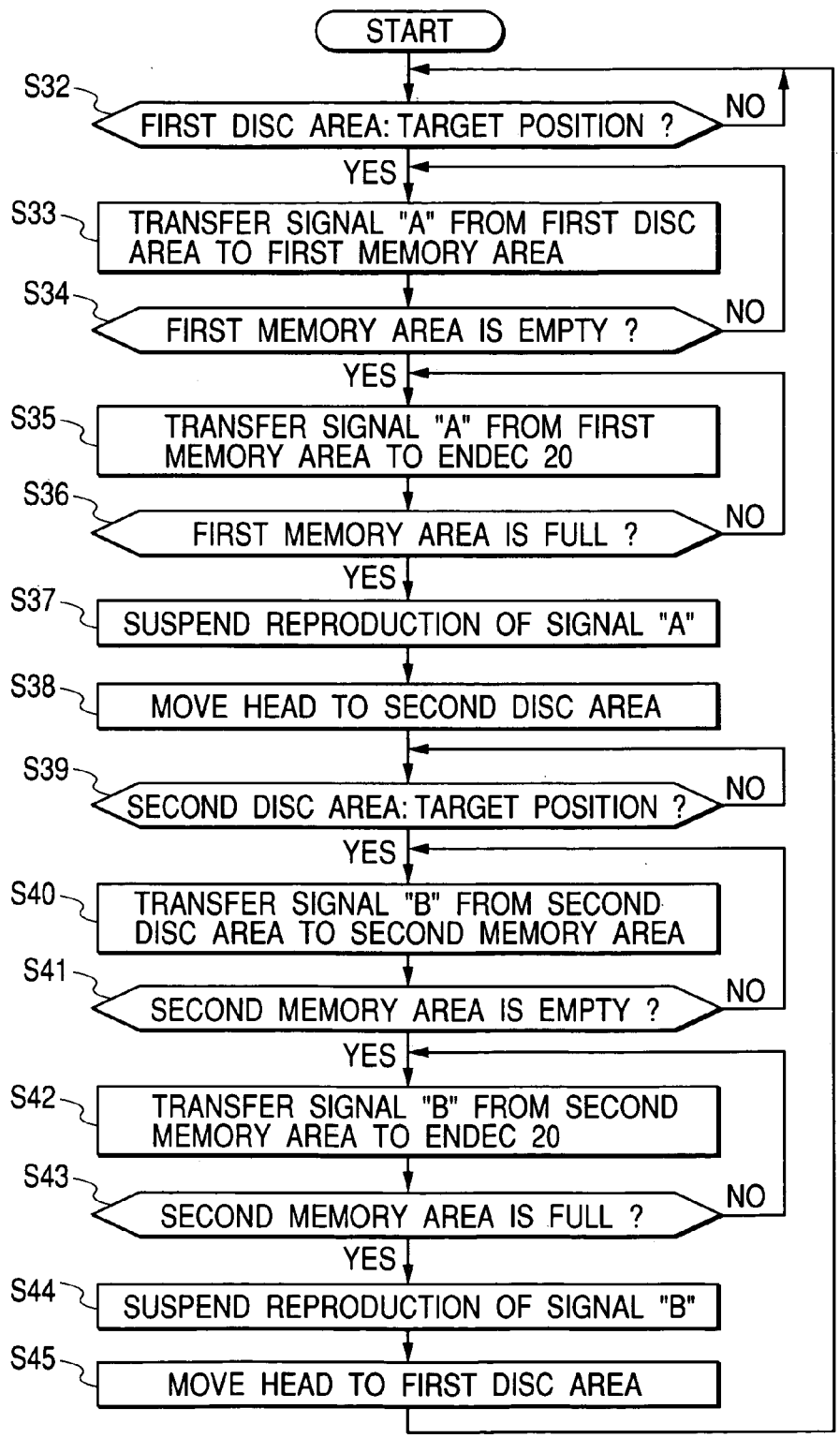
FIG. 8 is a flowchart of a segment of a control program for a system controller in FIG. 1 which relates to the two-signal playback mode of operation.

The system controller 22 operates in accordance with a control program stored in its internal ROM. FIG. 8 is a flowchart of a segment of the control program which relates to the two-signal playback mode of operation of the apparatus 10A. The program segment in FIG. 8 is started in response to a two-signal-playback start command signal fed from the key input unit 23.

With reference to FIG. 8, a first step S32 of the program segment decides whether or not the optical pickup 14 has reached a target position on the optical disc 13. Initially, the target position corresponds to first one A1 of the first areas 13a in the optical disc 13. When the optical pickup 14 has not reached the target position yet, the step S32 is repeated. When the optical pickup 14 has reached the target position, the program advances from the step S32 to a step S33.

The step S33 enables the optical pickup 14 to reproduce the first information signal "A" from the present first area 13a in the optical disc 13 at the predetermined constant transfer rate Rp. The step S33 stores the reproduced first information signal "A" into the first area 19a in the track buffer memory 19 at the predetermined constant transfer rate Rp.

A step S34 following the step S33 decides whether or not the degree of occupancy of the first area 19a in the track buffer memory 19 has reached the related empty value. When the degree of occupancy of the first area 19a has not reached the related empty value yet, the program returns from the step S34 to the step S33. When the degree of occupancy of the first area 19a reached the related empty value, the program advances from the step S34 to a step S35.

Thus, during an initial stage, the first information signal "A" is transmitted from the first area A1 in the optical disc 13 to the first area 19a in the track buffer memory 19 at the predetermined constant transfer rate Rp until the degree of occupancy of the memory area 19a increases to the related empty value.

The step S35 transfers the first information signal "A" from the first area 19a in the track buffer memory 19 to the audio-video encoding and decoding unit 20 at the transfer rate Ra.

A step S36 subsequent to the step S35 decides whether or not the degree of occupancy of the first area 19a in the track buffer memory 19 has reached the related full value. When the degree of occupancy of the first area 19a has not reached the related full value yet, the program returns from the step S36 to the step S35. When the degree of occupancy of the first area 19a has reached the related full value, the program advances from the step S36 to a step S37.

The step S37 forces the optical pickup 14 to suspend or terminate the reproduction of the first information signal "A" from the present first area 13a in the optical disc 13.

A step S38 following the step S37 moves the optical pickup 14 toward a next target position. The next target position corresponds to, for example, first one B1 of the second areas 13b in the optical disc 13. After the step S38, the program advances to a step S39.

The step S39 decides whether or not the optical pickup 14 has reached the target position on the optical disc 13. When the optical pickup 14 has not reached the target position yet, the step S39 is repeated. When the optical pickup 14 has reached the target position, the program advances from the step S39 to a step S40.

Thus, the optical pickup 14 moves from the first area 13a to the second area 13b in the optical disc 13. The seek time related to this movement of the optical pickup 14 is equal to, for example, about 0.7 second or shorter. Specifically, in the case where both the first area 13a and the second area 13b extend on one of the signal recording layers L0 and L1 of the optical disc 13, the seek time related to that movement of the optical pickup 14 agrees with an intra-layer seek time Tab. The intra-layer seek time Tab is equal to, for example, about 0.5 second or shorter. In the case where the first area 13a extends on one of the signal recording layers L0 and L1 of the optical disc 13 while the second area 13b extends on the other signal recording layer, the seek time related to that movement of the optical pickup 14 agrees with the intra-layer seek time Tab plus an inter-layer seek time Fab. The inter-layer seek time Fab means a time interval taken by the optical pickup 14 to implement a focus jump between the signal recording layers L0 and L1 of the optical disc 13 along a vertical direction (a focus direction). The inter-layer seek time Fab is equal to, for example, about 0.2 second or shorter.

The step S40 enables the optical pickup 14 to reproduce the second information signal "B" from the present second area 13b in the optical disc 13 at the predetermined constant transfer rate Rp. The step S40 stores the reproduced second information signal "B" into the second area 19b in the track buffer memory 19 at the predetermined constant transfer rate Rp.

A step S41 subsequent to the step S40 decides whether or not the degree of occupancy of the second area 19b in the track buffer memory 19 has reached the related empty value. When the degree of occupancy of the second area 19b has not reached the related empty value yet, the program returns from the step S41 to the step S40. When the degree of occupancy of the second area 19b has reached the related empty value, the program advances from the step S41 to a step S42.

The step S42 transfers the second information signal "B" from the second area 19b in the track buffer memory 19 to the audio-video encoding and decoding unit 20 at the transfer rate Rb.

A step S43 following the step S42 decides whether or not the degree of occupancy of the second area 19b in the track buffer memory 19 has reached the related full value. When the degree of occupancy of the second area 19b has not reached the related full value yet, the program returns from the step S43 to the step S42. When the degree of occupancy of the second area 19b has reached the related full value, the program advances from the step S43 to a step S44.

The step S44 forces the optical pickup 14 to suspend or terminate the reproduction of the second information signal "B" from the present second area 13b in the optical disc 13.

A step S45 subsequent to the step S44 moves the optical pickup 14 toward a next target position. The next target position corresponds to, for example, second one A2 of the first areas 13a in the optical disc 13. After the step S45, the program returns to the step S32.

Thus, the optical pickup 14 moves from the second area 13b to the first area 13a in the optical disc 13. The seek time related to this movement of the optical pickup 14 is equal to, for example, about 0.7 second or shorter. Specifically, in the case where both the first area 13a and the second area 13b extend on one of the signal recording layers L0 and L1 of the optical disc 13, the seek time related to that movement of the optical pickup 14 agrees with an intra-layer seek time Tba. The intra-layer seek time Tba is equal to, for example, about 0.5 second or shorter. In the case where the first area 13a extends on one of the signal recording layers L0 and L1 of the optical disc 13 while the second area 13b extends on the other signal recording layer, the seek time related to that movement of the optical pickup 14 agrees with the intra-layer seek time Tba plus an inter-layer seek time Fba. The inter-layer seek time Fba means a time interval taken by the optical pickup 14 to implement a focus jump between the signal recording layers L0 and L1 of the optical disc 13 along a vertical direction (a focus direction). The inter-layer seek time Fba is equal to, for example, about 0.2 second or shorter.

During the repetitive execution of the program segment in FIG. 8, the target position of the optical pickup 14 is sequentially set into correspondence with the first and second areas A1, B1, A2, B2, A3, B3, in the optical disc 13. Therefore, the optical pickup 14 alternately reproduces the first information signal "A" and the second information signal "B" from the first and second areas 13a and 13b of the optical disc 13 in the order as "A1, B1, A2, B2, A3, B3, . . . ".

Preferably, the step S37 or the step S44 is followed by a step which decides whether or not both the reproduction of the first information signal "A" from the optical disc 13 and the reproduction of the second information signal "B" therefrom are required to be suspended. When both the reproduction of the first information signal "A" from the optical disc 13 and the reproduction of the second information signal "B" therefrom are required to be suspended, the optical pickup 14 is controlled to implement the required suspension of reproduction.

Figure 9:
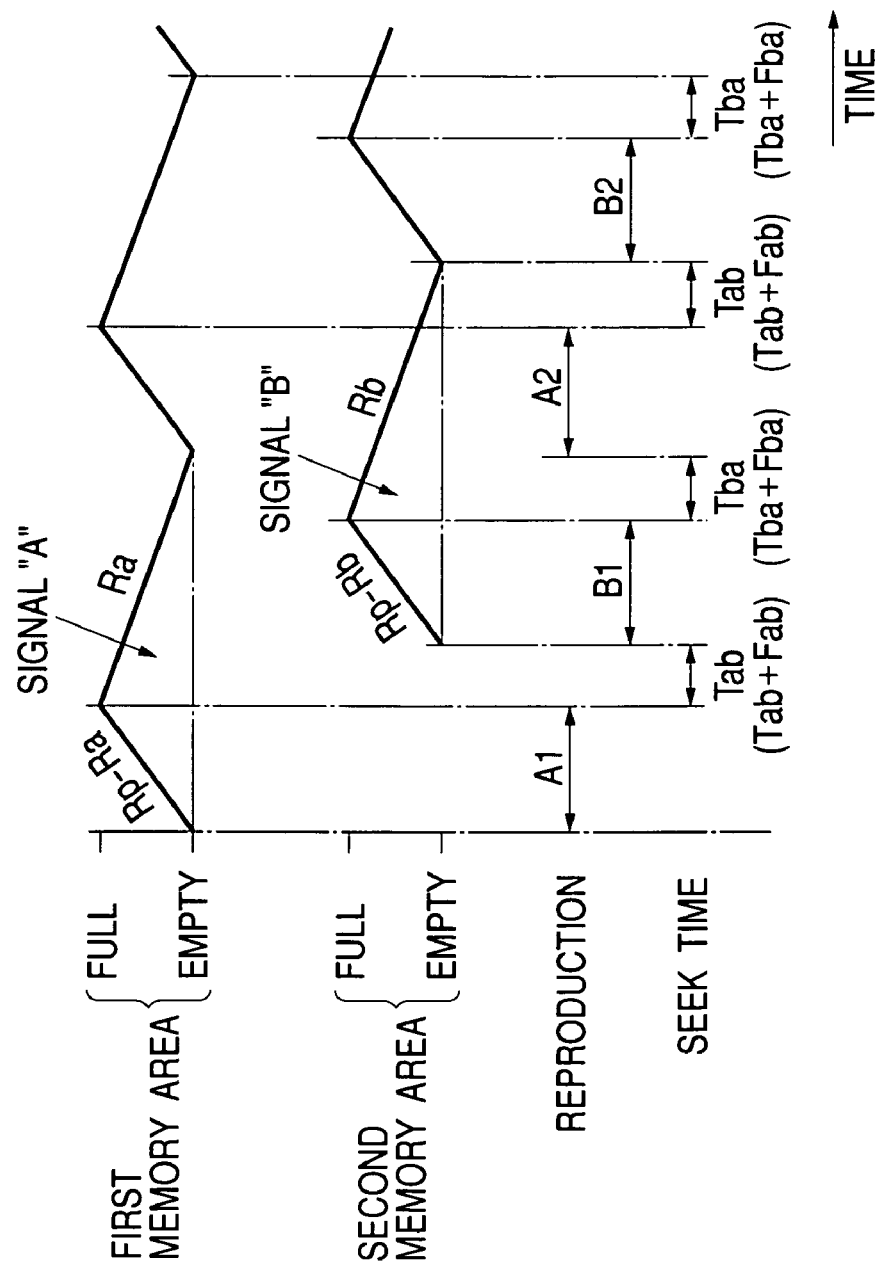
FIG. 9 is a time-domain diagram of the degrees of occupancy of first and second areas in a track buffer memory in FIG. 1 which occur during the two-signal playback mode of operation.

With reference to FIG. 9, after the degree of occupancy of the first area 19a in the track buffer memory 19 reaches the related empty value, the first information signal "A" is read out from the memory area 19a at the transfer rate Ra and the first information signal "A" is transmitted from the first area A1 in the optical disc 13 to the memory area 19a at the predetermined constant transfer rate Rp. Thus, during this stage, the degree of occupancy of the memory area 19a increases at a rate corresponding to "Rp−Ra".

When the degree of occupancy of the memory area 19a reaches the related full value, the transmission of the first information signal "A" from the first area A1 in the optical disc 13 to the memory area 19a is suspended or terminated. Then, the optical pickup 14 is moved to a position corresponding to the second area B1 in the optical disc 13. The seek time (Tab or Tab+Fab) related to this movement of the optical pickup 14 is equal to or shorter than, for example, about 0.7 second. The optical pickup 14 transmits the second information signal "B" from the second area B1 in the optical disc 13 to the second area 19b of the track buffer memory 19 at the predetermined constant transfer rate Rp. Even after the degree of occupancy of the memory area 19a reaches the related full value, the first information signal "A" continues to be read out from the memory area 19a at the transfer rate Ra. Thus, during this stage, the degree of occupancy of the memory area 19a decreases at a rate corresponding to "Ra". The read-out of the first information signal "A", which relates to the optical-disc area A1, from the memory area 19a is completed before the optical pickup 14 starts accessing the first area A2 in the optical disc 13.

After the degree of occupancy of the second area 19b in the track buffer memory 19 reaches the related empty value, the second information signal "B" is read out from the memory area 19b at the transfer rate Rb and the second information signal "B" is transmitted from the second area B1 in the optical disc 13 to the memory area 19b at the predetermined constant transfer rate Rp. Thus, during this stage, the degree of occupancy of the memory area 19b increases at a rate corresponding to "Rp−Rb".

When the degree of occupancy of the memory area 19b reaches the related full value, the transmission of the second information signal "B" from the second area B1 in the optical disc 13 to the memory area 19b is suspended or terminated. Then, the optical pickup 14 is moved to a position corresponding to the first area A2 in the optical disc 13. The seek time (Tba or Tba+Fba) related to this movement of the optical pickup 14 is equal to or shorter than, for example, about 0.7 second. The optical pickup 14 transmits the first information signal "A" from the first area A2 in the optical disc 13 to the first area 19a of the track buffer memory 19 at the predetermined constant transfer rate Rp. Even after the degree of occupancy of the memory area 19b reaches the related full value, the second information signal "B" continues to be read out from the memory area 19b at the transfer rate Rb. Thus, during this stage, the degree of occupancy of the memory area 19b decreases at a rate corresponding to "Rb". The read-out of the second information signal "B", which relates to the optical-disc area B1, from the memory area 19b is completed before the optical pickup 14 starts accessing the second area B2 in the optical disc 13.

Figure 10:
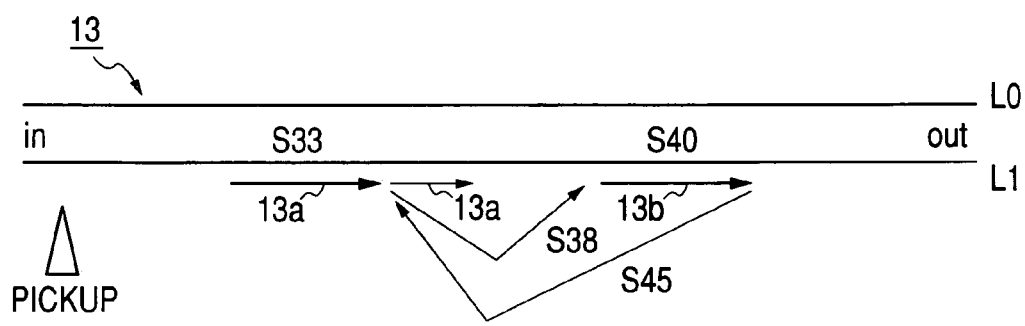
FIG. 10 is a diagram of first movement of an optical pickup between first and second areas in an optical disc having two signal recording layers.

With reference to FIG. 10, the optical disc 13 of a first type has first areas 13a and second areas 13b. The first areas 13a and the second areas 13b extend on the signal recording layer L1 of the optical disc 13. The step S33 (see FIG. 8) reproduces the first information signal "A" from a first area 13a in the optical disc 13. When the first area 19a of the track buffer memory 19 reaches the related full value, the step S38 (see FIG. 8) moves the optical pickup 14 from the first area 13a to a second area 13b in the optical disc 13. The seek time related to this movement of the optical pickup 14 agrees with the intra-layer seek time Tab equal to, for example, about 0.5 second or shorter. Then, the step S40 (see FIG. 8) reproduces the second information signal "B" from the second area 13b in the optical disc 13. Thereafter, the step S45 (see FIG. 8) moves the optical pickup 14 from the optical-disc second area 13b to the starting edge of the next first area 13a of the optical disc 13. The seek time related to this movement of the optical pickup 14 agrees with the intra-layer seek time Tba equal to, for example, about 0.5 second or shorter.

Figure 11:
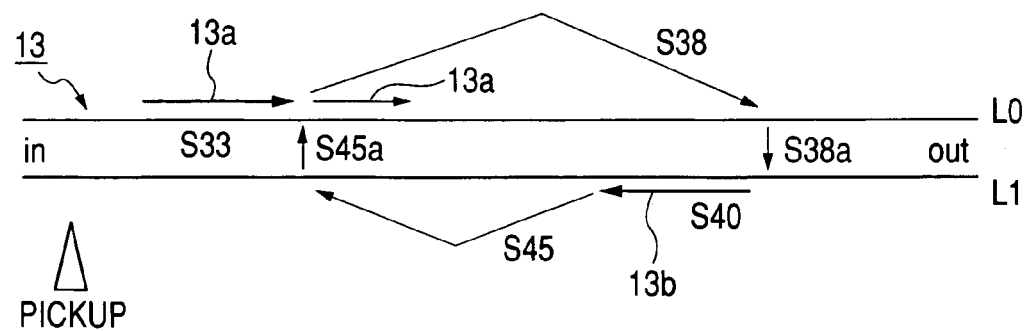
FIG. 11 is a diagram of second movement of the optical pickup between first and second areas in an optical disc having two signal recording layers.

With reference to FIG. 11, the optical disc 13 of a second type has first areas 13a and second areas 13b. The first areas 13a extend on the signal recording layer L0 of the optical disc 13 while the second areas 13b extend on the signal recording layer L1 thereof. The step S33 (see FIG. 8) reproduces the first information signal "A" from a first area 13a in the optical disc 13. When the first area 19a of the track buffer memory 19 reaches the related full value, a former part of the step S38 (see FIG. 8) moves the optical pickup 14 from the first area 13a to a position on the signal recording layer L0 which corresponds to or aligns with the starting edge of a second area 13b on the signal recording layer L1. Then, a later part S38a of the step S38 controls the optical pickup 14 to implement a focus jump from that position on the signal recording layer L0 to a position on the signal recording layer L1 at the starting edge of the optical-disc second area 13b. The seek time related to this movement of the optical pickup 14 agrees with the intra-layer seek time Tab plus the inter-layer seek time Fab equal to, for example, about 0.7 second or shorter. Then, the step S40 (see FIG. 8) reproduces the second information signal "B" from the second area 13b in the optical disc 13. Thereafter, a former part of the step S45 (see FIG. 8) moves the optical pickup 14 from the optical-disc second area 13b to a position on the signal recording layer L1 which corresponds to or aligns with the starting edge of the next first area 13a on the signal recording layer L0. Subsequently, a later part 45a of the step S45 controls the optical pickup 14 to implement a focus jump from that position on the signal recording layer L1 to a position on the signal recording layer L0 at the starting edge of the next first area 13a. The seek time related to this movement of the optical pickup 14 agrees with the intra-layer seek time Tba plus the inter-layer seek time Fba equal to, for example, about 0.7 second or shorter. After the movement of the optical pickup 14, the first information signal "A" is reproduced from the next first area 13a of the optical disc 13a.

Every focus jump of the optical pickup 14 between the signal recording layers L0 and L1 of the optical disc 13 takes a time interval of, for example, about 0.2 second or shorter. This time interval is the inter-layer seek time Fab or Fba. A simple focus jump of the optical pickup 14 takes a time interval in the range of several milliseconds to several tens of milliseconds. The inter-layer seek time Fab or Fba is equal to the sum of (1) the simple-focus-jump time interval, (2) a time interval taken to lock up the tracking again, (3) a time interval necessary to compensate for a difference in eccentricity between the signal recording layers L0 and L1 of the optical disc 13, (4) a time interval for a retry, (5) a time interval for waiting rotation, and (6) other time intervals.

As previously indicated, the rate of the transfer of the first and second information signals "A" and "B" between the optical disc 13 and the track buffer memory 19 via the optical pickup 14 is denoted by "Rp" (Mbps). The rate of the transfer of the first information signal "A" from the first area 19a of the track buffer memory 19 toward the audio-video encoding and decoding unit 20 is denoted by "Ra" (Mbps). The rate of the transfer of the second information signal "B" from the second area 19b of the track buffer memory 19 toward the audio-video encoding and decoding unit 20 is denoted by "Rb" (Mbps). The minimum capacity of the track buffer memory 19 is denoted by "Ym" (Mb). The unit or minimum size (the unit or minimum total number of bits) of the first information signal "A" continuously read out from a first area 13a in the optical disc 13 is denoted by "Ya" (Mb). The unit or minimum size Ya is also referred to as the unit or minimum information amount Ya. Preferably, the size (the total number of bits) of the first information signal "A" recorded on each of the first areas A1, A2, A3, . . . in the optical disc 13 is equal to the unit information amount Ya. The unit or minimum size (the unit or minimum total number of bits) of the second information signal "B" continuously read out from a second area 13b in the optical disc 13 is denoted by "Yb" (Mb). The unit or minimum size Yb is also referred to as the unit or minimum information amount Yb. Preferably, the size (the total number of bits) of the second information signal "B" recorded on each of the second areas B1, B2, B3, . . . in the optical disc 13 is equal to the unit information amount Yb. The intra-layer seek time related to movement of the optical pickup 14 from a first area 13a to a second area 13b on one of the signal recording layers L0 and L1 of the optical disc 13 is denoted by "Tab" (s). The intra-layer seek time related to movement of the optical pickup 14 from a second area 13b to a first area 13a on one of the signal recording layers L0 and L1 of the optical disc 13 is denoted by "Tba" (s). The inter-layer seek time (the focus-jump seek time) related to movement of the optical pickup 14 from a first area 13a on one of the signal recording layers L0 and L1 to a second area 13b on the other signal recording layer of the optical disc 13 is denoted by "Fab" (s). The inter-layer seek time (the focus-jump seek time) related to movement of the optical pickup 14 from a second area 13b on one of the signal recording layers L0 and L1 to a first area 13a on the other signal recording layer of the optical disc 13 is denoted by "Fba" (s).

The intra-layer seek time Tab is equal to a first time interval plus a second time interval. The first time interval starts from the moment at which the optical pickup 14 reaches a reproduction end position and terminates the reproduction of the first information signal "A" from the first area 13a of the optical disc 13. The first time interval continues as the optical pickup 14 moves from the reproduction end position in the first area 13a toward the second area 13b of the optical disc 13. The first time interval ends and the second time interval starts when the optical pickup 14 moves to the second area 13b of the optical disc 13. The second time interval continues until the optical pickup 14 starts reproducing the second information signal "B" from the second area 13b of the optical disc 13. During the second time interval, a target address of the second area 13b of the optical disc 13 is found, and preparations for the reproduction of the second information signal "B" therefrom have been made.

Similarly, the intra-layer seek time Tba is equal to a first time interval plus a second time interval. The first time interval starts from the moment at which the optical pickup 14 reaches a reproduction end position and terminates the reproduction of the second information signal "B" from the second area 13b of the optical disc 13. The first time interval continues as the optical pickup 14 moves from the reproduction end position in the second area 13b toward the first area 13a of the optical disc 13. The first time interval ends and the second time interval starts when the optical pickup 14 moves to the first area 13a of the optical disc 13. The second time interval continues until the optical pickup 14 starts reproducing the first information signal "A" from the first area 13a of the optical disc 13. During the second time interval, a target address of the first area 13a of the optical disc 13 is found, and preparations for the reproduction of the first information signal "A" therefrom have been made.

With reference to FIGS. 9 and 11, in the case where the first area 13a extends on one of the signal recording layers L0 and L1 of the optical disc 13 while the second area 13b extends on the other signal recording layer, the total seek time of movement of the optical pickup 14 from the first area 13a to the second area 13b is substantially equal to the intra-layer seek time Tab plus the inter-layer seek time Fab. Similarly, the total seek time of movement of the optical pickup 14 from the second area 13b to the first area 13a is substantially equal to the intra-layer seek time Tba plus the inter-layer seek time Fba.

The mean value of the rate Ra of the transfer of the first information signal "A" from the first area 19a of the track buffer memory 19 plus the mean value of the rate Rb of the transfer of the second information signal "B" from the second area 19b of the track buffer memory 19 equals smaller than the rate Rp of the transfer of the information signals "A" and "B" to the track buffer memory 19. Thus, the transfer rates Rp, Ra, and Rb are in the following relation.

$$Rp > Ra + Rb \quad (1)$$

The playback time Ta (s) for which the optical pickup 14 continuously reproduces the first information signal "A" from the optical disc 13 is given as follows.

$$Ta = Ya/Rp \quad (2)$$

The playback time Tb (s) for which the optical pickup 14 continuously reproduces the second information signal "B" from the optical disc 13 is given as follows.

$$Tb = Yb/Rp \quad (3)$$

Regarding the transfer rates Rp, Ra, and Rb, the following ratio is considered.

$$Rp/(Rp - Ra - Rb) \quad (4)$$

where "Rp" corresponds to a maximum transfer rate and "(Rp−Ra−Rb)" corresponds to a margin transfer rate regarding the signal read-out from the track buffer memory 19.

In the case where the first areas 13a and the second areas 13b extend on one of the signal recording layers L0 and L1 of the optical disc 13, the following ratio is considered regarding the times Ta, Tab, Tb, and Tba.

$$(Ta+Tab+Tb+Tba)/(Tab+Tba) \quad (5)$$

where "(Ta+Tab+Tb+Tba)" corresponds to a 1-cycle time during which the first and second information signals "A" and "B" are sequentially reproduced once, and "(Tab+Tba)" corresponds to a total seek period in the 1-cycle time.

In the case where the first areas 13a extend on one of the signal recording layers L0 and L1 of the optical disc 13 while the second areas 13b extend on the other signal recording layer, the following ratio is considered regarding the times Ta, Tab, Tb, Tba, Fab, and Fba.

$$(Ta+Tab+Fab+Tb+Tba+Fba)/(Tab+Tba+Fab+Fba) \quad (5a)$$

where "(Ta+Tab+Fab+Tb+Tba+Fba)" corresponds to a 1-cycle time during which the first and second information signals "A" and "B" are sequentially reproduced once, and "(Tab+Tba+Fab+Fba)" corresponds to a total seek period in the 1-cycle time.

Supposed extreme conditions are such that a time interval for the reproduction of the first and second information signals "A" and "B" and a total seek period compose a 1-cycle time, and other time intervals such as an optical-pickup waiting time interval are excluded from the 1-cycle time. Under the supposed extreme conditions, only a time interval corresponding to a margin transfer rate equal to the rate of the signal transfer from the optical disc 13 minus the rate of the signal transfer from the track buffer memory 19 can be used for the movement of the optical pickup 14. Thus, the ratio in the relation (4) and the ratio in the relation (5) can be equal to each other, and the following equation is available.

$$Rp/(Rp-Ra-Rb)=(Ta+Tab+Tb+Tba)/(Tab+Tba) \quad (6)$$

Similarly, the ratio in the relation (4) and the ratio in the relation (5a) can be equal to each other, and the following equation is available.

$$Rp/(Rp-Ra-Rb)=(Ta+Tab+Fab+Tb+Tba+Fba)/(Tab+Tba+Fab+Fba) \quad (6a)$$

The equation (6) is changed into the following versions.

$$Rp/(Rp-Ra-Rb)=1+(Ta+Tb)/(Tab+Tba) \quad (6\text{-}1)$$

$$Rp/(Rp-Ra-Rb)-1=(Ta+Tb)/(Tab+Tba) \quad (6\text{-}2)$$

$$(Rp-Rp+Ra+Rb)/(Rp-Ra-Rb)=(Ta+Tb)/(Tab+Tba) \quad (6\text{-}3)$$

$$(Ra+Rb)/(Rp-Ra-Rb)=(Ta+Tb)/(Tab+Tba) \quad (6\text{-}4)$$

$$(Ta+Tb)=(Ra+Rb)\cdot(Tab+Tba)/(Rp-Ra-Rb) \quad (7)$$

Similarly, the equation (6a) is changed into the following version.

$$(Ta+Tb)=(Ra+Rb)\cdot(Tab+Tba+Fab+Fba)/(Rp-Ra-Rb) \quad (7a)$$

Combining the equations (2) and (3) with the equation (7) results in the following equation.

$$(Ya+Yb)=Rp\cdot(Ra+Rb)\cdot(Tab+Tba)/(Rp-Ra-Rb) \quad (8)$$

Combining the equations (2) and (3) with the equation (7a) results in the following equation.

$$(Ya+Yb)=Rp\cdot(Ra+Rb)\cdot(Tab+Tba+Fab+Fba)/(Rp-Ra-Rb) \quad (8a)$$

The meaning of the equations (8) and (8a) is as follows. In the case where the contents of the information signals "A" and "B" are simultaneously and continuously reproduced at the respective transfer rates Ra and Rb while the rate Rp of the transfer of the information signals "A" and "B" from the optical disc 13 to the track buffer memory 19 remains equal to the predetermined constant value, the amount (the total number of bits) of the information signals "A" and "B" read out from the optical disc 13 for one cycle is equal to "Ya+Yb" provided that the seek time related to the movement of the optical pickup 14 between the on-disc positions of the information signals "A" and "B" is equal to "Tab+Tba" or "Tab+Tba+Fab+Fba". The above-mentioned meaning of the equations (8) and (8a) is obtained under the supposed extreme conditions.

A margin can be introduced as follows. Regarding the equations (8) and (8a), the rate Rp of the signal transfer between the optical disc 13 and the track buffer memory 19 is equal to the predetermined constant value decided according to the disc standards and the specifications of the apparatus 10A. Alteration of the transfer rate Rp is equivalent to alteration of the rotational velocity of the optical disc 13. Thus, it is difficult to alter the transfer rate Rp in accordance with the transfer rates related to the reproduced signals.

The transfer rates Ra and Rb of the information signals "A" and "B" read out from the track buffer memory 19 are decided in accordance with the conditions of the recording of the information signals "A" and "B" on the optical disc 13 which have been selected by user's designation or others.

The intra-layer seek times Tab and Tba, and the inter-layer seek times Fab and Fba are decided according to the relation in address position among the first areas 13a and the second areas 13b in the optical disc 13 and also the specifications of the optical-disc drive mechanism in the apparatus 10A.

Therefore, substantially only the left terms in the equations (8) and (8a) are variables which can be used in stable playback control with a margin. Firstly, consideration is given to the case where the first areas 13a and the second areas 13b extend on one of the signal recording layers L0 and L1 of the optical disc 13. In this case, to implement simultaneous and continuous playback regarding the contents of both the information signals "A" and "B", the sizes (the total numbers of bits) Ya and Yb of the respective information signals "A" and "B" read out from the optical disc 13 for one cycle are chosen to satisfy the following relation.

$$(Ya+Yb)\geq Rp\cdot(Ra+Rb)\cdot(Tab+Tba)/(Rp-Ra-Rb) \quad (9)$$

Secondly, consideration is given to the case where the first areas 13a extend on one of the signal recording layers L0 and L1 of the optical disc 13 while the second areas 13b extend on the other signal recording layer. In this case, to implement simultaneous and continuous playback regarding the contents of both the information signals "A" and "B", the sizes (the total numbers of bits) Ya and Yb of the respective information signals "A" and "B" read out from the optical disc 13 for one cycle are chosen to satisfy the following relation.

$$(Ya+Yb)\geq Rp\cdot(Ra+Rb)\cdot(Tab+Tba+Fab+Fba)/(Rp-Ra-Rb) \quad (9a)$$

The relation (9) is changed into the following version.

$$(Ya+Yb)\geq(Ra+Rb)\cdot(Tab+Tba)\cdot Rp/(Rp-Ra-Rb) \quad (9\text{-}1)$$

A coefficient Kp is introduced which is given by:

$$(Tab+Tba)\cdot Rp/(Rp-Ra-Rb)=Kp \quad (9\text{-}2)$$

When the coefficient Kp is used, the relation (9-1) is rewritten as follows.

$$(Ya+Yb)\geq(Ra+Rb)\cdot Kp \quad (9\text{-}3)$$

According to the equation (9-2), the coefficient Kp remains unchanged in the case where the transfer rates Ra and Rb vary while the sum of the transfer rates Ra and Rb continues to be fixed. For simultaneous and continuous playback, the minimum information amount Ya is proportional to the transfer rate Ra, and the minimum information amount Yb is proportional to the transfer rate Rb. Accordingly, there is the below-indicated relation among the minimum information amounts Ya and Yb and the transfer rates Ra and Rb.

$$Ya:Yb=Ra:Rb \quad (9\text{-}4)$$

When the relation (9-4) is used, the relation (9-3) is rewritten into two versions expressed as:

$$Ya\geq Ra\cdot Kp \quad (9\text{-}5)$$

$$Yb\geq Rb\cdot Kp \quad (9\text{-}6)$$

Combining the equation (9-2) with the relations (9-5) and (9-6) results in the following relations.

$$Ya \geq Rp \cdot Ra \cdot (Tab+Tba)/(Rp-Ra-Rb) \qquad (10)$$

$$Yb \geq Rp \cdot Rb \cdot (Tab+Tba)/(Rp-Ra-Rb) \qquad (11)$$

Similarly, the relation (9a) leads to relations given as:

$$Ya \geq Rp \cdot Ra \cdot (Tab+Tba+Fab+Fba)/(Rp-Ra-Rb) \qquad (10a)$$

$$Yb \geq Rp \cdot Rb \cdot (Tab+Tba+Fab+Fba)/(Rp-Ra-Rb) \qquad (11a)$$

Thus, the relations (9), (10), and (11) are simultaneously satisfied. Also, the relations (9a), (10a), and (11a) are simultaneously satisfied.

The relations (9), (10), and (11) are obtained in the case where the first areas 13a and the second areas 13b extend on one of the signal recording layers L0 and L1 of the optical disc 13. The meaning of the relations (9), (10), and (11) is as follows. To implement simultaneous and continuous playback regarding the contents of both the information signals "A" and "B" while the information signals "A" and "B" are read out from the optical disc 13 on a time sharing basis, desired sizes (desired total numbers of bits) of the information signals "A" and "B" read out from the optical disc 13 for one cycle are equal to or greater than the minimum information amounts Ya and Yb respectively when the total seek time related to the movements of the optical pickup 14 between the first and second areas 13a and 13b of the optical disc 13 for one cycle is given by "Tab+Tba". Similarly, to implement the simultaneous and continuous recording of the contents of the information signals "A" and "B" as viewed from the input side of the audio-video encoding and decoding unit 20, the information signals "A" and "B" are written on the first and second areas 13a and 13b of the optical disc 13 whose desired sizes are equal to or greater than the respective minimum information amounts Ya and Yb for one cycle.

The relations (9a), (10a), and (11a) are obtained in the case where the first areas 13a extend on one of the signal recording layers L0 and L1 of the optical disc 13 while the second areas 13b extend on the other signal recording layer. The meaning of the relations (9a), (10a), and (11a) is as follows. To implement simultaneous and continuous playback regarding the contents of both the information signals "A" and "B" while the information signals "A" and "B" are read out from the optical disc 13 on a time sharing basis, desired sizes (desired total numbers of bits) of the information signals "A" and "B" read out from the optical disc 13 for one cycle are equal to or greater than the minimum information amounts Ya and Yb respectively when the total seek time related to the movements of the optical pickup 14 between the first and second areas 13a and 13b of the optical disc 13 for one cycle is given by "Tab+Tba+Fab+Fba". Similarly, to implement the simultaneous and continuous recording of information signals "A" and "B" as viewed from the input side of the audio-video encoding and decoding unit 20, the information signals "A" and "B" are written on the first and second areas 13a and 13b of the optical disc 13 whose desired sizes are equal to or greater than the respective minimum information amounts Ya and Yb for one cycle.

The relation (9) is always satisfied when the relation (9a) is satisfied. According to a first example which considers this fact, the playback of the information signals "A" and "B" and also the recording thereof are designed to satisfy the relation (9a) regardless of whether or not the first areas 13a and the second areas 13b extend on one of the signal recording layers L0 and L1 of the optical disc 13. In the first example, control of the playback and the recording is relatively simple. According to a second example, the playback of the information signals "A" and "B" and also the recording thereof are designed to satisfy the relation (9) in the case where the first areas 13a and the second areas 13b extend on one of the signal recording layers L0 and L1 of the optical disc 13, and to satisfy the relation (9a) in the case where the first areas 13a extend on one of the signal recording layers L0 and L1 while the second areas 13b extend on the other signal recording layer. Specifically, a decision is made as to whether or not the first areas 13a and the second areas 13b extend on one of the signal recording layers L0 and L1 by referring to signal-recording-layer information based on address information. When it is decided that the first areas 13a and the second areas 13b extend on one of the signal recording layers L0 and L1, the relation (9) is used in control of the playback and the recording. On the other hand, it is decided that the first areas 13a extend on one of the signal recording layers L0 and L1 while the second areas 13b extend on the other signal recording layer, the relation (9a) is used in control of the playback and the recording. The second example prevents a portion of the track buffer memory 19 from being unused in the case where the first areas 13a and the second areas 13b extend on one of the signal recording layers L0 and L1.

When the values Rp, Ra, Rb, Tab, Tba, Fab, and Fba are equal to 22 Mbps, 10 Mbps, 10 Mbps, 0.5 s, 0.5 s, 0.2 s, and 0.2 s respectively, the relations (9) and (9a) are expressed as:

$$(Ya+Yb) \geq 22 \cdot (10+10) \cdot (0.5+0.5)/(22-10-10) = 220 \text{ Mb} \qquad (9r)$$

$$(Ya+Yb) \geq 22 \cdot (10+10) \cdot (0.5+0.5+0.2+0.2)/(22-10-10) = 308 \text{ Mb} \qquad (9ar)$$

The meaning of the relation (9r) is as follows. The sum of the minimum information amounts Ya and Yb read out from the optical disc 13 during one cycle is equal to 220 Mb in the case where the first areas 13a and the second areas 13b extend on one of the signal recording layers L0 and L1 of the optical disc 13. The meaning of the relation (9ar) is as follows. The sum of the minimum information amounts Ya and Yb read out from the optical disc 13 during one cycle is equal to 308 Mb in the case where the first areas 13a extend on one of the signal recording layers L0 and L1 of the optical disc 13 while the second areas 13b extend on the other signal recording layer.

It should be noted that the optical disc 13 may have three or more signal recording layers. Every focus jump of the optical pickup 14 between the signal recording layers L0 and L1 of the optical disc can be implemented in a known way (for example, a way disclosed in Japanese patent application publication number 10-283640/1998).

In the case where the first areas 13a and the second areas 13b extend on one of the signal recording layers L0 and L1 of the optical disc 13, the minimum capacity Ym of the track buffer memory 19 satisfies the following relation.

$$Ym > (Tb+Tab+Tba) \cdot Ra + (Ta+Tab+Tba) \cdot Rb \qquad (12)$$

where the term "(Tb+Tab+Tba)·Ra" concerns the first information signal "A" and indicates a capacity corresponding to the decrease in the degree of occupancy of the first memory area 19a from the full value to the empty value, and the term "(Ta+Tab+Tba)·Rb" concerns the second information signal "B" and indicates a capacity corresponding to the decrease in the degree of occupancy of the second memory area 19b from the full value to the empty value (see FIG. 9).

In the case where the first areas 13a extend on one of the signal recording layers L0 and L1 of the optical disc 13 while the second areas 13b extend on the other signal recording layer, the minimum capacity Ym of the track buffer memory 19 satisfies the following relation.

$$Ym > (Tb+Tab+Tba+Fab+Fba) \cdot Ra + (Ta+Tab+Tba+Fab+Fba) \cdot Rb \quad (12a)$$

where the term "(Tb+Tab+Tba+Fab+Fba)·Ra" concerns the first information signal "A" and indicates a capacity corresponding to the decrease in the degree of occupancy of the first memory area 19a from the full value to the empty value, and the term "(Ta+Tab+Tba+Fab+Fba)·Rb" concerns the second information signal "B" and indicates a capacity corresponding to the decrease in the degree of occupancy of the second memory area 19b from the full value to the empty value (see FIG. 9) Furthermore, the minimum capacity Ym of the track buffer memory 19 satisfies the following relation.

$$Ym > Ta \cdot (Rp-Ra) + Tb \cdot (Rp-Rb) \quad (13)$$

where the term "Ta·(Rp−Ra)" concerns the first information signal "A" and indicates a capacity corresponding to the increase in the degree of occupancy of the first memory area 19a from the empty value to the full value, and the term "Tb·(Rp−Rb)" concerns the second information signal "B" and indicates a capacity corresponding to the increase in the degree of occupancy of the second memory area 19b from the empty value to the full value (see FIG. 9).

Combining the equations and relations (2), (3), (10), and (11) with the relation (12) results in the following relations.

$$Ym > (Yb/Rp+Tab+Tba) \cdot Ra + (Ya/Rp+Tab+Tba) \cdot Rb \quad (12\text{-}1)$$

$$Ym > (Yb/Rp) \cdot Ra + (Ya/Rp) \cdot Rb + (Tab+Tba) \cdot (Ra+Rb) \quad (12\text{-}2)$$

$$Ym > 2 \cdot Ra \cdot Rb \cdot (Tab+Tba)/(Rp-Ra-Rb) + (Tab+Tba) \cdot (Ra+Rb) \quad (12\text{-}3)$$

$$Ym > \{2 \cdot Ra \cdot Rb/(Rp-Ra-Rb) + (Ra+Rb)\} \cdot (Tab+Tba) \quad (12\text{-}4)$$

$$Ym > \{2 \cdot Ra \cdot Rb + (Ra+Rb)/(Rp-Ra-Rb)\} \cdot (Tab+Tba)/(Rp-Ra-Rb) \quad (12\text{-}5)$$

$$Ym > \{(Rp-Ra) \cdot Ra + (Rp-Rb) \cdot Rb\} \cdot (Tab+Tba)/(Rp-Ra-Rb) \quad (12\text{-}6)$$

Combining the equations and relations (2), (3), (10), and (11) with the relation (13) results in the following relations.

$$Ym > Ya/Rp \cdot (Rp-Ra) + Yb/Rp \cdot (Rp-Rb) \quad (13\text{-}1)$$

$$Ym > \{(Rp-Ra) \cdot Ra + (Rp-Rb) \cdot Rb\} \cdot (Tab+Tba)/(Rp-Ra-Rb) \quad (13\text{-}2)$$

The relations (12-6) and (13-2) are equivalent, and they are now called the relation (14) as follows.

$$Ym > \{(Rp-Ra) \cdot Ra + (Rp-Rb) \cdot Rb\} \cdot (Tab+Tba)/(Rp-Ra-Rb) \quad (14)$$

The relation (14) is good for the case where the first areas 13a and the second areas 13b extend on one of the signal recording layers L0 and L1 of the optical disc 13.

Similarly, combining the equations and relations (2), (3), (10), and
(11) with the relations (12a) and (13) results in the following relations.

$$Ym > \{(Rp-Ra) \cdot Ra + (Rp-Rb) \cdot Rb\} \cdot (Tab+Tba+Fab+Fba)/(Rp-Ra-Rb) \quad (14a)$$

The relation (14a) is good for the case where the first areas 13a extend on one of the signal recording layers L0 and L1 of the optical disc 13 while the second areas 13b extend on the other signal recording layer.

The term "(Rp−Ra)·Ra·(Tab+Tba)/(Rp−Ra−Rb)" in the relation (14) means a first memory-size reference value for the first information signal "A". Similarly, the term "(Rp−Rb)·Rb·(Tab+Tba)/(Rp−Ra−Rb)" in the relation (14) means a second memory-size reference value for the second information signal "B". As previously mentioned, the relation (14) is good for the case where the first areas 13a and the second areas 13b extend on one of the signal recording layers L0 and L1 of the optical disc 13. According to the relation (14), for the simultaneous and continuous playback of the contents of the first and second information signals "A" and "B" or the simultaneous and continuous recording thereof, it is preferable that the size of the first area 19a of the track buffer memory 19 for the first information signal "A" is set greater than the first memory-size reference value, and that the related empty value and the related full value are decided in view of the setting of the size of the first memory area 19a. Similarly, it is preferable that the size of the second area 19b of the track buffer memory 19 for the second information signal "B" is set greater than the second memory-size reference value, and that the related empty value and the related full value are decided in view of the setting of the size of the second memory area 19b.

The term "(Rp−Ra)·Ra·(Tab+Tba+Fab+Fba)/(Rp−Ra−Rb)" in the relation (14a) means a third memory-size reference value for the first information signal "A". Similarly, the term "(Rp−Rb)·Rb·(Tab+Tba+Fab+Fba)/(Rp−Ra−Rb)" in the relation (14a) means a fourth memory-size reference value for the second information signal "B". As previously mentioned, the relation (14a) is good for the case where the first areas 13a extend on one of the signal recording layers L0 and L1 of the optical disc 13 while the second areas 13b extend on the other signal recording layer. According to the relation (14a), for the simultaneous and continuous playback of the contents of the first and second information signals "A" and "B" or the simultaneous and continuous recording thereof, it is preferable that the size of the first area 19a of the track buffer memory 19 for the first information signal "A" is set greater than the third memory-size reference value, and that the related empty value and the related full value are decided in view of the setting of the size of the first memory area 19a. Similarly, it is preferable that the size of the second area 19b of the track buffer memory 19 for the second information signal "B" is set greater than the fourth memory-size reference value, and that the related empty value and the related full value are decided in view of the setting of the size of the second memory area 19b.

To provide a system margin for allowing a retry process and a shock-proof memory function, it is preferable that the minimum capacity Ym of the track buffer memory 19 exceeds the value defined by the right-hand side of the relation (14) or (14a).

It should be noted that a portion of the buffer memory 21 connected to the audio-vide encoding and decoding unit 20 may be used as a track buffer memory substituting for the track buffer memory 19. The track buffer memory 19 may contain a part of the buffer memory 21. Either the track buffer memory 19 or a portion of the buffer memory 21 may be selectively used as an effective track buffer memory depending on the use conditions thereof.

The track buffer memory 19 absorbs the differences between the predetermined constant transfer rate Rp and the transfer rates Ra and Rb, that is, the differences between the reproduced-signal transfer rate determined by the optical pickup 14 and the transfer rates related to the information signals transmitted between the track buffer memory 19 and the audio-video encoding and decoding unit 20. In a preferable way, two basic areas for the first information signal "A" and the second information signal "B" are provided in the track buffer memory 19, and the remaining area of the track buffer memory 19 is divided into two portions assigned to the first information signal "A" and the second information signal "B" respectively. The division-resultant two portions are referred to as additive areas. One basic area plus one additive area are assigned to the first information signal "A". Similarly, another basic area and another additive area are assigned to the second information signal "B". The ratio in size between the additive areas is substantially equal to that between the basic areas. The additive areas provide margins to track buffers for the first and second information signals "A" and "B", respectively.

For example, the first area 19a and the second area 19b are provided in the track buffer memory 19 as follows. In the case where the transfer rate Ra for the first information signal "A" is set to 8 Mbps, a first basic area of 32 MB for the first information signal "A" is provided in the track buffer memory 19. In the case where the transfer rate Rb for the second information signal "B" is set to 4 Mbps, a second basic area of 16 MB for the second information signal "B" is provided in the track buffer memory 19. The remaining 16-MB area of the track buffer memory 19 is divided into a first portion (a first additive area) of about 10 MB and a second portion (a second additive area) of about 5 MB. The first basic area and the first additive area are combined into the first memory area 19a for the first information signal "A". The first memory area 19a has a size of about 42 MB. The second basic area and the second additive area are combined into the second memory area 19b for the second information signal "B". The second memory area 19b has a size of about 21 MB. This memory division enables the track buffer memory 19 to be efficiently used. The above-mentioned designing of the track buffer memory 19 is effective in executing the simultaneous and continuous playback of the contents of the two information signals "A" and "B" or the simultaneous and continuous recording thereof.

The system controller 22 provides the first and second areas 19a and 19b in the track buffer memory 19 in response to the two-signal-playback start command signal and the information of the transfer rates Ra and Rb. During a one-signal playback mode of operation of the apparatus 10A, the track buffer memory 19 is used as a non-partitioned 64-MB memory. Thus, during the one-signal playback mode of operation of the apparatus 10A, the playability including the retry performance can be enhanced. Preferably, the system controller 22 checks data in the track buffer memory 19 when receiving the two-signal-playback start command signal. The system controller 22 implements the division of the track buffer memory 19 into the first and second areas 19a and 19b after confirming the absence of data from the track buffer memory 19 which are being reproduced or recorded. During the two-signal-playback mode of operation of the apparatus 10A, when the transfer rates Ra and Rb for the information signals "A" and "B" are changed, the system controller 22 checks data in the track buffer memory 19. In this case, the system controller 22 redivides the track buffer memory 19 after confirming the absence of data from the track buffer memory 19 which are being reproduced or recorded. Thus, the margins of the track buffer memory 19 remain optimized even when the transfer rates Ra and Rb for the information signals "A" and "B" are changed.

Preferably, the maximum values Tmax of the seek times Tab and Tba related to the optical pickup 14 are equal to each other. The maximum seek time Tmax is equal to, for example, 0.5 second. When the maximum seek time Tmax is used for the seek times Tab and Tba, the previously-indicated relation (9) is changed into the following version.

$$(Ya+Yb) \geq Rp \cdot (Ra+Rb) \cdot 2Tmax/(Rp-Ra-Rb) \tag{19}$$

When the maximum seek time Tmax is equal to 0.5 second, the relation (19) is rewritten as follows.

$$(Ya+Yb) \geq Rp \cdot (Ra+Rb)/(Rp-Ra-Rb) \tag{20}$$

The relations (19) and (20) are good for the case where the first areas 13a and the second areas 13b extend on one of the signal recording layers L0 and L1 of the optical disc 13. Preferably, the size (the total number of bits) Ya of the first information signal "A" on each of the first areas 13a of the optical disc 13 and the size (the total number of bits) Yb of the second information signal "B" on each of the second areas 13b of the optical disc 13 are chosen to satisfy the relation (19) or (20).

Preferably, the maximum values Fmax of the focus-jump seek times Fab and Fba related to the optical pickup 14 are equal to each other. The maximum focus-jump seek time Fmax is equal to, for example, 0.2 second. When the maximum seek time Tmax is used for the seek times Tab and Tba and the maximum focus-jump seek time Fmax is used for the focus-jump seek times Fab and Fba, the previously-indicated relation (9a) is changed into the following version.

$$(Ya+Yb) \geq Rp \cdot (Ra+Rb) \cdot 2(Tmax+Fmax)/(Rp-Ra-Rb) \tag{19a}$$

When the maximum seek time Tmax and the maximum focus-jump seek time Fmax are equal to 0.5 second and 0.2 second respectively, the relation (19a) is rewritten as follows.

$$(Ya+Yb) \geq 1.4Rp \cdot (Ra+Rb)/(Rp-Ra-Rb) \tag{20a}$$

The relations (19a) and (20a) are good for the case where the first areas 13a extend on one of the signal recording layers L0 and L1 of the optical disc 13 while the second areas 13b extend on the other signal recording layer. Preferably, the size (the total number of bits) Ya of the first information signal "A" on each of the first areas 13a of the optical disc 13 and the size (the total number of bits) Yb of the second information signal "B" on each of the second areas 13b of the optical disc 13 are chosen to satisfy the relation (19a) or (20a).

Two-Signal Recording Mode

Figure 12:
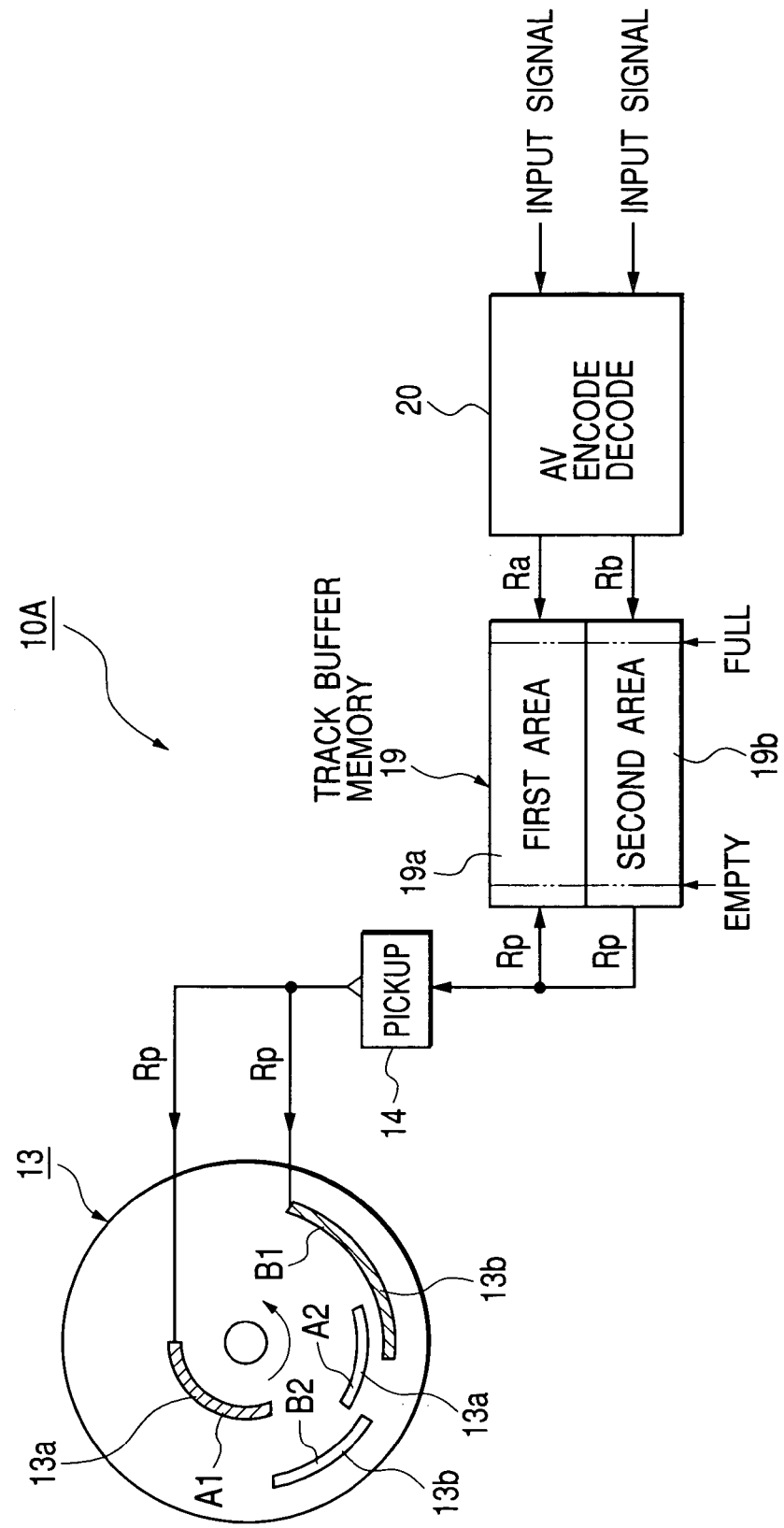
FIG. 12 is a diagram of a portion of the apparatus in FIG. 1 which is operating in a two-signal recording mode.

FIG. 12 shows a portion of the apparatus 10A which is operating in a two-signal recording mode. The amplifier unit 16 and the signal processor 18 (see FIG. 1) are omitted from FIG. 12 for a better understanding.

With reference to FIG. 12, the first information signal "A" is transmitted from the audio-video encoding and decoding unit 20 to the first area 19a in the track buffer memory 19 at the first transfer rate Ra. The second information signal "B" is transmitted from the audio-vide encoding and decoding unit 20 to the second area 19b in the track buffer memory 19 at the second transfer rate Rb. Generally, the transmission of the first information signal "A" to the track buffer memory 19 and the transmission of the second information signal "B" to the track buffer memory 19 are implemented on a time sharing basis. The first information signal "A" is transmitted from the first area 19a in the track buffer memory 19 to the optical pickup 14 at the predetermined constant transfer rate Rp. The second information signal "B" is transmitted from the second area 19b in the track buffer memory 19 to the optical pickup 14 at the predetermined constant transfer rate Rp. The optical pickup head 14 records the first information signal "A" and the second information signal "B" on the first area 13a and the second area 13b of the optical disc 13 respectively on a time sharing basis and at the predetermined constant transfer rate Rp. In the case where the first area 13a and the second area 13b extend on the signal recording layers L0 and L1 of the optical disc 13 respectively, the optical pickup 14 executes a focus jump during the recording of the information signals "A" and "B" on the optical disc 13. The predetermined constant transfer rate Rp is higher than the first and second transfer rates Ra and Rb.

The optical disc 13 is of the rewritable type. The optical disc 13 is previously provided with the first areas 13a for storing the respective blocks of the first information signal "A". In addition, the optical disc 13 is previously provided with the second areas 13b for storing the respective blocks of the second information signal "B". The second areas 13b are separate from the first areas 13a.

According to a first example, the first areas 13a and the second areas 13b extend on the signal recording layer L0 in the optical disc 13. According to a second example, the first areas 13a and the second areas 13b extend on the signal recording layer L1 in the optical disc 13. According to a third example, the first areas 13a extend on the signal recording layer L0 in the optical disc 13 while the second areas 13b extend on the signal recording layer L1 therein. According to a fourth example, the first areas 13a extend on the signal recording layer L1 in the optical disc 13 while the second areas 13b extend on the signal recording layer L0 therein.

The first areas 13a of the optical disc 13 are given addresses A1, A2, A3, ..., respectively. Thus, the first areas 13a are also referred to as the first areas A1, A2, A3, .... The blocks of the first information signal "A" are recorded on the first areas A1, A2, A3, ..., respectively. Preferably, the size Ya of the blocks of the first information signal "A" is equal to the size of the first areas A1, A2, A3, .... The placement of the first areas 13a is designed to meet requirements for a seek time. The second areas 13b of the optical disc 13 are given addresses B1, B2, B3, ..., respectively. Thus, the second areas 13b are also referred to as the second areas B1, B2, B3, .... The blocks of the second information signal "B" are recorded on the second areas B1, B2, B3, ..., respectively. Preferably, the size Yb of the blocks of the second information signal "B" is equal to the size of the second areas B1, B2, B3, .... The placement of the second areas 13b is designed to meet requirements for a seek time.

First, a block of the first information signal "A" is recorded on first one A1 (the first area 13a given the address A1) of the first areas 13a. Second, a block of the second information signal "B" is recorded on first one B1 (the second area 13b given the address B1) of the second areas 13b. The first area A1 and the second area B1 are located relative to each other so that the optical pickup 14 can move therebetween in a predetermined time. The predetermined time is equal to about 0.5 second in the case where the first area A1 and the second area B1 extend on one of the signal recording layers L0 and L1 of the optical disc 13. The predetermined time is equal to about 0.7 second in the case where the first area A1 extends on one of the signal recording layers L0 and L1 of the optical disc 13 while the second area B1 extends on the other signal recording layer. Therefore, the maximum seek time during which the optical pickup 14 moves between the first area 13a and the second area 13b is equal to the predetermined time (for example, about 0.7 second).

During the two-signal recording mode of operation of the apparatus 10A, the audio-vide encoding and decoding unit 20 encodes the original information signals into the first and second information signals respectively. The first and second information signals "A" and "B" are transferred from the audio-video encoding and decoding unit 20 to the track buffer memory 19 at the rates Ra and Rb respectively. The rates Ra and Rb of the transfer of the first and second information signals "A" and "B" from the audio-video encoding and decoding unit 20 to the track buffer memory 19 can be selected from different values according to user's operation of the key input unit 23 (see FIG. 1). The different values include a transfer rate of 8 Mbps which corresponds to a high picture quality, a transfer rate of 4 Mbps which corresponds to a slightly high picture quality, and a transfer rate of 2 Mbps which corresponds to a normal picture quality. The first and second information signals "A" and "B" are temporarily stored in the first and second areas 19a and 19b of the track buffer memory 19, respectively. At an initial stage, the optical pickup 14 is in a stand-by state or a kick wait state while being located at a position corresponding to a target track on the optical disc 13. The system controller 22 (see FIG. 1) always monitors the degree of occupancy of each of the first and second memory areas 19a and 19b which varies between the related empty value and the related full value under normal conditions. When the degrees of occupancy of the first and second memory areas 19a and 19b reach the related full values, the first and second information signals "A" and "B" start to be alternately read out from the first and second memory areas 19a and 19b on a time sharing basis and at the predetermined constant transfer rate Rp. The optical pickup 14 alternately records the read-out information signals "A" and "B" on the first areas 13a and the second areas 13b of the optical disc 13 respectively on a time sharing basis and at the predetermined constant transfer rate Rp. In this way, the continuous and simultaneous recording of the original information signals is implemented.

Figure 13:
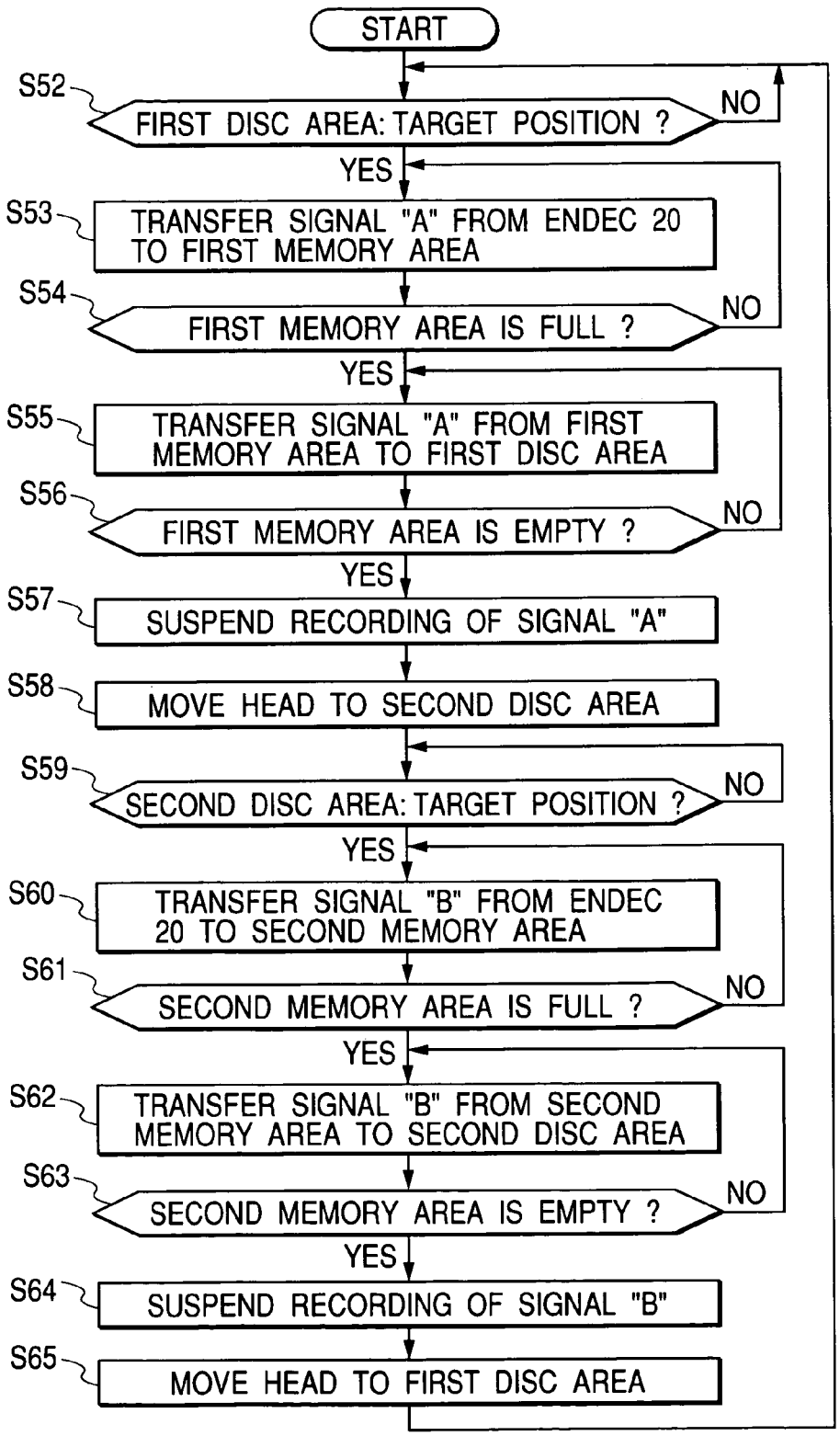
FIG. 13 is a flowchart of a segment of the control program for the system controller in FIG. 1 which relates to the two-signal recording mode of operation.

The system controller 22 operates in accordance with the control program stored in its internal ROM. FIG. 13 is a flowchart of a segment of the control program which relates to the two-signal recording mode of operation of the apparatus 10A. The program segment in FIG. 13 is started in response to a two-signal-recording start command signal fed from the key input unit 23.

With reference to FIG. 13, a first step S52 of the program segment decides whether or not the optical pickup 14 has reached a target position on the optical disc 13. Initially, the target position corresponds to first one A1 of the first areas 13a in the optical disc 13. When the optical pickup 14 has not reached the target position yet, the step S52 is repeated. When the optical pickup 14 has reached the target position, the program advances from the step S52 to a step S53.

The step S53 stores the first information signal "A", which is outputted from the audio-video encoding and decoding unit 20, into the first area 19a in the track buffer memory 19 at the transfer rate Ra.

A step S54 following the step S53 decides whether or not the degree of occupancy of the first area 19a in the track buffer memory 19 has reached the related full value. When the degree of occupancy of the first area 19a has not reached the related full value yet, the program returns from the step S54 to the step S53. When the degree of occupancy of the first area 19a has reached the related full value, the program advances from the step S54 to a step S55.

The step S55 transfers the first information signal "A" from the first area 19a in the track buffer memory 19 to the optical pickup 14 at the predetermined constant transfer rate Rp. The step S55 enables the optical pickup 14 to record the first information signal "A" on the present first area 13a in the optical disc 13 at the predetermined constant transfer rate Rp.

A step S56 subsequent to the step S55 decides whether or not the degree of occupancy of the first area 19a in the track buffer memory 19 has reached the related empty value. When the degree of occupancy of the first area 19a has not reached the related empty value yet, the program returns from the step S56 to the step S55. When the degree of occupancy of the first area 19a has reached the related empty value, the program advances from the step S56 to a step S57.

The step S57 forces the optical pickup 14 to suspend or terminate the recording of the first information signal "A" on the present first area 13a in the optical disc 13.

A step S58 following the step S57 moves the optical pickup 14 toward a next target position. The next target position corresponds to, for example, first one B1 of the second areas 13b in the optical disc 13. After the step S58, the program advances to a step S59.

The step S59 decides whether or not the optical pickup 14 has reached the target position on the optical disc 13. When the optical pickup 14 has not reached the target position yet, the step S59 is repeated. When the optical pickup 14 has reached the target position, the program advances from the step S59 to a step S60.

Thus, the optical pickup 14 moves from the first area 13a to the second area 13b in the optical disc 13. The seek time related to this movement of the optical pickup 14 is equal to, for example, about 0.7 second or shorter. Specifically, in the case where both the first area 13a and the second area 13b extend on one of the signal recording layers L0 and L1 of the optical disc 13, the seek time related to that movement of the optical pickup 14 agrees with the intra-layer seek time Tab. The intra-layer seek time Tab is equal to, for example, about 0.5 second or shorter. In the case where the first area 13a extends on one of the signal recording layers L0 and L1 of the optical disc 13 while the second area 13b extends on the other signal recording layer, the seek time related to that movement of the optical pickup 14 agrees with the intra-layer seek time Tab plus an inter-layer seek time Fab. The inter-layer seek time Fab means a time interval taken by the optical pickup 14 to implement a focus jump between the signal recording layers L0 and L1 of the optical disc 13 along a vertical direction (a focus direction). The inter-layer seek time Fab is equal to, for example, about 0.2 second or shorter.

The step S60 stores the second information signal "B", which is outputted from the audio-video encoding and decoding unit 20, into the second area 19b in the track buffer memory 19 at the transfer rate Rb.

A step S61 following the step S60 decides whether or not the degree of occupancy of the second area 19b in the track buffer memory 19 has reached the related full value. When the degree of occupancy of the second area 19b has not reached the related full value yet, the program returns from the step S61 to the step S60. When the degree of occupancy of the second area 19b has reached the related full value, the program advances from the step S61 to a step S62.

The step S62 transfers the second information signal "B" from the second area 19b in the track buffer memory 19 to the optical pickup 14 at the predetermined constant transfer rate Rp. The step S62 enables the optical pickup 14 to record the second information signal "B" on the present second area 13b in the optical disc 13 at the predetermined constant transfer rate Rp.

A step S63 subsequent to the step S62 decides whether or not the degree of occupancy of the second area 19b in the track buffer memory 19 has reached the related empty value. When the degree of occupancy of the second area 19b has not reached the related empty value yet, the program returns from the step S63 to the step S62. When the degree of occupancy of the second area 19b has reached the related empty value, the program advances from the step S63 to a step S64.

The step S64 forces the optical pickup 14 to suspend or terminate the recording of the second information signal "B" on the present second area 13b in the optical disc 13.

A step S65 following the step S64 moves the optical pickup 14 toward a next target position. The next target position corresponds to, for example, second one A2 of the first areas 13a in the optical disc 13. After the step S65, the program returns to the step S52.

Thus, the optical pickup 14 moves from the second area 13b to the first area 13a in the optical disc 13. The seek time related to this movement of the optical pickup 14 is equal to, for example, about 0.7 second or shorter. Specifically, in the case where both the first area 13a and the second area 13b extend on one of the signal recording layers L0 and L1 of the optical disc 13, the seek time related to that movement of the optical pickup 14 agrees with an intra-layer seek time Tba. The intra-layer seek time Tba is equal to, for example, about 0.5 second or shorter. In the case where the first area 13a extends on one of the signal recording layers L0 and L1 of the optical disc 13 while the second area 13b extends on the other signal recording layer, the seek time related to that movement of the optical pickup 14 agrees with the intra-layer seek time Tba plus an inter-layer seek time Fba. The inter-layer seek time Fba means a time interval taken by the optical pickup 14 to implement a focus jump between the signal recording layers L0 and L1 of the optical disc 13 along a vertical direction (a focus direction). The inter-layer seek time Fba is equal to, for example, about 0.2 second or shorter.

During the repetitive execution of the program segment in FIG. 13, the target position of the optical pickup 14 is sequentially set into correspondence with the first and second areas A1, B1, A2, B2, A3, B3, . . . in the optical disc 13. Therefore, the optical pickup 14 alternately records the first information signal "A" and the second information signal "B" on the first and second areas 13a and 13b of the optical disc 13 in the order as "A1, B1, A2, B2, A3, B3, . . . ".

Preferably, the step S57 or the step S64 is followed by a step which decides whether or not both the recording of the first information signal "A" on the optical disc 13 and the recording of the second information signal "B" thereon are required to be suspended. In this case, when both the recording of the first information signal "A" on the optical disc 13 and the recording of the second information signal "B" thereon are required to be suspended, the optical pickup 14 is controlled to implement the required suspension of recording.

It is preferable to provide the optical disc 13 with a management area separate from the first and second areas 13a and 13b. For example, the management area extends in an innermost portion of the optical disc 13. After the recording of the first and second information signals "A" and "B" on the first and second areas 13a and 13b in the optical disc 13 has been completed, address information of the bocks of the first and second information signals "A" and "B" on the first and second areas 13a and 13b is recorded on the management area in the optical disc 13. Information of the first and second transfer rates Ra and Rb may also be recorded on the management area in the optical disc 13.

Figure 14:
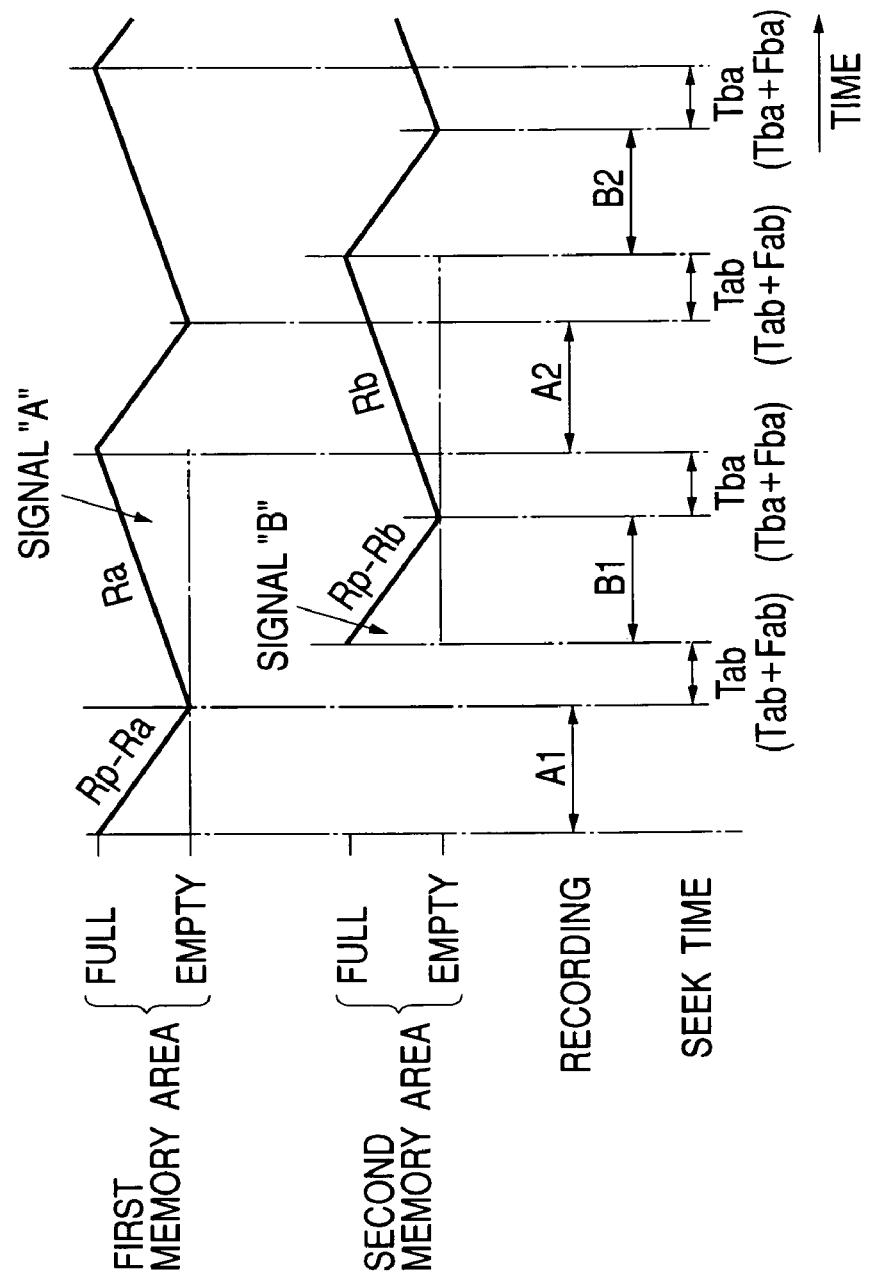
FIG. 14 is a time-domain diagram of the degrees of occupancy of the first and second areas in the track buffer memory in FIG. 1 which occur during the two-signal recording mode of operation.

With reference to FIG. 14, after the degree of occupancy of the first area 19a in the track buffer memory 19 reaches the related full value, the first information signal "A" is transmitted from the memory area 19a to the first area A1 in the optical disc 13 at the predetermined constant transfer rate Rp and the first information signal "A" is stored into the memory area 19a from the audio-video encoding and decoding unit 20 at the transfer rate Ra. Thus, during this stage, the degree of occupancy of the memory area 19a decreases at a rate corresponding to "Rp−Ra".

When the degree of occupancy of the memory area 19a reaches the related empty value, the transmission of the first information signal "A" from the memory area 19a to the first area A1 in the optical disc 13 is suspended or terminated. Then, the optical pickup 14 is moved to a position corresponding to the second area B1 in the optical disc 13. The seek time (Tab or Tab+Fab) related to this movement of the optical pickup 14 is equal to or shorter than, for example, about 0.7 second. The second information signal "B" is stored into the second area 19b of the track buffer memory 19 from the audio-video encoding and decoding unit 20 at the transfer rate Rb. Even after the degree of occupancy of the memory area 19a reaches the related empty value, the first information signal "A" continues to be stored into the memory area 19a from the audio-vide encoding and decoding unit 20 at the transfer rate Ra. Thus, during this stage, the degree of occupancy of the memory area 19a increases at a rate corresponding to "Ra". The degree of occupancy of the memory area 19a reaches the related full value before the optical pickup 14 starts accessing the first area A2 in the optical disc 13.

After the degree of occupancy of the second area 19b in the track buffer memory 19 reaches the related full value, the second information signal "B" is transmitted from the memory area 19b to the second area B1 in the optical disc 13 at the predetermined constant transfer rate Rp and the second information signal "B" is stored into the memory area 19b from the audio-video encoding and decoding unit 20 at the transfer rate Rb. Thus, during this stage, the degree of occupancy of the memory area 19b decreases at a rate corresponding to "Rp−Rb".

When the degree of occupancy of the memory area 19b reaches the related empty value, the transmission of the second information signal "B" from the memory area 19b to the second area B1 in the optical disc 13 is suspended or terminated. Then, the optical pickup 14 is moved to a position corresponding to the first area A2 in the optical disc 13. The seek time (Tba or Tba+Fba) related to this movement of the optical pickup 14 is equal to or shorter than, for example, about 0.7 second. Even after the degree of occupancy of the memory area 19b reaches the related empty value, the second information signal "B" continues to be stored into the memory area 19b from the audio-vide encoding and decoding unit 20 at the transfer rate Rb. Thus, during this stage, the degree of occupancy of the memory area 19b increases at a rate corresponding to "Rb". The degree of occupancy of the memory area 19b reaches the related full value before the optical pickup 14 starts accessing the second area B2 in the optical disc 13.

There are parameters including the transfer rate Ra, the transfer rate Rb, the transfer rate Rp, the size Ya of each block of the first information signal "A" on one first area 13a in the optical disc 13, the size Yb of each block of the second information signal "B" on one second area 13b in the optical disc 13, the intra-layer seek time Tab related to the movement of the optical pickup 14 from a first area 13a to a second area 13b of the optical disc 13, the inter-layer seek time (the focus-jump seek time) Fab related to the movement of the optical pickup 14 from the first area 13a to the second area 13b of the optical disc 13, the intra-layer seek time Tba related to the movement of the optical pickup 14 from a second area 13b to a first area 13a of the optical disc 13, the inter-layer seek time (the focus-jump seek time) Fba related to the movement of the optical pickup 14 from the second area 13b to the first area 13a of the optical disc 13, and the minimum capacity Ym of the track buffer memory 19. Preferably, the parameters Ra, Rb, Rp, Ya, Yb, Tab, Fab, Tba, Fba, and Ym are chosen to satisfy the previously-indicated relations and equations (1)-(14) or (1)-(14a).

Signal Recording/Playback Mode

Figure 15:
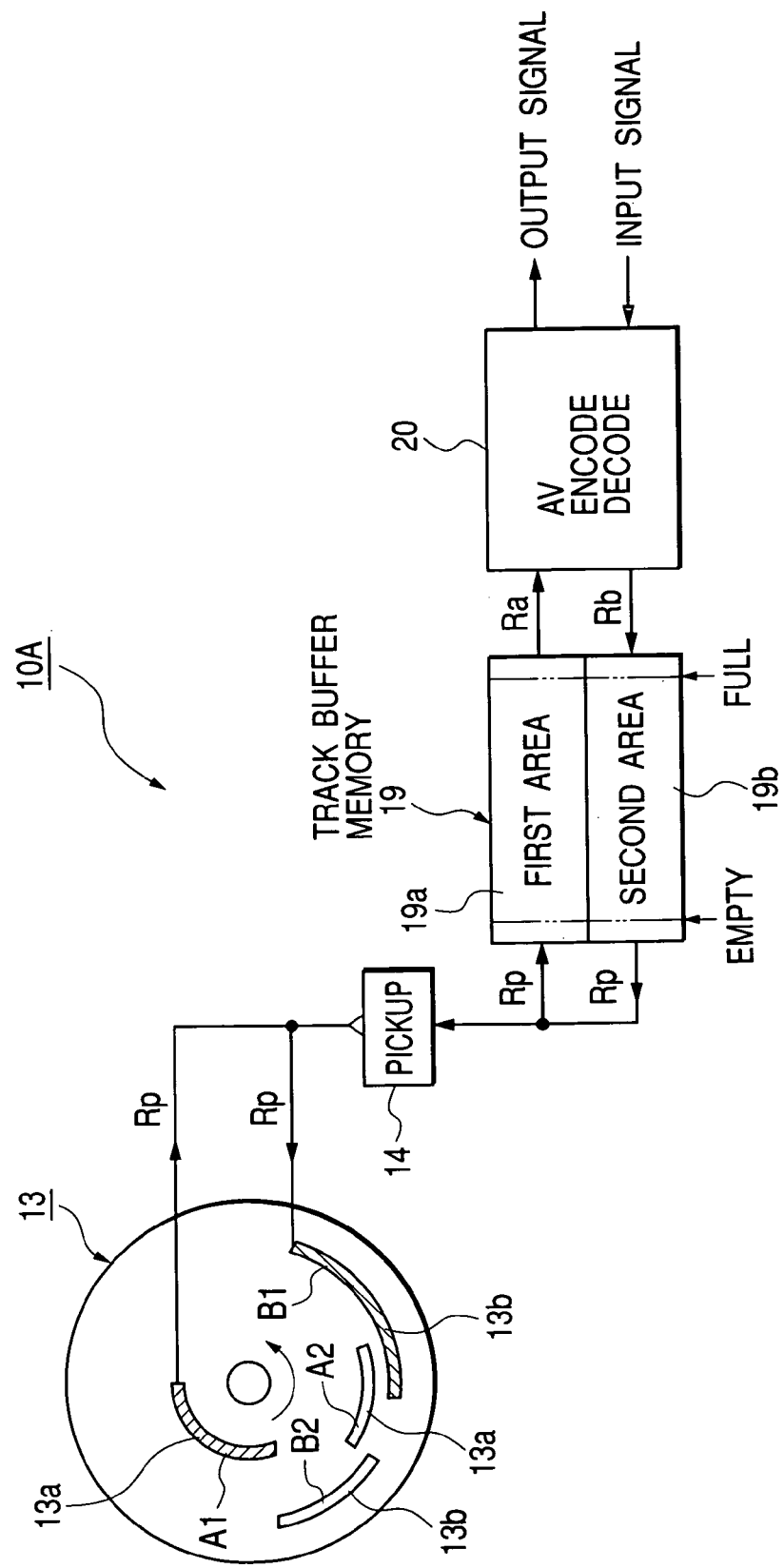
FIG. 15 is a diagram of a portion of the apparatus in FIG. 1 which is operating in a signal recording/playback mode.

FIG. 15 shows a portion of the apparatus 10A which is operating in a signal recording/playback mode. The amplifier unit 16 and the signal processor 18 (see FIG. 1) are omitted from FIG. 15 for a better understanding.

With reference to FIG. 15, the optical pickup 14 reproduces the first information signal "A" from the first areas 13a in the optical disc 13 at the predetermined constant transfer rate Rp. The first information signal "A" is transmitted from the optical pickup 14 to the first area 19a of the track buffer memory 19 at the predetermined constant transfer rate Rp. The first information signal "A" is transmitted from the first area 19a of the track buffer memory 19 to the audio-vide encoding and decoding unit 20 at the transfer rate Ra. On the other hand, the second information signal "B" is transmitted from the audio-video encoding and decoding unit 20 to the second area 19b of the track buffer memory 19 at the transfer rate Rb. The second information signal "B" is transmitted from the second area 19b of the track buffer memory 19 to the optical pickup 14 at the predetermined constant transfer rate Rp. The optical pickup 14 records the second information signal "B" on the second areas 13b in the optical disc 13 at the predetermined constant transfer rate Rp. The optical pickup 14 alternately accesses the first and second areas 13a and 13b of the optical disc 13 on a time sharing basis so that the playback of the contents of the first information signal "A" and the recording of the contents of the second information signal "B" can be virtually simultaneously implemented.

The optical disc 13 is of the rewritable type. The optical disc 13 is previously provided with the first areas 13a for storing the respective blocks of the first information signal "A". In addition, the optical disc 13 is previously provided with the second areas 13b for storing the respective blocks of the second information signal "B". The second areas 13b are separate from the first areas 13a.

According to a first example, the first areas 13a and the second areas 13b extend on the signal recording layer L0 in the optical disc 13. According to a second example, the first areas 13a and the second areas 13b extend on the signal recording layer L1 in the optical disc 13. According to a third example, the first areas 13a extend on the signal recording layer L0 in the optical disc 13 while the second areas 13b extend on the signal recording layer L1 therein. According to a fourth example, the first areas 13a extend on the signal recording layer L1 in the optical disc 13 while the second areas 13b extend on the signal recording layer L0 therein.

The first areas 13a of the optical disc 13 are given addresses A1, A2, A3, ..., respectively. Thus, the first areas 13a are also referred to as the first areas A1, A2, A3, .... The blocks of the first information signal "A" are recorded on the first areas A1, A2, A3, ..., respectively. Preferably, the size Ya of the blocks of the first information signal "A" is equal to the size of the first areas A1, A2, A3, .... The placement of the first areas 13a is designed to meet requirements for a seek time. The second areas 13b of the optical disc 13 are given addresses B1, B2, B3, ..., respectively. Thus, the second areas 13b are also referred to as the second areas B1, B2, B3, .... The blocks of the second information signal "B" are recorded on the second areas B1, B2, B3, ..., respectively. Preferably, the size Yb of the blocks of the second information signal "B" is equal to the size of the second areas B1, B2, B3, . . . . The placement of the second areas 13b is designed to meet requirements for a seek time.

First, a block of the first information signal "A" is reproduced from first one A1 (the first area 13a given the address A1) of the first areas 13a. Second, a block of the second information signal "B" is recorded on first one B1 (the second area 13b given the address B1) of the second areas 13b. The first area A1 and the second area B1 are located relative to each other so that the optical pickup 14 can move therebetween in a predetermined time. The predetermined time is equal to about 0.5 second in the case where the first area A1 and the second area B1 extend on one of the signal recording layers L0 and L1 of the optical disc 13. The predetermined time is equal to about 0.7 second in the case where the first area A1 extends on one of the signal recording layers L0 and L1 of the optical disc 13 while the second area B1 extends on the other signal recording layer. Therefore, the maximum seek time during which the optical pickup 14 moves between the first area 13a and the second area 13b is equal to the predetermined time (for example, about 0.7 second).

During the signal-recording/playback mode of operation of the apparatus 10A, the system controller 22 (see FIG. 1) always monitors the degree of occupancy of each of the first and second memory areas 19a and 19b which varies between the related empty value and the related full value under normal conditions.

Figure 16:
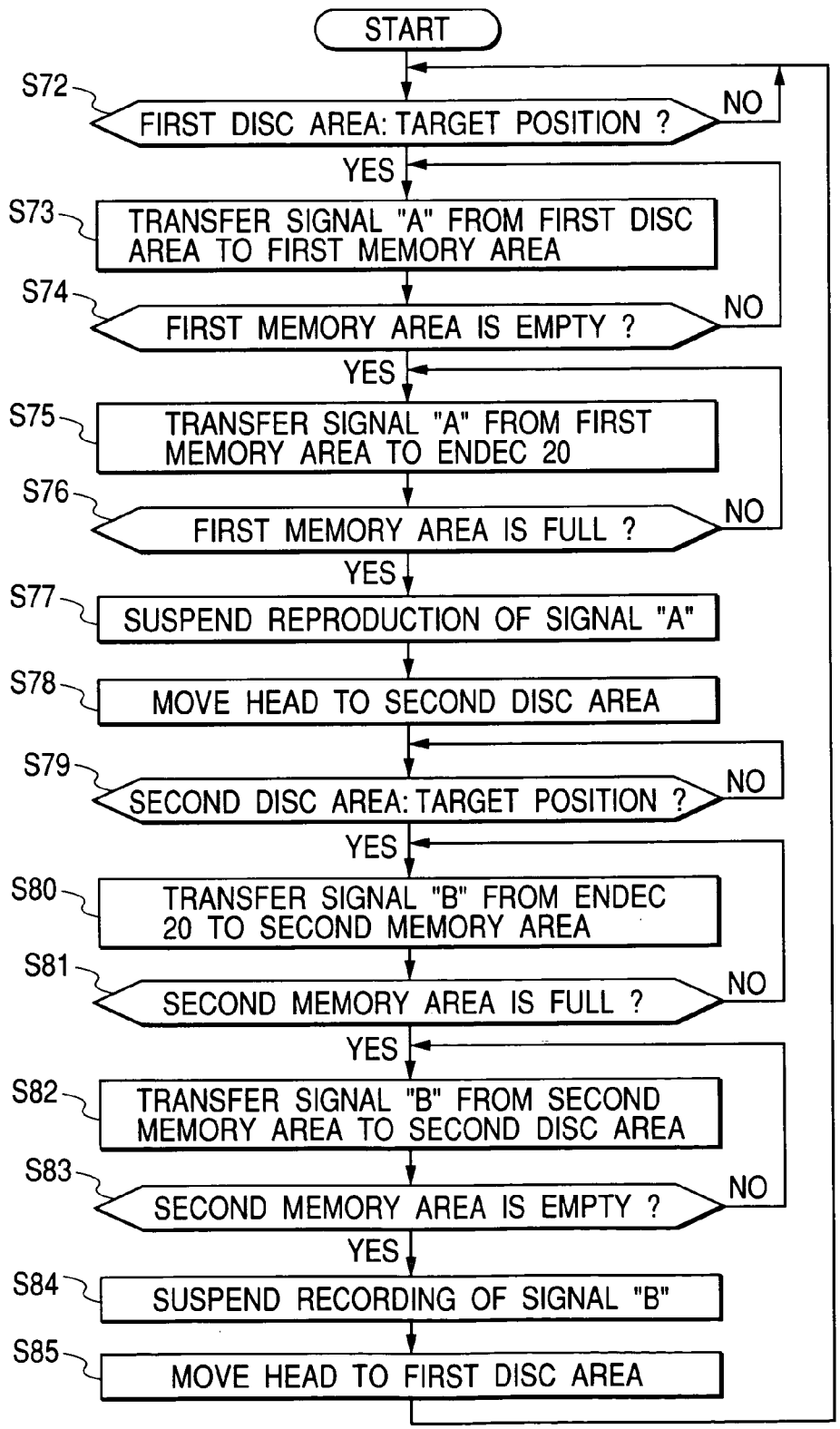
FIG. 16 is a flowchart of a segment of the control program for the system controller in FIG. 1 which relates to the signal recording/playback mode of operation.

The system controller 22 operates in accordance with the control program stored in its internal ROM. FIG. 16 is a flowchart of a segment of the control program which relates to the signal recording/playback mode of operation of the apparatus 10A. The program segment in FIG. 16 is started in response to a signal-recording/playback start command signal fed from the key input unit 23 (see FIG. 1).

With reference to FIG. 16, a first step S72 of the program segment decides whether or not the optical pickup 14 has reached a target position on the optical disc 13. Initially, the target position corresponds to first one A1 of the first areas 13a in the optical disc 13. When the optical pickup 14 has not reached the target position yet, the step S72 is repeated. When the optical pickup 14 has reached the target position, the program advances from the step S72 to a step S73.

The step S73 enables the optical pickup 14 to reproduce the first information signal "A" from the present first area 13a in the optical disc 13 at the predetermined constant transfer rate Rp. The step S73 stores the reproduced first information signal "A" into the first area 19a in the track buffer memory 19 at the predetermined constant transfer rate Rp.

A step S74 following the step S73 decides whether or not the degree of occupancy of the first area 19a in the track buffer memory 19 has reached the related empty value. When the degree of occupancy of the first area 19a has not reached the related empty value yet, the program returns from the step S74 to the step S73. When the degree of occupancy of the first area 19a has reached the related empty value, the program advances from the step S74 to a step S75.

Thus, during an initial stage, the first information signal "A" is transmitted from the first area A1 in the optical disc 13 to the first area 19a in the track buffer memory 19 at the predetermined constant transfer rate Rp until the degree of occupancy of the memory area 19a increases to the related empty value.

The step S75 transfers the first information signal "A" from the first area 19a in the track buffer memory 19 to the audio-video encoding and decoding unit 20 at the transfer rate Ra.

A step S76 subsequent to the step S75 decides whether or not the degree of occupancy of the first area 19a in the track buffer memory 19 has reached the related full value. When the degree of occupancy of the first area 19a has not reached the related full value yet, the program returns from the step S76 to the step S75. When the degree of occupancy of the first area 19a has reached the related full value, the program advances from the step S76 to a step S77.

The step S77 forces the optical pickup 14 to suspend or terminate the reproduction of the first information signal "A" from the present first area 13a in the optical disc 13.

A step S78 following the step S77 moves the optical pickup 14 toward a next target position. The next target position corresponds to, for example, first one B1 of the second areas 13b in the optical disc 13. After the step S78, the program advances to a step S79.

The step S79 decides whether or not the optical pickup 14 has reached the target position on the optical disc 13. When the optical pickup 14 has not reached the target position yet, the step S79 is repeated. When the optical pickup 14 has reached the target position, the program advances from the step S79 to a step S80.

Thus, the optical pickup 14 moves from the first area 13a to the second area 13b in the optical disc 13. The seek time related to this movement of the optical pickup 14 is equal to, for example, about 0.7 second or shorter. Specifically, in the case where both the first area 13a and the second area 13b extend on one of the signal recording layers L0 and L1 of the optical disc 13, the seek time related to that movement of the optical pickup 14 agrees with an intra-layer seek time Tab. The intra-layer seek time Tab is equal to, for example, about 0.5 second or shorter. In the case where the first area 13a extends on one of the signal recording layers L0 and L1 of the optical disc 13 while the second area 13b extends on the other signal recording layer, the seek time related to that movement of the optical pickup 14 agrees with the intra-layer seek time Tab plus an inter-layer seek time Fab. The inter-layer seek time Fab means a time interval taken by the optical pickup 14 to implement a focus jump between the signal recording layers L0 and L1 of the optical disc 13 along a vertical direction (a focus direction). The inter-layer seek time Fab is equal to, for example, about 0.2 second or shorter.

The step S80 stores the second information signal "B", which is outputted from the audio-video encoding and decoding unit 20, into the second area 19b in the track buffer memory 19 at the transfer rate Rb.

A step S81 following the step S80 decides whether or not the degree of occupancy of the second area 19b in the track buffer memory 19 has reached the related full value. When the degree of occupancy of the second area 19b has not reached the related full value yet, the program returns from the step S81 to the step S80. When the degree of occupancy of the second area 19b has reached the related full value, the program advances from the step S81 to a step S82.

The step S82 transfers the second information signal "B" from the second area 19b in the track buffer memory 19 to the optical pickup 14 at the predetermined constant transfer rate Rp. The step S82 enables the optical pickup 14 to record the second information signal "B" on the present second area 13b in the optical disc 13 at the predetermined constant transfer rate Rp.

A step S83 subsequent to the step S82 decides whether or not the degree of occupancy of the second area 19b in the track buffer memory 19 has reached the related empty value. When the degree of occupancy of the second area 19b has not reached the related empty value yet, the program returns from the step S83 to the step S82. When the degree of occupancy of the second area 19b has reached the related empty value, the program advances from the step S83 to a step S84.

The step S84 forces the optical pickup 14 to suspend or terminate the recording of the second information signal "B" on the present second area 13b in the optical disc 13.

A step S85 following the step S84 moves the optical pickup 14 toward a next target position. The next target position corresponds to, for example, second one A2 of the first areas 13a in the optical disc 13. After the step S85, the program returns to the step S72.

Thus, the optical pickup 14 moves from the second area 13b to the first area 13a in the optical disc 13. The seek time related to this movement of the optical pickup 14 is equal to, for example, about 0.7 second or shorter. Specifically, in the case where both the first area 13a and the second area 13b extend on one of the signal recording layers L0 and L1 of the optical disc 13, the seek time related to that movement of the optical pickup 14 agrees with an intra-layer seek time Tba. The intra-layer seek time Tba is equal to, for example, about 0.5 second or shorter. In the case where the first area 13a extends on one of the signal recording layers L0 and L1 of the optical disc 13 while the second area 13b extends on the other signal recording layer, the seek time related to that movement of the optical pickup 14 agrees with the intra-layer seek time Tba plus an inter-layer seek time Fba. The inter-layer seek time Fba means a time interval taken by the optical pickup 14 to implement a focus jump between the signal recording layers L0 and L1 of the optical disc 13 along a vertical direction (a focus direction). The inter-layer seek time Fba is equal to, for example, about 0.2 second or shorter.

During the repetitive execution of the program segment in FIG. 16, the target position of the optical pickup 14 is sequentially set into correspondence with the first and second areas A1, B1, A2, B2, A3, B3, . . . in the optical disc 13. Therefore, the optical pickup 14 alternately reproduces the first information signal "A" and records the second information signal "B" while accessing the first and second areas 13a and 13b of the optical disc 13 in the order as "A1, B1, A2, B2, A3, B3, . . . ".

Preferably, the step S77 or the step S84 is followed by a step which decides whether or not both the reproduction of the first information signal "A" from the optical disc 13 and the recording of the second information signal "B" thereon are required to be suspended. In this case, when both the reproduction of the first information signal "A" from the optical disc 13 and the recording of the second information signal "B" thereon are required to be suspended, the optical pickup 14 is controlled to implement the required suspension of reproduction and recording.

It is preferable to provide the optical disc 13 with a management area separate from the first and second areas 13a and 13b. For example, the management area extends in an innermost portion of the optical disc 13. After the recording of the second information signal "B" on the second areas 13b in the optical disc 13 has been completed, address information of the bocks of the second information signal "B" on the second areas 13b is recorded on the management area in the optical disc 13. Information of the transfer rate Rb may also be recorded on the management area in the optical disc 13.

Figure 17:
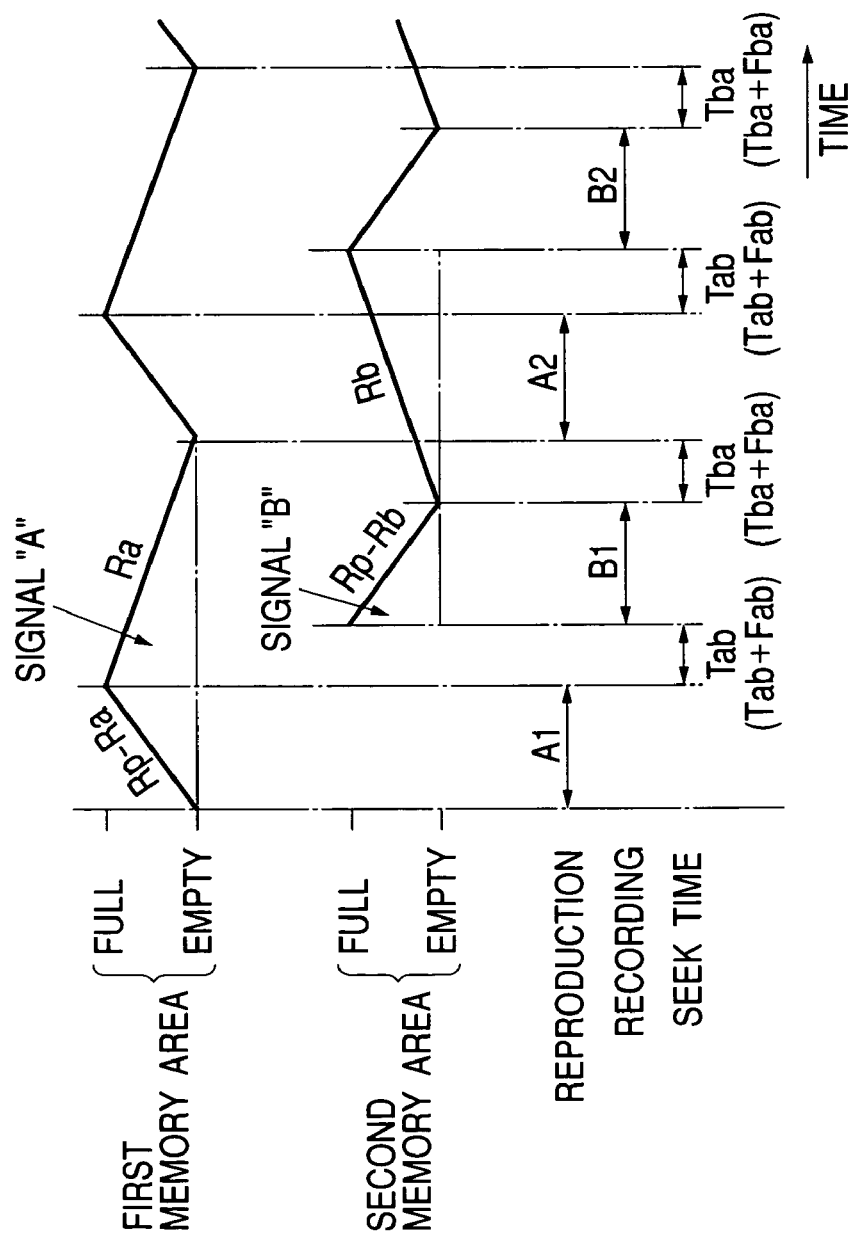
FIG. 17 is a time-domain diagram of the degrees of occupancy of the first and second areas in the track buffer memory in FIG. 1 which occur during the signal recording/playback mode of operation.

With reference to FIG. 17, after the degree of occupancy of the first area 19a in the track buffer memory 19 reaches the related empty value, the first information signal "A" is read out from the memory area 19a at the transfer rate Ra and the first information signal "A" is transmitted from the first area A1 in the optical disc 13 to the memory area 19a at the predetermined constant transfer rate Rp. Thus, during this stage, the degree of occupancy of the memory area 19a increases at a rate corresponding to "Rp–Ra".

When the degree of occupancy of the memory area 19a reaches the related full value, the transmission of the first information signal "A" from the first area A1 in the optical disc 13 to the memory area 19a is suspended or terminated. Then, the optical pickup 14 is moved to a position corresponding to the second area B1 in the optical disc 13. The seek time (Tab or Tab+Fab) related to this movement of the optical pickup 14 is equal to or shorter than, for example, about 0.7 second. Even after the degree of occupancy of the memory area 19a reaches the related full value, the first information signal "A" continues to be read out from the memory area 19a at the transfer rate Ra. Thus, during this stage, the degree of occupancy of the memory area 19a decreases at a rate corresponding to "Ra". The read-out of the first information signal "A", which relates to the optical-disc area A1, from the memory area 19a is completed before the optical pickup 14 starts accessing the first area A2 in the optical disc 13.

The second information signal "B" is stored into the second area 19b of the track buffer memory 19 from the audio-vide encoding and decoding unit 20 at the transfer rate Rb. After the degree of occupancy of the second area 19b in the track buffer memory 19 reaches the related full value, the second information signal "B" is transmitted from the memory area 19b to the second area B1 in the optical disc 13 at the predetermined constant transfer rate Rp and the second information signal "B" continues to be stored into the memory area 19b from the audio-vide encoding and decoding unit 20 at the transfer rate Rb. Thus, during this stage, the degree of occupancy of the memory area 19b decreases at a rate corresponding to "Rp–Rb".

When the degree of occupancy of the memory area 19b reaches the related empty value, the transmission of the second information signal "B" from the memory area 19b to the second area B1 in the optical disc 13 is suspended or terminated. Then, the optical pickup 14 is moved to a position corresponding to the first area A2 in the optical disc 13. The seek time (Tba or Tba+Fba) related to this movement of the optical pickup 14 is equal to or shorter than, for example, about 0.7 second. Even after the degree of occupancy of the memory area 19b reaches the related empty value, the second information signal "B" continues to be stored into the memory area 19b from the audio-video encoding and decoding unit 20 at the transfer rate Rb. Thus, during this stage, the degree of occupancy of the memory area 19b increases at a rate corresponding to "Rb". The degree of occupancy of the memory area 19b reaches the related full value before the optical pickup 14 starts accessing the second area B2 in the optical disc 13.

There are parameters including the transfer rate Ra, the transfer rate Rb, the transfer rate Rp, the size Ya of each block of the first information signal "A" on one first area 13a in the optical disc 13, the size Yb of each block of the second information signal "B" on one second area 13b in the optical disc 13, the intra-layer seek time Tab related to the movement of the optical pickup 14 from a first area 13a to a second area 13b of the optical disc 13, the inter-layer seek time (the focus-jump seek time) Fab related to the movement of the optical pickup 14 from the first area 13a to the second area 13b of the optical disc 13, the intra-layer seek time Tba related to the movement of the optical pickup 14 from a second area 13b to a first area 13a of the optical disc 13, the inter-layer seek time (the focus-jump seek time) Fba related to the movement of the optical pickup 14 from the second area 13b to the first area 13a of the optical disc 13, and the minimum capacity Ym of the track buffer memory 19. Preferably, the parameters Ra, Rb, Rp, Ya, Yb, Tab, Fab, Tba, Fba, and Ym are chosen to satisfy the previously-indicated relations and equations (1)-(14) or (1)-(14a).

The management area in the optical disc 13 stores information about optical-disc unoccupied areas which can be used for the recording of a new information signal. Preferably, the ROM within the system controller 22 is loaded with information representing the seek times Tab, Tba, Fab, and Fba, and the predetermined constant transfer rate Rp.

In the case where a second information signal "B" is requested to be recorded during the playback of a first information signal "A", the original information signal for the second information signal "B" is inputted into the apparatus 10A and the transfer rate Rb for the second information signal "B" is set in accordance with user's selection. At this time, the system controller 22 decides the size Yb of blocks of the second information signal "B" on the basis of the transfer rates Ra, Rb, and Rp, the seek times Tab, Tba, Fab, and Fba, and the information about the optical-disc unoccupied areas according to a set of the previously-indicated relations (9), (10), and (11) or a set of the previously-indicated relations (9a), (10a), and (11a).

In the event that the sizes of all the unoccupied areas in the optical disc 13 are smaller than the block size Yb of the second information signal "B", the transfer rate Rb is reduced from the designated value and the block size Yb is decreased accordingly so that resultant blocks of the second information signal "B" can be recorded on selected ones of the optical-disc unoccupied areas respectively. Preferably, the user is informed of the reduction in the transfer rate Rb. The recording of the second information signal "B" is implemented while the reduced transfer rate Rb is used.

Generally, the first and second information signals "A" and "B" contain video data. The first and second information signals "A" and "B" may contain audio data, music data, still-picture data, or sub-picture data.

It should be noted that the optical disc 13 may be replaced by a magnetic disc or a plurality of magnetic discs. In this case, an optical-disc drive portion of the apparatus 10A in FIG. 1 is replaced by a magnetic-disc drive portion.

An example of the magnetic-disc drive portion includes a plurality of magnetic heads for accessing magnetic discs each having a spiral track. The magnetic heads and the magnetic discs are periodically changed and selected to record and reproduce information signals on and from the magnetic discs. Each magnetic disc may have a set of concentric tracks.

Second Embodiment

Figure 18:
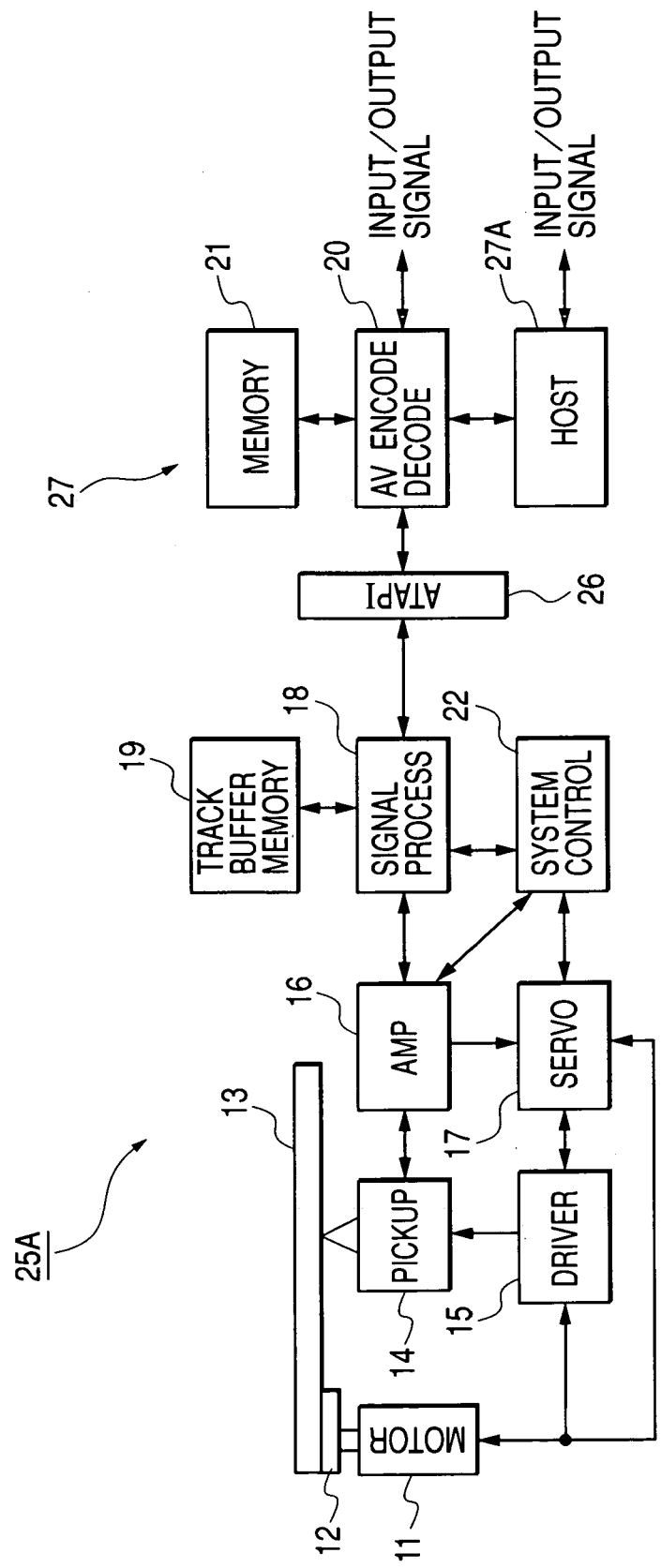
FIG. 18 is a block diagram of an information-signal communication system according to a second embodiment of this invention.

FIG. 18 shows an information-signal communication system according to a second embodiment of this invention. The system in FIG. 18 includes an information-signal recording and reproducing apparatus 25A. The apparatus 25A in FIG. 18 is similar to the apparatus 10A in FIG. 1 except for design changes indicated hereafter.

The apparatus 25A is designed as an optical-disc drive. The apparatus 25A includes a spindle motor 11, a turntable 12, an optical pickup (an optical head) 14, a driver 15, an amplifier unit 16, a servo unit 17, a signal processor 18, a track buffer memory 19, and a system controller 22. The devices 11, 12, 14, 15, 16, 17, 18, 19, and 22 are connected in a manner similar to that in the apparatus 10A of FIG. 1. The apparatus 25A further includes an ATAPI interface 26 connected to the signal processor 18.

A host computer or an external apparatus 27 can be connected with the apparatus 25A via the ATAPI interface 26. The apparatus 27 includes an audio-vide encoding and decoding unit 20, a buffer memory 21, and a host computer unit 27A. The buffer memory 21 and the host computer unit 27A are connected to the audio-video encoding and decoding unit 20. The audio-video encoding and decoding unit 20 can be connected with the signal processor 18 in the apparatus 25A via the ATAPI interface 26.

In more detail, the ATAPI interface 26 includes an interface block. The audio-video encoding and decoding unit 20 includes an interface block which can be connected with the interface block in the ATAPI interface 26. The apparatus 27 can control the apparatus (the optical-disc drive) 25A while using control signals in the Mt. Fuji command system. The host computer unit 27A in the apparatus 27 includes a ROM loaded with a computer program for controlling the apparatus 25A. This computer program may be transferred to a RAM within the host computer unit 27A from a CD-ROM or a DVD-ROM via a suitable disc drive.

In the case where first and second information signals "A" and "B" are requested to be recorded on an optical disc 13, the host computer unit 27A in the apparatus 27 transmits information of transfer rates Ra and Rb for the first and second information signals "A" and "B" (transfer-rate representing flags) to the apparatus 25A via the audio-video encoding and decoding unit 20 and the ATAPI interface 26. The audio-video encoding and decoding unit 20 in the apparatus 27 transmits the first and second information signals "A" and "B" to the signal processor 18 in the apparatus 25A via the ATAPI interface 26. In addition, the host computer unit 27A in the apparatus 27 transmits a recording start command signal and a recording start address signal to the apparatus 25A via the audio-video encoding and decoding unit 20 and the ATAPI interface 26. The apparatus (the optical-disc drive) 25A responds to the flags and the signals from the apparatus 27, and starts recording the first and second information signals "A" and "B" on the optical disc 13.

In the case where first and second information signals "A" and "B" are requested to be reproduced from an optical disc 13, the host computer unit 27A in the apparatus 27 transmits a playback start command signal to the apparatus 25A via the audio-video encoding and decoding unit 20 and the ATAPI interface 26. The apparatus 25A reproduces a signal (for example, management information, control data, or a video signal) from a predetermined-address portion of the optical disc 13 in response to the playback start command signal. The host computer unit 27A in the apparatus 27 receives the reproduced signal from the apparatus 25A via the ATAPI interface 26 and the audio-video encoding and decoding unit 20, and calculates transfer rates Ra and Rb on the basis of the reproduced signal. The host computer unit 27A in the apparatus 27 transmits information of the calculated transfer rates Ra and Rb (transfer-rate representing flags) to the apparatus 25A via the audio-video encoding and decoding unit 20 and the ATAPI interface 26. Then, the apparatus (the optical-disc drive) 25A reproduces the first and second information signals "A" and "B" from the optical disc 13 while using the transfer rates Ra and Rb.

It should be noted that the ATAPI interface 26 may be replaced by an IEEE1394 interface, a wireless interface, a radio-signal interface, or a light-signal interface.

Third Embodiment

Figure 19:
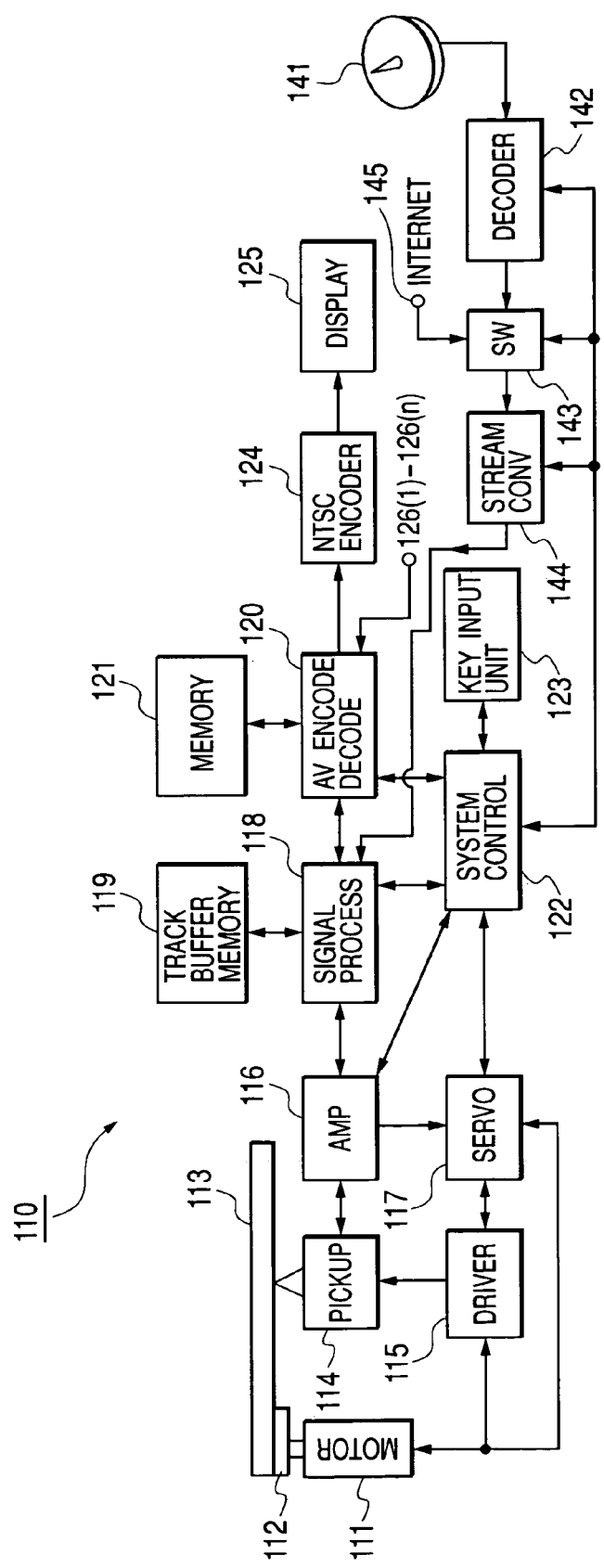
FIG. 19 is a block diagram of an information-signal recording and reproducing apparatus according to a third embodiment of this invention.

FIG. 19 shows an information-signal recording and reproducing apparatus 110 according to a third embodiment of this invention. The apparatus 110 operates on an information-signal recording medium including an optical disc having a plurality of signal recording layers. Examples of the optical disc are a DVD-RAM, a DVD-RW, and a DVD-RW. Alternatively, the information-signal recording medium may include a magnetic disc such as a hard disc or a flexible disc. The information-signal recording medium may include a semiconductor memory. The apparatus 110 is, for example, an optical-disc recorder/player.

As shown in FIG. 19, the apparatus 110 includes a spindle motor 111, and a turntable 112 connected to the shaft of the spindle motor 111. An optical disc (an information-signal recording medium) 113 can be placed on the turntable 112. The optical disc 113 has a plurality of signal recording layers which can be accessed from one side. The optical disc 113 is of either a type "1" or a type "2".

Figure 20:
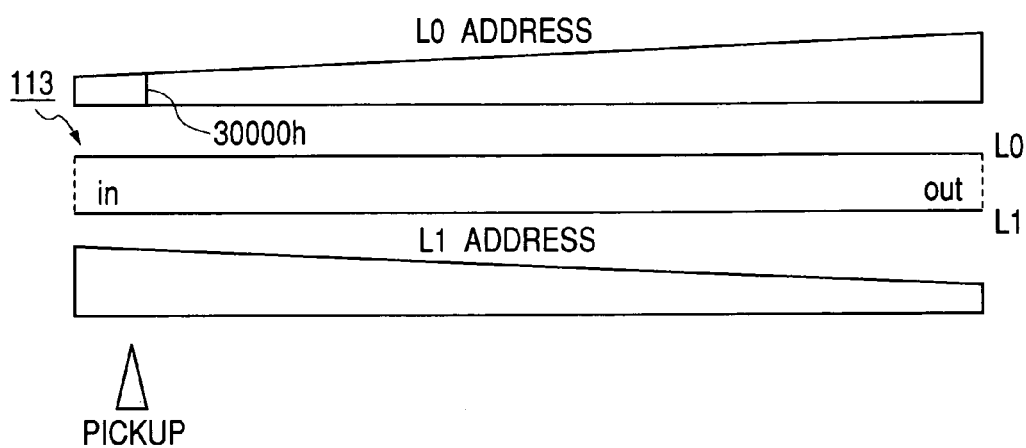
FIG. 20 is a diagram of signal recording layers in an optical disc of a first type in FIG. 19, and address changes in the signal recording layers.

As shown in FIG. 20, the optical disc 113 of the type "1" has signal recording layers L0 and L1 extending in parallel to each other. When the optical disc 113 of the type "1" is placed in position on the turntable 112, the signal recording layer L1 is closer to an optical pickup than the signal recording layer L0 is. The signal recording layer L1 is semitransparent. The signal recording layer L0 has a spiral groove which extends from the innermost disc position ("in") toward the outermost disc position ("out") as viewed in an address increasing direction. The signal recording layer L0 has an information recording area with addresses starting and increasing from an address of 30000h. The signal recording layer L1 has a spiral groove which extends from the outermost disc position ("out") toward the innermost disc position ("in") as viewed in an address increasing direction. The signal recording layer L1 has an information recording area with addresses starting and increasing from one immediately following the greatest address in the signal recording layer L0. Thus, the signal recording layers L0 and L1 are in an opposite relation regarding address variation. The addresses in the signal recording layer L1 may be expressed by numerical values using complements.

Figure 21:
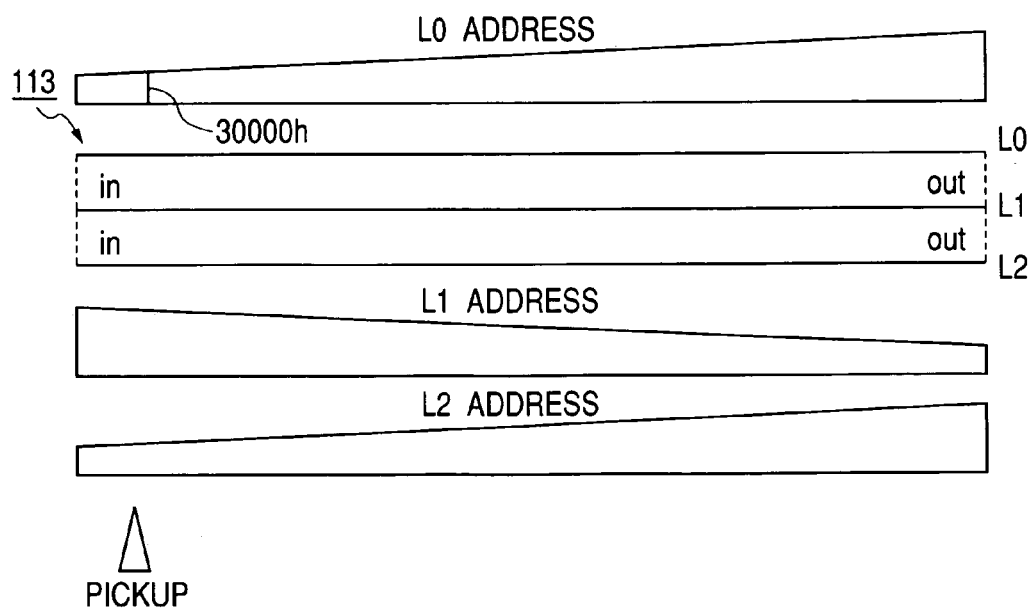
FIG. 21 is a diagram of signal recording layers in an optical disc of a second type in FIG. 19, and address changes in the signal recording layers.

As shown in FIG. 21, the optical disc 113 of the type "2" has signal recording layers L0, L1, and L2 extending in parallel to each other. When the optical disc 113 of the type "2" is placed in position on the turntable 112, the signal recording layer L1 is closer to an optical pickup than the signal recording layer L0 is. The signal recording layer L2 is closer to the optical pickup than the signal recording layer L1 is. The signal recording layers L1 and L2 are semitransparent. The signal recording layer L0 has a spiral groove which extends from the innermost disc position ("in") toward the outermost disc position ("out") as viewed in an address increasing direction. The signal recording layer L0 has an information recording area with addresses starting and increasing from an address of 30000h. The signal recording layer L1 has a spiral groove which extends from the outermost disc position ("out") toward the innermost disc position ("in") as viewed in an address increasing direction. The signal recording layer L1 has an information recording area with addresses starting and increasing from one immediately following the greatest address in the signal recording layer L0. Thus, the signal recording layers L0 and L1 are in an opposite relation regarding address variation. The addresses in the signal recording layer L1 may be expressed by numerical values using complements. The signal recording layer L2 has a spiral groove which extends from the innermost disc position ("in") toward the outermost disc position ("out") as viewed in an address increasing direction. The signal recording layer L2 has an information recording area with addresses starting and increasing from one immediately following the greatest address in the signal recording layer L1. Thus, the signal recording layers L1 and L2 are in an opposite relation regarding address variation.

With reference back to FIG. 19, the apparatus 110 further includes an optical pickup (an optical head) 114, a driver 115, an amplifier unit 116, a servo unit 117, a signal processor 118, a track buffer memory 119, an audio-video encoding and decoding unit 120, a buffer memory 121, a system controller 122, a key input unit 123, an NTSC encoder 124, a display 125, and input terminal 126(1), 126(2), ..., and 126(n). Here, "n" denotes a predetermined natural number equal to or greater than 2. In addition, the apparatus 110 includes a satellite digital broadcasting reception antenna 141, a satellite digital broadcasting decoder 142, a switch 143, a stream converter 144, and a terminal 145.

When the optical disc 113 is placed on the turntable 112, the spindle motor 111 rotates the turntable 112 and the optical disc 113. In the case where the optical disc 113 is of a rewritable type, the optical pickup 114 writes and reads information thereon and therefrom. In the case where the optical disc 113 is of a read-only type, the optical pickup 114 only reads information therefrom. The spindle motor 111 is connected to the driver 115 and the servo unit 117. The optical pickup 114 is connected to the amplifier unit 116 and the driver 115. The amplifier unit 116 is connected to the servo unit 117 and the signal processor 118. The driver 115 is connected to the servo unit 117. The signal processor 118 is connected to the track buffer memory 119 and the audio-video encoding and decoding unit 120. The audio-video encoding and decoding unit 120 is connected to the buffer memory 121 and the input terminals 126(1)-126(n). The system controller 122 is connected to the amplifier unit 116, the servo unit 117, the signal processor 118, the audio-video encoding and decoding unit 120, and the key input unit 123.

The NTSC encoder 124 is connected to the audio-vide encoding and decoding unit 120. The display 125 is connected to the NTSC encoder 124. The satellite digital broadcasting reception antenna 141 is connected to the satellite digital broadcasting decoder 142. The satellite digital broadcasting decoder 142 is connected to the switch 143. The switch 143 is connected to the stream converter 144. The switch 143 is connected with the Internet via the terminal 145. The stream converter 144 is connected to the signal processor 118. The satellite digital broadcasting decoder 142, the switch 143, and the stream converter 144, and the system controller 122 are connected to each other.

The spindle motor 111 is driven and controlled by the driver 115. The spindle motor 111 rotates the turntable 112 and the optical disc 113. The spindle motor 111 is provided with an FG generator and a rotational position sensor (an angular position sensor). The rotational position sensor includes, for example, a Hall element. The FG generator outputs an FG signal (a rotational speed signal). The Hall element outputs a rotational position signal. The FG signal and the rotational position signal are fed back to the driver 115 and the servo unit 117 as rotation servo signals.

The optical pickup 114 faces the optical disc 113 placed on the turntable 112. A feed motor (not shown) moves the optical pickup 114 radially with respect to the optical disc 113. The feed motor is driven by the driver 115. The optical pickup 114 includes a semiconductor laser, a collimator lens, and an objective lens. The semiconductor laser acts as a source for emitting a light beam (a laser beam). The emitted laser beam is focused into a laser spot on the optical disc 113 by the collimator lens and the objective lens. The optical pickup 114 includes an actuator for driving the objective lens to implement focusing and tracking of the laser spot with respect to the optical disc 113. The semiconductor laser is driven by a laser drive circuit in the optical pickup 114. In the case where an information signal such as an audio signal or an audio-video signal is recorded, the information signal is subjected to waveform correction by a waveform correction circuit in the amplifier unit 116 before being fed to the laser drive circuit. The above-mentioned actuator in the optical pickup 114 is driven by the driver 115.

The key input unit 123 includes a plurality of keys which can be operated by a user. The key input unit 123 generates command signals in accordance with its operation by the user. The command signals are transmitted from the key input unit 123 to the system controller 122. The command signals include a command signal for starting a recording mode of operation of the apparatus 110, and a command signal for starting a playback mode of operation of the apparatus 110. The key input unit 123 generates control data in accordance with its operation by the user. The control data are transmitted from the key input unit 123 to the system controller 122.

The system controller 122 includes, for example, a microcomputer or a similar device which operates in accordance with a control program stored in its internal ROM. The system controller 122 controls the amplifier unit 116, the servo unit 117, the signal processor 18, and the audio-video encoding and decoding unit 120 in response to the command signals fed from the key input unit 123. The ROM within the system controller 22 is loaded with information representing seek times S1, S2, . . . , Sn, F1, F2, . . . , Fn (or Fm), and a predetermined constant transfer rate Rp which will be mentioned later.

Control data can be fed to the system controller 122 via an input terminal (not shown). The control data fed to the system controller 122 via the input terminal, and the control data fed to the system controller 122 from the key input unit 123 include a signal for adjusting the resolution of pictures represented by contents information to be recorded, a signal for separating quickly-moving scenes such as car racing scenes represented by contents information, and a signal for giving priority to a recording time. The system controller 122 changes an actual recording time in accordance with the control data. The system controller 122 enables the setting of the actual recording time to be selected by the user.

When the apparatus 110 is requested to start operating in the playback mode, the key input unit 123 is actuated to generate the playback start command signal. The playback start command signal is transmitted from the key input unit 123 to the system controller 122. The system controller 122 controls the amplifier unit 116 and the servo unit 117 in response to the playback start command signal, thereby starting the playback mode of operation of the apparatus 110. The control of the servo unit 117 includes steps of controlling the driver 115. Firstly, the system controller 122 starts rotation of the optical disc 113 and application of a laser spot thereon through the control of the driver 115. The optical pickup 114 is controlled by the driver 115, thereby reading out address information from the optical disc 113. For example, the address information is contained in management information stored in a management area of the optical disc 113. The read-out address information is transmitted from the optical pickup 114 to the system controller 122 via the amplifier unit 116. The system controller 122 finds or decides a target sector (a target track portion) to be played back by referring to the address information. The system controller 122 controls the optical pickup 114 via the servo unit 117, the driver 115, and the feed motor, thereby moving the optical pickup 114 radially with respect to the optical disc 113 and hence moving the laser spot to the target sector on the optical disc 113. When the movement of the laser spot to the target sector is completed, the system controller 122 operates to start the reproduction of a requested signal from the target sector on the optical disc 113. In this way, the playback mode of operation of the apparatus 110 is started. During the playback mode of operation, the target sector is repetitively changed from one to another.

During the playback mode of operation of the apparatus 110, the optical pickup 114 scans the optical disc 113 and generates an RF signal containing information read out therefrom. A unit of generation of the RF signal corresponds to one error correction block (one ECC block) of the information recorded on the optical disc 113. The optical pickup 114 outputs the RF signal to the amplifier unit 116. The amplifier unit 116 enlarges the RF signal. In addition, the amplifier unit 116 generates a main reproduced signal, and tracking and focusing servo signals (tracking error and focusing error signals) from the enlarged RF signal. The amplifier unit 116 includes an equalizer for optimizing the frequency aspect of the main reproduced signal. Also, the amplifier unit 116 includes a PLL (phase locked loop) circuit for extracting a bit clock signal from the equalized main reproduced signal, and for generating a speed servo signal from the equalized main reproduced signal. Furthermore, the amplifier unit 116 includes a jitter generator for comparing the time bases of the bit clock signal and the equalized main reproduced signal, and for detecting jitter components from the results of the time-base comparison. A signal of the detected jitter components is transmitted from the amplifier unit 116 to the system controller 122. The tracking and focusing servo signals and the speed servo signal are transmitted from the amplifier unit 116 to the servo unit 117. The equalized main reproduced signal is transmitted from the amplifier unit 116 to the signal processor 118.

The servo unit 117 receives the speed servo signal and the tracking and focusing servo signals from the amplifier unit 116. The servo unit 117 receives the rotation servo signals from the spindle motor 111. In response to these servo signals, the servo unit 117 implements corresponding servo control processes.

Specifically, the servo unit 117 generates a rotation control signal on the basis of the speed servo signal and rotation servo signals. The rotation control signal is transmitted from the servo unit 117 to the spindle motor 111 via the driver 115. The spindle motor 111 rotates at a speed depending on the rotation control signal. The rotation control signal is designed to rotate the optical disc 113 at a given constant linear velocity.

In addition, the servo unit 117 generates servo control signals on the basis of the focusing and tracking servo signals. The servo control signals are transmitted from the servo unit 117 to the actuator in the optical pickup 114 via the driver 115. The actuator in the optical pickup 114 controls the laser spot on the optical disc 113 in response to the servo control signals, and thereby implements the focusing and tracking of the laser spot with respect to the optical disc 113.

The optical pickup 114 can be subjected to focus jump control providing movement of the laser spot between two among the signal recording layers L0, L1, and L3 of the optical disc 113 along a vertical direction. The focus jump control is as follows. When the on-disc position currently accessed by the optical pickup 114 is required to move between two among the signal recording layers L0, L1, and L3 of the optical disc 113, the system controller 122 controls the servo unit 117 to generate a focusing control signal on the basis of the focusing error signal (the focusing servo signal). The focusing control signal is transmitted from the servo unit 117 to the actuator in the optical pickup 114 via the driver 115. The actuator in the optical pickup 114 adjusts the focusing of the laser spot with respect to the optical disc 113 in response to the focusing control signal, and thereby implements the required movement of the laser spot between the two among the signal recording layers L0, L1, and L3 of the optical disc 113.

During the playback mode of operation of the apparatus 110, the signal processor 118 receives the main reproduced signal from the amplifier unit 116. The signal processor 118 is controlled by the system controller 122, thereby converting the main reproduced signal into a corresponding reproduced digital signal. The signal processor 118 detects a sync signal from the reproduced digital signal. The signal processor 118 decodes an EFM+ signal (an 8-16 modulation signal) of the reproduced digital signal into NRZI data, that is, non-return-to-zero-inverted data. The signal processor 118 subjects the NRZI data to an error correction process for every error correction block (every ECC block), thereby generating a sector address signal and a plurality of information signals ("n" information signals). Here, "n" denotes a predetermined natural number equal to or greater than 2. The natural number "n" may be equal to 1. The "n" information signals include a first information signal, a second information signal, . . . , and an n-th information signal. The sector address signal represents the address of a currently-accessed sector on the optical disc 113. The sync signal and the sector address signal are fed from the signal processor 118 to the system controller 122. It should be noted that the "n" information signals generated by the signal processor 118 correspond to information signals resulting from compression at variable transfer rates (variable transmission rates) during a recording mode of operation.

During the playback mode of operation of the apparatus 110, the signal processor 118 temporarily stores the "n" information signals in the track buffer memory 119 on a correction-block by correction-block basis. Thus, the signal processor 118 writes the "n" information signals into the track buffer memory 119, and reads the "n" information signals therefrom. Writing and reading the "n" information signals into and from the track buffer memory 119 are controlled to absorb a time-domain change in the transfer rates of the "n" information signals. The track buffer memory 119 includes, for example, a DRAM having a capacity of 64 MB. The signal processor 118 outputs the read-out signals (the "n" information signals read out from the track buffer memory 119) to the audio-video encoding and decoding unit 120.

In the case where the "n" information signals fed from the track buffer memory 119 via the signal processor 118 are compressed MPEG2 data in which audio data and video data are multiplexed, the audio-video encoding and decoding unit 120 separates the "n" information signals into compressed audio data and compressed video data. The audio-video encoding and decoding unit 120 expands and decodes the compressed audio data into non-compressed audio data. In addition, the audio-video encoding and decoding unit 120 expands and decodes the compressed video data into non-compressed video data. During the expansively decoding process, the audio-video encoding and decoding unit 120 temporarily stores signals and data in the buffer memory 121. The buffer memory 121 includes, for example, a DRAM having a capacity of 64 MB. The audio-video encoding and decoding unit 120 converts the non-compressed audio data into a corresponding analog audio signal through digital-to-analog conversion. Also, the audio-video encoding and decoding unit 120 converts the non-compressed video data into a corresponding analog video signal through digital-to-analog conversion. It should be noted that the conversion of the non-compressed audio and video data into the analog audio and video signals may be implemented by digital-to-analog converters provided externally of the audio-video encoding and decoding unit 120. The audio-video encoding and decoding unit 120 outputs the analog audio signal and the analog video signal to the NTSC converter 124. The analog audio signal passes through the NTSC converter 124 before being applied to loudspeakers provided in the body of the display 125. The NTSC converter 124 changes the analog video signal into a corresponding NTSC video signal. The NTSC converter 124 outputs the NTSC video signal to the display 125.

The data rate of the expansively decoding process by the audio-video encoding and decoding unit 120, that is, the data transfer rate (the data transmission rate) in the expansively decoding process, is equalized to an expansion data rate which is set in accordance with the type of the related recording mode of operation of the apparatus 110. Specifically, the audio-video encoding and decoding unit 120 can implement the expansively decoding process at an expansion data rate which can be changed among plural different expansion data rates. The audio-video encoding and decoding unit 120 selects one from the plural different expansion data rates as a desired expansion data rate in accordance with the type of the related recording mode of operation of the apparatus 110. The audio-video encoding and decoding unit 120 executes the expansively encoding process at the desired expansion data rate. Information of the type of the recording mode of operation of the apparatus 110 which includes information about a recording compression rate or rates is recorded on the optical disc 113 as control data. During an initial stage of the playback of the optical disc 113, the control data are read out therefrom before being transmitted to the system controller 122. The system controller 122 sets the expansion data rate in the audio-video encoding and decoding unit 120 in accordance with the control data.

When the apparatus 110 is requested to start operating in the recording mode, the key input unit 123 is actuated to generate the recording start command signal. The recording start command signal is transmitted from the key input unit 123 to the system controller 122. The system controller 122 controls the amplifier unit 116 and the servo unit 117 in response to the recording start command signal, thereby starting the recording mode of operation of the apparatus 110. The control of the servo unit 117 includes steps of controlling the driver 115. Firstly, the system controller 122 starts rotation of the optical disc 113 and application of a laser spot thereto through the control of the driver 115. The optical pickup 114 is controlled by the driver 115, thereby reading out address information from the optical disc 113. For example, the address information is contained in the management information stored in the management area of the optical disc 113. The read-out address information is transmitted from the optical pickup 114 to the system controller 122 via the amplifier unit 116. The system controller 122 finds or decides a target sector (a target track position), on which a signal is to be recorded, by referring to the address information. The system controller 122 controls the optical pickup 114 via the servo unit 117, the driver 115, and the feed motor, thereby moving the optical pickup 114 radially with respect to the optical disc 113 and hence moving the laser spot to the target sector on the optical disc 113. During the recording mode of operation of the apparatus 110, the target sector is repetitively changed from one to another.

During the recording mode of operation of the apparatus 10A, "n" analog information signals to be recorded are fed to the audio-video encoding and decoding unit 120 via the input terminals 126(1)-126(n). The audio-video encoding and decoding unit 120 converts the "n" analog information signals into corresponding "n" digital information signals through analog-to-digital conversion. It should be noted that the conversion of the "n" analog information signals into the "n" digital information signals may be implemented by analog-to-digital converters provided externally of the audio-video encoding and decoding unit 120. The audio-video encoding and decoding unit 120 compressively encodes the "n" digital information signals into "n" MPEG2 information signals at rates depending on the type of the recording mode. The audio-video encoding and decoding unit 120 outputs the "n" MPEG2 information signals to the signal processor 118 on a time sharing basis. The data rates of the compressively encoding process by the audio-video encoding and decoding unit 120, that is, the data transfer rates (the data transmission rates) in the compressively encoding process, are equalized to compression data rates which are selected from plural different rates in accordance with the type of the recording mode of operation of the apparatus 110. During the compressively encoding process, the audio-video encoding and decoding unit 120 temporarily stores data in the buffer memory 121.

It should be noted that the "n" MPEG2 information signals may be replaced by still-picture data or computer data such as program file data. In this case, the still-picture data or the computer data are transmitted to the system controller 122 via an interface (not shown). The system controller 122 transfers the still-picture data or the computer data to the signal processor 118.

Alternatively, the "n" MPEG2 information signals may be replaced by "n" compression-resultant information signals composing a transport stream signal. In this case, radio signals containing "n" compression-resultant information signals are received by the satellite digital broadcasting reception antenna 141, and the received radio signals are fed from the antenna 141 to the satellite digital broadcasting decoder 142. The satellite digital broadcasting decoder 42 subjects the received radio signals to QPSK demodulation, an error correction process, and a stream generating process, thereby converting the received radio signals into a transport stream signal composed of 188-byte segments representative of the "n" compression-resultant information signals. The satellite digital broadcasting decoder 142 outputs the transport stream signal to the switch 143. In addition, "n" compression-resultant information signals composing a transport stream signal are fed from the Internet to the switch 143 via the terminal 145. The switch 143 selects one of a set of the "n" compression-resultant information signals (the transport stream signal) fed from the satellite digital broadcasting decoder 142 and a set of the "n" compression-resultant information signals (the transport stream signal) fed via the terminal 145, and outputs the selected signal set to the stream converter 144. The selection by the switch 143 responds to a switch control signal fed from the system controller 122. The switch control signal is generated in response to, for example, user's operation of the key input unit 123. The stream converter 144 changes the output signals of the switch 143 into a program stream composed of 2048-byte segments representative of the "n" selected compression-resultant information signals. The stream converter 144 may encrypt the "n" selected compression-resultant information signals in accordance with key information recorded on the optical disc 113. The stream converter 144 outputs the program stream to the signal processor 118.

During the recording mode of operation of the apparatus 110, the signal processor 118 adds error correction code signals (ECC signals) to the "n" MPEG2 information signals, the still-picture data, the computer data, or the "n" compression-resultant information signals. The signal processor 118 subjects the ECC-added data (the ECC-added signals) to NRZI and EFM+ encoding processes. The signal processor 118 adds a sync signal to the encoding-resultant data to form sync-added data. The sync signal is fed from the system controller 122. The sync-added data are temporarily stored in the track buffer memory 119. The sync-added data are read out from the track buffer memory 119 at a data rate corresponding to a data rate of signal recording on the optical disc 113. The signal processor 118 subjects the read-out data to given modulation for record. The signal processor 118 outputs the modulation-resultant signal to the amplifier unit 116. The amplifier unit 116 corrects the waveform of the output signal of the signal processor 118. The amplifier unit 116 outputs the waveform-correction-resultant signal to the laser drive circuit in the optical pickup 114. The optical pickup 114 records the output signal of the amplifier unit 116 on the target sector (the target track position) on the optical disc 113.

As previously mentioned, during the playback mode of operation of the apparatus 110, the amplifier unit 116 informs the system controller 122 of detected jitter components. The system controller 122 subjects the detected jitter components to analog-to-digital conversion to generate a measured jitter value. During the recording mode of operation of the apparatus 110, the system controller 122 adjusts the degree or characteristic of the waveform correction by the amplifier unit 116 in response to the measured jitter value and an asymmetry value.

Operation of the apparatus 110 can be changed among various modes. During a first mode of operation which corresponds to the previously-mentioned playback mode of operation, the apparatus 110 reproduces an audio signal (audio signals) or an audio-video signal (audio-video signals) from the optical disc 113. During a second mode of operation which corresponds to the previously-mentioned recording mode of operation, the apparatus 110 records an audio signal (audio signals) or an audio-video signal (audio-video signals) on the optical disc 113. During a third mode of operation, the apparatus 110 records an audio signal or an audio-video signal on a first area of the optical disc 113 while reproducing another audio signal or another audio-video signal from a second area of the optical disc 113 which is separate from the first area thereof. During a fourth mode of operation, the apparatus 110 reproduces an audio signal or an audio-video signal from a first area of the optical disc 113 while reproducing another audio signal or another audio-video signal from a second area of the optical disc 113 which is separate from the first area thereof. During a fifth mode of operation, the apparatus 110 records an audio signal or an audio-video signal on a first area of the optical disc 113 while recording another audio signal or another audio-video signal on a second area of the optical disc 113 which is separate from the first area thereof. These various modes of operation of the apparatus 110 meet user's requests for the implementation of a picture-in-picture process, a two-signal simultaneous playback process, a time-shift playback process, an after-recording process, and a different-channel-program recording process.

The apparatus 110 can record "n" information signals on different areas of the optical disc 113, respectively, on a time sharing basis. The apparatus 110 can record only one of the "n" information signals on the optical disc 113. The apparatus 110 can reproduce "n" information signals from different areas of the optical disc 113, respectively, on a time sharing basis. The apparatus 110 can reproduce only one of the "n" information signals from the optical disc 113. The "n" information signals are "n" audio-video information signals. For example, the "n" audio-video information signals represent different movies respectively. Alternatively, the "n" information signals may be "n" audio information signals. For example, the "n" audio information signals represent different musical compositions respectively.

Figure 22:
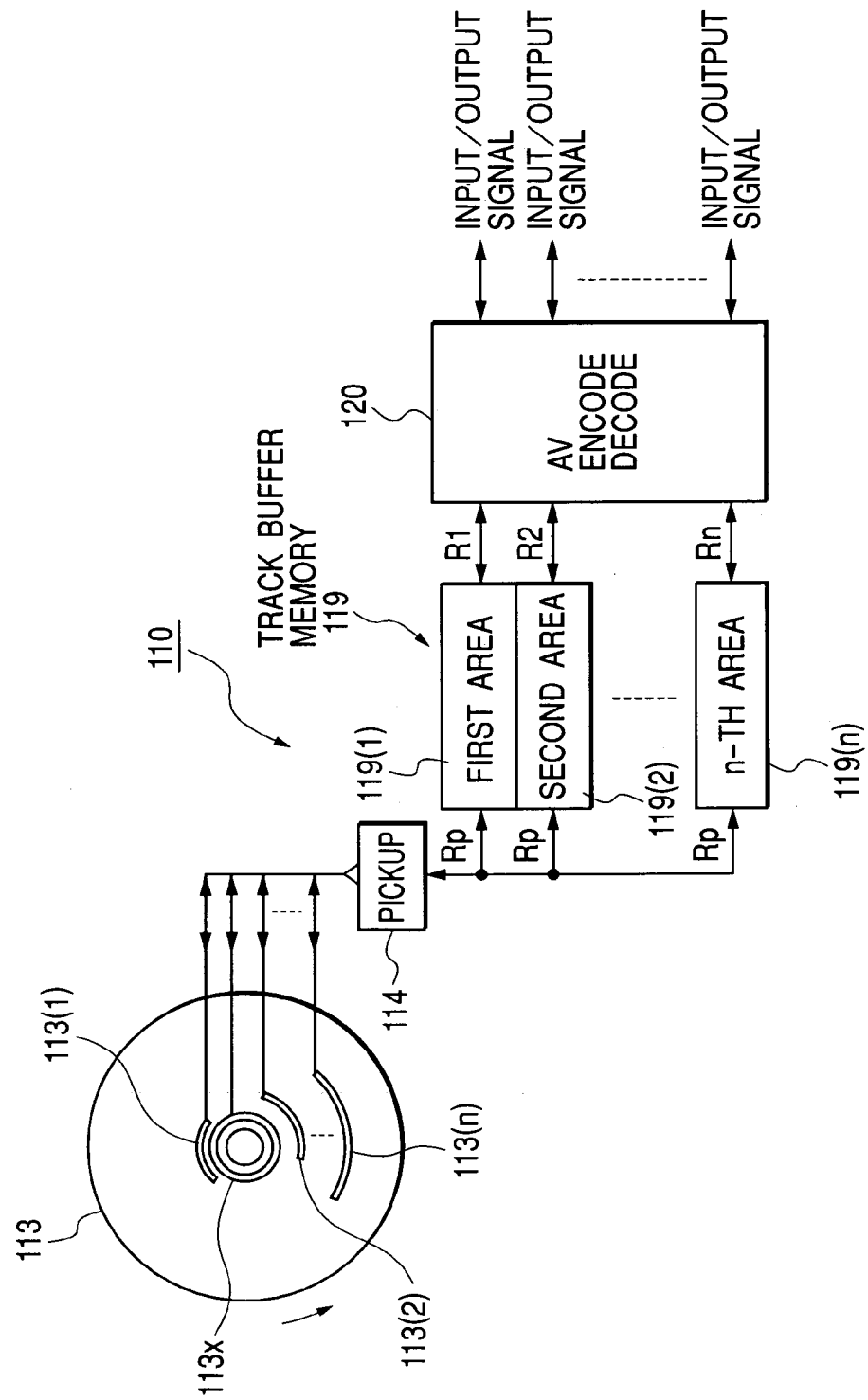
FIG. 22 is a diagram of a portion of the apparatus in FIG. 19.

FIG. 22 shows a portion of the apparatus 110. The amplifier unit 116 and the signal processor 118 are omitted from FIG. 22 for a better understanding. As shown in FIG. 22, the optical disc 113 has first, second, . . . , and n-th areas 113(1), 113(2), . . . , and 113(n) assigned to first, second, . . . , and n-th information signals respectively. The areas 113(1)-113(n) are separate from each other. Each of the areas 113(1)-113(n) is divided into separate equal-size sub-areas. The first information signal is divided into blocks each having a predetermined size (a predetermined total number of bits) Y1. The sub-areas of the first area 113(1) are allocated to the blocks of the first information signal, respectively. The second information signal is divided into blocks each having a predetermined size (a predetermined total number of bits) Y2. The sub-areas of the second area 113(2) are allocated to the blocks of the second information signal, respectively. The third and later information signals, and the third and later areas 113(3) . . . are similarly designed. The n-th information signal is divided into blocks each having a predetermined size (a predetermined total number of bits) Yn. The sub-areas of the n-th area 113(n) are allocated to the blocks of the n-th information signal, respectively. Each of the predetermined sizes Y1-Yn is a unit (a unit capacity) for continuous reproduction (or continuous recording) of information contents. The predetermined sizes Y1-Yn are also referred to as the unit information amounts Y1-Yn or the minimum information amounts Y1-Yn. The first, second, . . . , and n-th information signals are related or unrelated to each other. Each of the first, second, . . . , and n-th information signals has audio data, video data, audio-video data, or computer data.

According to a first example, the areas 113(1)-113(n) in the optical disc 113 extend on one of the signal recording layers L0, L1, and L2. According to a second example, three among the areas 113(1)-113(n) in the optical disc 113 extend on the signal recording layers L0, L1, and L2, respectively. According to a third example, two among the areas 113(1)-113(n) in the optical disc 113 extend on two of the signal recording layers L0, L1, and L2, respectively.

As shown in FIG. 23, the sub-areas in the first area 113(1) of the optical disc 113 are given addresses A1, A2, A3, . . . , respectively. Thus, the sub-areas in the first area 113(1) are also referred to as the sub-areas A1, A2, A3, . . . . The blocks of the first information signal are assigned to the sub-areas A1, A2, A3, . . . , respectively. Preferably, the size Y1 of the blocks of the first information signal is equal to the size of the sub-areas A1, A2, A3, . . . . The placement of the sub-areas in the first area 113(1) is designed to meet requirements for a seek time. As shown in FIG. 24, the sub-areas in the second area 113(2) of the optical disc 113 are given addresses B1, B2, B3, . . . , respectively. Thus, the sub-areas in the second area 113(2) are also referred to as the sub-areas B1, B2, B3, . . . . The blocks of the second information signal are assigned to the sub-areas B1, B2, B3, . . . , respectively. Preferably, the size Y2 of the blocks of the second information signal is equal to the size of the sub-areas B1, B2, B3, . . . . The placement of the sub-areas in the second area 113(2) is designed to meet requirements for a seek time. The sub-areas in each of the third and later areas 113(3) of the optical disc 113, and the blocks of each of the third and later information signals are similarly designed. As shown in FIG. 25, the sub-areas in the n-th area 113(n) of the optical disc 113 are given addresses N1, N2, N3, . . . , respectively. Thus, the sub-areas in the n-th area 113(n) are also referred to as the sub-areas N1, N2, N3, . . . . The blocks of the n-th information signal are assigned to the sub-areas N1, N2, N3, . . . , respectively.

Preferably, the size Yn of the blocks of the n-th information signal is equal to the size of the sub-areas N1, N2, N3, . . . . The placement of the sub-areas in the n-th area 113(n) is designed to meet requirements for a seek time.

During an example of the recording or playback mode of operation of the apparatus 110, the optical pickup 114 accesses the sub-area A1 in the first area 113(1) of the optical disc 113 before accessing the sub-area B1 in the second area 113(2) of the optical disc 113. The sub-area A1 and the sub-area B1 are located relative to each other so that the optical pickup 114 can move therebetween in a predetermined time (for example, about 0.7 second). Therefore, the maximum seek time during which the optical pickup 114 moves between the sub-area A1 and the sub-area B1 is equal to the predetermined time (for example, about 0.7 second). Similarly, the maximum seek time during which the optical pickup 114 moves from one sub-area to the next sub-area is equal to the predetermined time (for example, about 0.7 second).

Specifically, in the case where the first area 113(1) and the second area 113(2) extend on one of the signal recording layers L0, L1, and L2 of the optical disc 113, the seek time related to the movement of the optical pickup 114 from the sub-area A1 to the sub-area B1 agrees with an intra-layer seek time. The intra-layer seek time is equal to, for example, about 0.5 second or shorter. In the case where the first area 113(1) extends on one of the signal recording layers L0, L1, and L2 while the second area 113(2) extends on another signal recording layer, the seek time related to the movement of the optical pickup 114 from the sub-area A1 to the sub-area B1 agrees with the intra-layer seek time plus an inter-layer seek time. The inter-layer seek time means a time interval taken by the optical pickup 114 to implement a focus jump between two among the signal recording layers L0, L1, and L2 along a vertical direction (a focus direction). The inter-layer seek time is equal to, for example, about 0.2 second or shorter.

Figure 27:
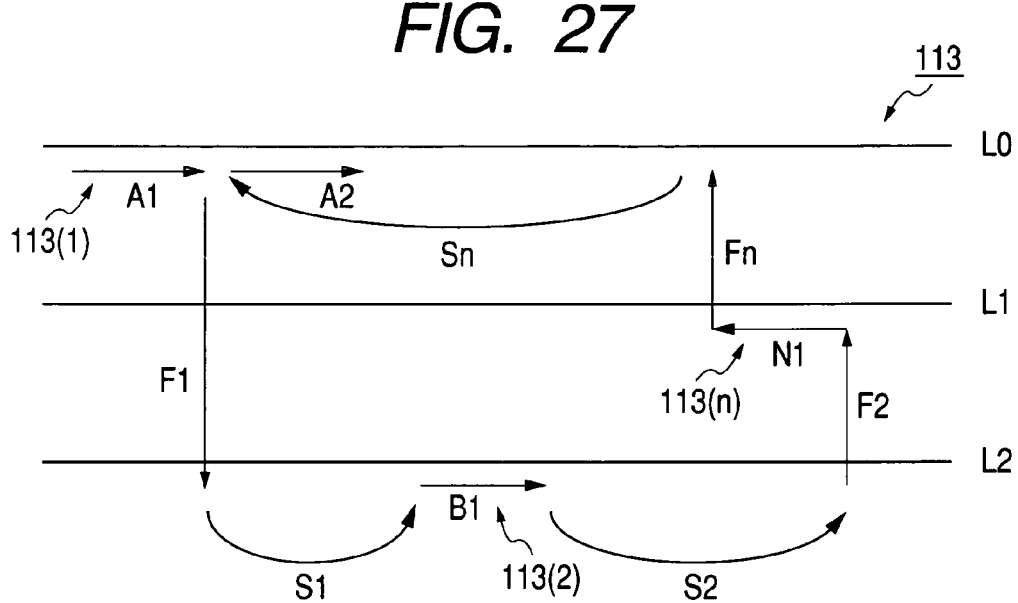
FIG. 27 is a diagram of an example of movement of an optical pickup among different areas in an optical disc of one type which has three signal recording layers.

With reference to FIG. 27, the optical disc 113 has first, second, and n-th areas 113(1), 113(2), and 113(n) which extend on the signal recording layers L0, L2, and L1 respectively. During the recording or playback mode of operation of the apparatus 110, the optical pickup 114 accesses the sub-area A1 in the first area 113(1) on the signal recording layer L0. Then, the optical pickup 114 implements a focus jump from the signal recording layer L0 to the signal recording layer L2. The seek time related to this focus jump is of the inter-layer type, and is denoted by "F1". Subsequently, the optical pickup 114 moves along the signal recording layer L2 to a position corresponding to the starting edge of the sub-area B1 in the second area 113(2) of the optical disc 113. The seek time related to this movement of the optical pickup 114 is of the intra-layer type, and is denoted by "S1". Then, the optical pickup 114 accesses the sub-area B1 in the second area 113(2) before moving along the signal recording layer L2 to a position corresponding to or aligning with the starting edge of the sub-area N1 in the n-th area 113(n) of the optical disc 113. The seek time related to this movement of the optical pickup 114 is of the intra-layer type, and is denoted by "S2". Thereafter, the optical pickup 114 implements a focus jump from the signal recording layer L2 to the signal recording layer L1. The seek time related to this focus jump is of the inter-layer type, and is denoted by "F2". Subsequently, the optical pickup 114 accesses the sub-area N1 in the n-th area 113(n) of the optical disc 113. Then, the optical pickup 114 implements a focus jump from the signal recording layer L1 to the signal recording layer L0. The seek time related to this focus jump is of the inter-layer type, and is denoted by "Fn" or "Fm". Thereafter, the optical pickup 114 moves along the signal recording layer L0 to a position corresponding to the starting edge of the sub-area A2 in the first area 113(1) of the optical disc 113. The seek time related to this movement of the optical pickup 114 is of the intra-layer type, and is denoted by "Sn".

Figure 28:
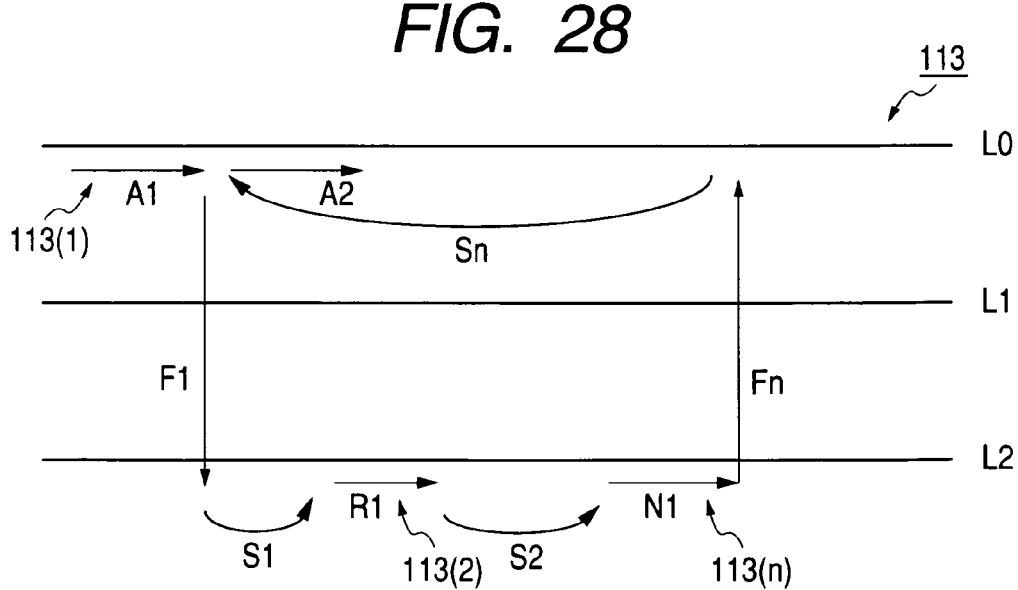
FIG. 28 is a diagram of an example of movement of an optical pickup among different areas in an optical disc of another type which has three signal recording layers.

With reference to FIG. 28, the optical disc 113 has a first area 113(1) extending on the signal recording layer L0, and second and n-th areas 113(2) and 113(n) extending on the signal recording layer L2. During the recording or playback mode of operation of the apparatus 110, the optical pickup 114 accesses the sub-area A1 in the first area 113(1) on the signal recording layer L0. Then, the optical pickup 114 implements a focus jump from the signal recording layer L0 to the signal recording layer L2 of the optical disc 113. The seek time related to this focus jump is of the inter-layer type, and is denoted by "F1". Subsequently, the optical pickup 114 moves along the signal recording layer L2 to a position corresponding to the starting edge of the sub-area B1 in the second area 113(2) of the optical disc 113. The seek time related to this movement of the optical pickup 114 is of the intra-layer type, and is denoted by "S1". Then, the optical pickup 114 accesses the sub-area B1 in the second area 113(2) before moving along the signal recording layer L2 to the starting edge of the sub-area N1 in the n-th area 113(n) of the optical disc 113. The seek time related to this movement of the optical pickup 114 is of the intra-layer type, and is denoted by "S2". Thereafter, the optical pickup 114 accesses the sub-area N1 in the n-th area 113(n) of the optical disc 113. Then, the optical pickup 114 implements a focus jump from the signal recording layer L2 to the signal recording layer L0 of the optical disc 113. The seek time related to this focus jump is of the inter-layer type, and is denoted by "Fn" or "Fm". Thereafter, the optical pickup 114 moves along the signal recording layer L0 to a position corresponding to the starting edge of the sub-area A2 in the first area 113(1) of the optical disc 113. The seek time related to this movement of the optical pickup 114 is of the intra-layer type, and is denoted by "Sn".

In this way, the total seek time related to movement of the optical pickup 114 between two sub-areas depends on whether the movement is inclusive or exclusive of a focus jump between signal recording layers of the optical disc 113. In the case where two of four sub-areas to be successively accessed extend on one signal recording layer while the other two sub-areas extend on another signal recording layer, a first example of the way of accessing the four sub-areas is designed so that a focus jump is implemented four times. A second example is designed so that the two sub-areas on each signal recording layer are successively accessed without implementing a track jump. According to the second example, a focus jump is implemented only twice during one cycle. Thus, the total seek time related to movement of the optical pickup 114 among three or more sub-areas depends on the way (the order) of accessing the sub-areas.

Every focus jump of the optical pickup 114 between the signal recording layers L0 and L1 of the optical disc 113 takes a time interval of, for example, about 0.2 second or shorter. This time interval is the inter-layer seek time. A simple focus jump of the optical pickup 114 takes a time interval in the range of several milliseconds to several tens of milliseconds. The inter-layer seek time is equal to the sum of (1) the simple-focus-jump time interval, (2) a time interval taken to lock up the tracking again, (3) a time interval necessary to compensate for a difference in eccentricity between the signal recording layers L0 and L1 of the optical disc 13, (4) a time interval for a retry, (5) a time interval for waiting rotation, and (6) other time intervals.

As shown in FIG. 22, an innermost portion of the optical disc 113 has a management area 113x. As shown in FIG. 26, the management area 113x is divided into separate sub-areas which are given addresses X1, X2, X3, . . . , respectively. Thus, the sub-areas in the management area 113x are also referred to as the sub-areas X1, X2, X3, . . . . In the case where the areas 113(1)-113(n) of the optical disc 113 store the "n" information signals respectively, the management area 113x is loaded with copyright information, title information, signals representative of the transfer rates R1-Rn, and signals representative of the start addresses and the end addresses for the "n" information signals. In the case where the areas 113(1)-113(n) of the optical disc 113 are unoccupied and do not store the "n" information signals respectively, the management area 113x is loaded with signals representative of the start addresses and the end addresses of the unoccupied regions (the unoccupied areas). It should be noted that address information stored in the management area 113x contains information about the signal recording layers L0, L1, and L3 of the optical disc 113, and information indicating the relation of recorded information signals with the signal recording layers L0, L1, and L3.

The track buffer memory 119 has first, second, . . . , and n-th areas 119(1), 119(2), . . . , and 119(n) which are assigned to the first, second, and n-th information signals respectively.

With reference to FIG. 22, the optical pickup 114 transfers the first, second, . . . , and n-th information signals between the optical disc 113 and the track buffer memory 119 on a time sharing basis and at a predetermined constant transfer rate Rp. The predetermined constant transfer rate Rp is equal to, for example, 25 Mbps.

The first information signal is transferred between the track buffer memory 119 and the audio-video encoding and decoding unit 120 at a transfer rate R1 selected from predetermined values. All the predetermined values are lower than the predetermined constant transfer rate Rp related to the optical pickup 114. The second information signal is transferred between the track buffer memory 119 and the audio-video encoding and decoding unit 120 at a transfer rate R2 changeable among the above-indicated predetermined values. Similarly, the third and later information signals are transferred between the track buffer memory 119 and the audio-vide encoding and decoding unit 120. The n-th information signal is transferred between the track buffer memory 119 and the audio-video encoding and decoding unit 120 at a transfer rate Rn changeable among the predetermined values.

As will be mentioned later, the apparatus 110 can substantially continuously and simultaneously record or reproduce the contents of the "n" information signals.

In more detail, each of the transfer rates R1, R2, . . . , and Rn is selected from a value of 8 Mbps which corresponds to a recording time of 2 hours and a high picture quality, a value of 4 Mbps which corresponds to a recording time of 4 hours and a slightly high picture quality, and a value of 2 Mbps which corresponds to a recording time of 8 hours and a normal picture quality. Ones of these values can be designated as desired values of the transfer rates R1-Rn according to user's operation of the key input unit 123. During the recording of the "n" information signals on the optical disc 113, the transfer rates R1-Rn are set to the desired values designated by user's operation of the key input unit 123. During the reproduction of the "n" information signals from the optical disc 113, control data representative of recording compression rates are read out from the management area 113x in the optical disc 113, and the transfer rates R1-Rn are set in accordance with the recording compression rates.

The system controller 122 accesses and controls the track buffer memory 119 via the signal processor 118. The system controller 122 virtually divides or partitions the track buffer memory 119 into the first, second, . . . , and n-th areas 119(1), 119(2), . . . , and 119(n). Specifically, the system controller 122 sets the first, second, . . . , and n-th areas 119(1), 119(2), . . . , and 119(n) in the track buffer memory 119 in response to the values of the transfer rates R1, R2, . . . , and Rn. The ratio in capacity among the memory areas 119(1)-119(n) depends on the ratio among the transfer rates R1-n. Regarding the first area 119(1) in the track buffer memory 119, the system controller 122 sets an empty value and a full value in response to the value of the transfer rate R1. The empty value corresponds to a slightly occupied state or a substantially empty state of the first area 119(1). The full value corresponds to a fully occupied state of the first area 119(1). Regarding the second area 119(2) in the track buffer memory 119, the system controller 122 sets an empty value and a full value in response to the value of the transfer rate R2. The empty value corresponds to a slightly occupied state or a substantially empty state of the second area 119(2). The full value corresponds to a fully occupied state of the second area 119(2). Similarly, regarding each of the third and later areas 119(3) . . . in the track buffer memory 119, the system controller 122 sets an empty value and a full value in response to the value of the related transfer rate. Regarding the n-th area 119(n) in the track buffer memory 119, the system controller 122 sets an empty value and a full value in response to the value of the transfer rate Rn. The empty value corresponds to a slightly occupied state or a substantially empty state of the n-th area 119(n). The full value corresponds to a fully occupied state of the n-th area 119(n). The system controller 122 always monitors the degree of occupancy of each of the first, second, . . . , and n-th areas 119(1), 119(2), . . . , and 119(n) which varies between the related empty value and the related full value under normal conditions.

Alternatively, the division of the track buffer memory 119 into the areas 119(1)-119(n) may be responsive to the type of the mode of operation of the apparatus 110. For example, in the case of the operation mode during which the apparatus 110 reproduces some information signals and records other information signals, greater ones of the areas 119(1)-119(n) are assigned to the information signals to be recorded while smaller ones are assigned to the reproduced information signals. This design reliably prevents the occurrence of an interruption of the continuous recording of the contents of the information signals. The system controller 122 implements the division of the track buffer memory 119 into the areas 119(1)-119(n) when receiving a recording start command signal or a playback start command signal. Preferably, the system controller 122 implements the division of the track buffer memory 119 after confirming the absence of data from the track buffer memory 119 which are being reproduced or recorded.

A first mode of operation of the apparatus 110 is executed in the case where the optical disc 113 is of the read-only type or another type. During the first mode of operation, the optical pickup 114 reproduces the first, second, . . . , and n-th information signals from the first, second, . . . , and n-th areas 113(1), 113(2), . . . , and 113(n) of the optical disc 113 on a time sharing basis. The first, second, . . . , and n-th information signals are transmitted from the optical pickup 114 to the track buffer memory 119. The first, second, . . . , and n-th information signals are stored into the first, second, . . . , and n-th areas 119(1), 119(2), . . . , and 119(n) of the track buffer memory 119 at the predetermined constant transfer rate Rp. The first, second, . . . , and n-th information signals are transmitted from the first, second, . . . , and n-th areas 119(1), 119(2), . . . , and 119(n) of the track buffer memory 119 toward the audio-video encoding and decoding unit 120 at the respective transfer rates R1, R2, . . . , and Rn lower than the predetermined transfer rate Rp.

A second mode of operation of the apparatus 110 is executed in the case where the optical disc 113 is of the rewritable type. During the second mode of operation, the first, second, . . . , and n-th information signals are stored from the audio-vide encoding and decoding unit 120 into the first, second, . . . , and n-th areas 119(1), 119(2), . . . , and 119(n) of the track buffer memory 119 at the transfer rates R1, R2, . . . , and Rn, respectively. The first, second, . . . , and n-th information signals are transmitted from the first, second, . . . , and n-th areas 119(1), 119(2), and 119(n) of the track buffer memory 119 to the optical pickup 114 on a time sharing basis and at the predetermined constant transfer rate Rp higher than the transfer rates R1-Rn. The optical pickup 114 records the first, second, . . . , and n-th information signals on the first, second, . . . , and n-th areas 113(1), 113(2), . . . , and 113(n) of the optical disc 113 on a time sharing basis.

A third mode of operation of the apparatus 110 is executed in the case where the optical disc 113 is of the rewritable type. During the third mode of operation, the optical pickup 114 reproduces an information signal from at least one of the areas 113(1)-113(n) of the optical disc 113. The reproduced information signal is transmitted from the optical pickup 114 to the track buffer memory 119. The reproduced information signal is stored into the track buffer memory 119 at the predetermined constant transfer rate Rp. The reproduced information signal is transmitted from the track buffer memory 119 toward the audio-video encoding and decoding unit 120 at the related transfer rate lower than the predetermined transfer rate Rp. During the third mode of operation, at least one other information signal (at least one information signal to be recorded) is stored from the audio-vide encoding and decoding unit 120 into the track buffer memory 119 at the related transfer rate lower than the predetermined constant transfer rate Rp. The recorded information signal is transmitted from the track buffer memory 119 to the optical pickup 114 at the predetermined constant transfer rate Rp. The optical pickup 114 records the transmitted information signal on another of the areas 113(1)-113(n) of the optical disc 113. The signal reproduction by the optical pickup 114 and the signal recording by the optical pickup 114 alternate with each other on a time sharing basis.

As previously indicated, the rate of the transfer of the first, second, . . . , and n-th information signals between the optical disc 113 and the track buffer memory 119 via the optical pickup 114 is denoted by "Rp" (Mbps). The rate of the transfer of the first information signal between the first area 119(1) of the track buffer memory 119 and the audio-video encoding and decoding unit 120 is denoted by "R1" (Mbps). The rate of the transfer of the second information signal between the second area 119(2) of the track buffer memory 119 and the audio-video encoding and decoding unit 120 is denoted by "R2" (Mbps). Similarly, the rates of the transfer of the third and later information signals between the track buffer memory 119 and the audio-video encoding and decoding unit 120 are denoted by "R3", . . . (Mbps). The rate of the transfer of the n-th information signal between the n-th area 119(n) of the track buffer memory 119 and the audio-video encoding and decoding unit 120 is denoted by "Rn" (Mbps). The minimum capacity of the track buffer memory 119 is denoted by "Ym" (Mb). The unit or minimum size (the unit or minimum total number of bits) of the first information signal continuously read out from or continuously recorded on each of the sub-areas A1, A2, A3, . . . in the first area 113(1) of the optical disc 113 is denoted by "Y1" (Mb). The unit or minimum size (the unit or minimum total number of bits) of the second information signal continuously read out from or continuously recorded on each of the sub-areas B1, B2, B3, . . . in the second area 113(2) of the optical disc 113 is denoted by "Y2" (Mb). Similarly, the unit or minimum sizes of the third and later information signals are denoted by "Y3", . . . (Mb). The unit or minimum size (the unit or minimum total number of bits) of the n-th information signal continuously read out from or continuously recorded on each of the sub-areas N1, N2, N3, . . . in the n-th area 113(n) of the optical disc 113 is denoted by "Yn" (Mb). The unit or minimum sizes Y1-Yn are also referred to as the unit or minimum information amounts Y1-Yn. The intra-layer seek time of movement of the optical pickup 114 from a first area 113(1) to a second area 113(2) on one of the signal recording layers L0, L1, and L2 of the optical disc 113 is denoted by "S1" (s). The intra-layer seek time of movement of the optical pickup 114 from a second area 113(2) to a third area 113(2) on one of the signal recording layers L0, L1, and L3 is denoted by "S2" (s). Similarly, the intra-layer seek times of movement of the optical pickup 114 from third and later areas 113(3) to the next areas on one of the signal recording layers L0, L1, and L2 are denoted by "S3" . . . (s). The intra-layer seek time of movement of the optical pickup 114 from the n-th area 113(n) to the first area 113(1) on one of the signal recording layers L0, L1, and L3 is denoted by "Sn" (s). The inter-layer seek time (the focus-jump seek time) of movement of the optical pickup 114 from a first area 113(1) on one of the signal recording layers L0, L1, and L2 to a second area 113(2) on another signal recording layer is denoted by "F1" (s). The inter-layer seek time (the focus-jump seek time) of movement of the optical pickup 114 from a second area 113(2) on one of the signal recording layers L0, L1, and L2 to a third area 113(3) on another signal recording layer is denoted by "F2" (s). Similarly, the inter-layer seek times of movement of the optical pickup 114 from a third and later areas 113(3) . . . on one of the signal recording layers L0, L1, and L2 to the next areas on another signal recording layer are denoted by "F3" . . . (s). The inter-layer seek time (the focus-jump seek time) of movement of the optical pickup 114 from an n-th area 113(n) on one of the signal recording layers L0, L1, and L2 to a first area 113(1) on another signal recording layer is denoted by "Fn" or "Fm" (s). During the access to the first, second, . . . , and n-th areas 113(1), 113(2), . . . , and 113(n) of the optical disc 113, the number of times of the occurrence of the intra-layer seek time is equal to or greater than the number of times of the occurrence of the inter-layer seek time.

Each of the intra-layer seek times S1-Sn is equal to a first time interval plus a second time interval. The first time interval starts from the moment at which the optical pickup 114 reaches a reproduction end position or a recording end position and suspends the reproduction of the present information signal from the present area of the optical disc 113 or the recording of the first information signal thereon. The first time interval continues as the optical pickup 114 moves from the reproduction end position or the recording end position in the present area toward the next area of the optical disc 113. The first time interval ends and the second time interval starts when the optical pickup 114 moves to the next area of the optical disc 113. The second time interval continues until the optical pickup 114 starts reproducing the next information signal from the next area of the optical disc 113 or recording the next information signal thereon. During the second time interval, a target address of the next area of the optical disc 113 is found, and preparations for the reproduction of the next information signal therefrom or preparations for the recording of the next information signal thereon have been made.

The summation $\Sigma Rn$ of the transfer rates R1, R2, . . . , and Rn related to the information signals transmitted between the track buffer memory 119 and the audio-video encoding and decoding unit 120 is smaller than the predetermined constant transfer rate Rp related to the optical pickup 114. Thus, the transfer rates R1, R2, . . . , and Rn and the predetermined constant transfer rate Rp are in the following relation.

$$Rp > R1 + R2 + \ldots + Rn \quad (31)$$

The recording or playback time T1 (s) for which the optical pickup 114 continuously records or reproduces the first information signal on or from each sub-area in the first area 113(1) of the optical disc 113 is given as follows.

$$T1 = Y1/Rp \quad (32)$$

The recording or playback time T2 (s) for which the optical pickup 114 continuously records or reproduces the second information signal on or from each sub-area in the second area 113(2) of the optical disc 113 is given as follows.

$$T2 = Y2/Rp \quad (33)$$

Similarly, the recording or playback time Tk (s) for which the optical pickup 114 continuously records or reproduces the k-th information signal on or from each sub-area in the k-th area 113(k) of the optical disc 113 is given as follows.

$$Tk = Yk/Rp \text{ where } k = 3, 4, 5, \ldots.$$

The recording or playback time Tn (s) for which the optical pickup 114 continuously records or reproduces the n-th information signal on or from each sub-area in the n-th area 113(n) of the optical disc 113 is given as follows.

$$Tn = Yn/Rp \quad (34)$$

Regarding the transfer rates Rp, R1, R2, . . . , and Rn, the following ratio is considered.

$$Rp/(Rp - R1 - R2 - Rn) \quad (35)$$

where "Rp" corresponds to a maximum transfer rate and "(Rp−R1−R2 . . . −Rn)" corresponds to a margin transfer rate regarding the signal read-out from the track buffer memory 119.

In the case where the areas 113(1)-113(n) in the optical disc 113 extend on one of the signal recording layers L0, L1, and L2, the following ratio is considered regarding the times T1, T2, . . . , and Tn, S1, S2, . . . , and Sn.

$$(T1 + S1 + T2 + S2 + \ldots + Tn + Sn)/(S1 + S2 + \ldots + Sn) \quad (36)$$

where "(T1+S1+T2+S2+ . . . +Tn+Sn)" corresponds to a 1-cycle time during which the first, second, . . . , and n-th information signals are sequentially reproduced once or recorded once, and "(S1+S2+ . . . +Sn)" corresponds to a total seek period in the 1-cycle time.

In the case where two successive areas among the areas 113(1)-113(n) extend on different signal recording layers respectively, the following ratio is considered regarding the times T1, T2, . . . , and Tn, S1, S2, . . . , and Sn, F1, F2, . . . , and Fn (or Fm).

$$(T1 + S1 + F1 + T2 + S2 + F2 + \ldots + Tn + Sn + Fn)/(S1 + F1 + S2 + F2 + \ldots + Sn + Fn) \quad (36a)$$

where "(T1+S1+F1+T2+S2+F2+ . . . +Tn+Sn+Fn)" corresponds to a 1-cycle time during which the first, second, . . . , and n-th information signals are sequentially reproduced once or recorded once, and "(S1+F1+S2+F2+ . . . +Sn+Fn)" corresponds to a total seek period in the 1-cycle time.

Supposed extreme conditions are such that a time interval for the reproduction or recording of the first, second, . . . , and n-th information signals and a total seek period compose a 1-cycle time, and other time intervals such as an optical-pickup waiting time interval are excluded from the 1-cycle time. Under the supposed extreme conditions, only a time interval corresponding to a margin transfer rate equal to the rate of the signal transfer between the optical disc 113 and the track buffer memory 119 minus the rate of the signal transfer between the track buffer memory 119 and the audio-video encoding and decoding unit 120 can be used for the movement of the optical pickup 114. Thus, the ratio in the relation (35) and the ratio in the relation (36a) can be equal to each other, and the following equations are available.

$$Rp/(Rp-R1-R2\ldots-Rn)=(T1+S1+F1+T2+S2+F2+\ldots+Tn+Sn+Fn)/(S1+F1+S2+F2+\ldots+Sn+Fn) \quad (37)$$

$$Rp/(Rp-R1-R2\ldots-Rn)=1+(T1+T2+\ldots+Tn)/(S1+F1+S2+F2+\ldots+Sn+Fn) \quad (37\text{-}1)$$

$$Rp/(Rp-R1-R2\ldots-Rn)-1=(T1+T2+\ldots+Tn)/(S1+F1+S2+F2+\ldots+Sn+Fn) \quad (37\text{-}2)$$

$$(Rp-Rp+R1+R2+\ldots+Rn)/(Rp-R1-R2\ldots-Rn)=(T1+T2+\ldots+Tn)/(S1+F1+S2+F2+\ldots+Sn+Fn) \quad (37\text{-}3)$$

$$(R1+R2+\ldots+Rn)/(Rp-R1-R2\ldots-Rn)=(T1+T2+\ldots+Tn)/(S1+F1+S2+F2+\ldots+Sn+Fn) \quad (37\text{-}4)$$

The equation (37-4) is converted into the following version.

$$(T1+T2+\ldots+Tn)=(R1+R2+\ldots+Rn)\cdot(S1+F1+S2+F2+\ldots+Sn+Fn)/(Rp-R1-R2\ldots-Rn) \quad (38)$$

Combining the equations (32), (33), and (34) with the equation (38) results in the following equation.

$$(Y1+Y2+\ldots+Yn)=Rp\cdot(R1+R2+\ldots+Rn)\cdot(S1+F1+S2+F2+\ldots+Sn+Fn)/(Rp-R1-R2\ldots-Rn) \quad (39a)$$

The equation (39a) is good for the case where two successive areas among the areas 113(1)-113(n) in the optical disc 113 extend on different signal recording layers respectively.

In the case where the areas 113(1)-113(n) in the optical disc 113 extend on one of the signal recording layers L0, L1, and L2, the equation (39a) is rewritten as follows.

$$(Y1+Y2+\ldots+Yn)=Rp\cdot(R1+R2+\ldots+Rn)\cdot(S1+S2+\ldots+Sn)/(Rp-R1-R2\ldots-Rn) \quad (39)$$

A margin can be introduced as follows. Regarding the equations (39) and (39a), the rate Rp of the signal transfer between the optical disc 113 and the track buffer memory 119 is equal to the predetermined constant value decided according to the disc standards and the specifications of the apparatus 110. Alteration of the transfer rate Rp is equivalent to alteration of the rotational velocity of the optical disc 113. Thus, it is difficult to alter the transfer rate Rp in accordance with the transfer rates related to the reproduced signals.

During the recording mode of operation of the apparatus 110, the transfer rates R1, R2, . . . , and Rn of the information signals written into the track buffer memory 119 are decided in accordance with user's designation. During the playback mode of operation of the apparatus 110, the transfer rates R1, R2, . . . , and Rn of the information signals read out from the track buffer memory 119 are decided in accordance with the conditions of the recording of the information signals on the optical disc 113.

The intra-layer seek times S1, S2, . . . , and Sn, and the inter-layer seek times F1, F2, . . . , and Fn (or Fm) are decided according to the relation in address position among the first, second, . . . , and n-th areas 113(1), 113(2), . . . , and 113(n) in the optical disc 113 and also the specifications of the optical-disc drive mechanism in the apparatus 110.

Therefore, substantially only the left terms in the equations (39) and (39a) are variables which can be used in stable playback or recording control with a margin. To implement continuous playback or recording of the contents of the first, second, . . . , and n-th information signals, the sizes (the total numbers of bits or the information amounts) Y1, Y2, . . . , and Yn of the respective information signals read out from or written into the optical disc 113 for one cycle are chosen to satisfy the following relation.

$$(Y1+Y2+\ldots+Yn)\geq Rp\cdot(R1+R2+\ldots+Rn)\cdot(S1+F1+S2+F2+\ldots+Sn+Fn)/(Rp-R1-R2\ldots Rn) \quad (40a)$$

The equation (40a) is changed into the following version.

$$\Sigma Yn \geq Rp\cdot\Sigma Rn\cdot(\Sigma Sn+\Sigma Fn)/(Rp-\Sigma Rn) \quad (41a)$$

where:

$$\Sigma Yn = Y1+Y2+\ldots+Yn$$

$$\Sigma Rn = R1+R2+\ldots+Rn$$

$$\Sigma Sn = S1+S2+\ldots+Sn$$

$$\Sigma Fn = F1+F2+\ldots+Fn$$

During the access to the first, second, . . . , and n-th areas 113(1), 113(2), . . . , and 113(n) of the optical disc 113, the number of times of the occurrence of the intra-layer seek time is equal to or greater than the number of times of the occurrence of the inter-layer seek time. Therefore, the number of the intra-layer seek times (S1, S2, . . . , Sn) is equal to or greater than the number of the inter-layer seek times (F1, F2, . . . , Fn). Thus, the inter-layer seek times can also be denoted by F1, F2, . . . , and Fm, where "m" denotes a natural number equal to or smaller than the number "n". Accordingly, in the relation (41a), "ΣFn" can be replaced by "ΣFm". The relation (41a) is good for the case where two successive areas among the areas 113(1)-113(n) in the optical disc 113 extend on different signal recording layers respectively.

In the case where the areas 113(1)-113(n) in the optical disc 113 extend on one of the signal recording layers L0, L1, and L2, the equation (41a) is rewritten as follows.

$$\Sigma Yn \geq Rp\cdot\Sigma Rn\cdot\Sigma Sn/(Rp-\Sigma Rn) \quad (41)$$

When each of the intra-layer seek times S1, S2, . . . , and Sn is set to an allowable seek time S taken by the optical pickup 114 to move between an innermost part and an outermost part of the optical disc 113, the following equation is satisfied.

$$\Sigma Sn = n\cdot S \quad (42)$$

The allowable seek time S is equal to, for example, about 0.5 second. When the inter-layer seek times F1, F2, . . . , and Fn (or Fm) are set to an allowable seek time F taken by the optical pickup 114 to move its focus between two of the signal recording layers L0, L1, and L1, the following equation is satisfied.

$$\Sigma Fn = m\cdot F \quad (42\text{-}1)$$

where "m" denotes the number of the inter-layer seek times F1, F2, . . . , and Fn (or Fm) which is equal to or smaller than the number "n" of the intra-layer seek times S1, S2, . . . , and Sn. Combining the equations (42) and (42-1) with the equation (41a) results in the following equation.

$$\Sigma Yn \geq Rp \cdot \Sigma Rn \cdot (n \cdot S + m \cdot F)/(Rp - \Sigma Rn) \quad (43a)$$

The equation (43a) is good for the case where two successive areas among the areas 113(1)-113(n) in the optical disc 113 extend on different signal recording layers respectively.

In the case where the areas 113(1)-113(n) in the optical disc 113 extend on one of the signal recording layers L0, L1, and L2, the equation (43a) is rewritten as follows.

$$\Sigma Yn \geq Rp \cdot \Sigma Rn \cdot n \cdot S/(Rp - \Sigma Rn) \quad (43)$$

A coefficient Kp is introduced which is given by:

$$(\Sigma Sn + \Sigma Fn) \cdot Rp/(Rp - \Sigma Rn) = Kp \quad (44\text{-}1)$$

where "$\Sigma Fn$" can be replaced by "$\Sigma Fm$". When the coefficient Kp is used, the relation (43a) is rewritten as follows.

$$\Sigma Yn \geq Kp \cdot \Sigma Rn \quad (44\text{-}2)$$

According to the equation (44-1), the coefficient Kp remains unchanged in the case where the transfer rates R1, R2, . . . , and Rn vary while the sum of the transfer rates R1, R2, . . . , and Rn continues to be fixed. For continuous playback or recording of information contents, the minimum information amounts Y1, Y2, . . . , and Yn are proportional to the transfer rates R1, R2, . . . , and Rn. Accordingly, there is the below-indicated relation among the minimum information amounts Y1, Y2, . . . , and Yn and the transfer rates R1, R2, . . . , and Rn.

$$Y1:Y2: \ldots :Yn = R1:R2: \ldots :Rn \quad (44\text{-}3)$$

When the relation (44-3) is used, the relation (44-2) is rewritten into versions expressed as:

$$Y1 \geq R1 \cdot Kp \quad (44\text{-}4)$$

$$Y2 \geq R2 \cdot Kp \quad (44\text{-}5)$$

$$Yn \geq Rn \cdot Kp \quad (44\text{-}6)$$

Combining the equation (44-1) with the relations (44-4), (44-5), and (44-6) results in the following relations.

$$Y1 \geq Rp \cdot R1 \cdot (S1 + F1 + S2 + F2 + \ldots + Sn + Fn)/(Rp - R1 - R2 \ldots -Rn) \quad (44)$$

$$Y2 \geq Rp \cdot R2 \cdot (S1 + F1 + S2 + F2 + \ldots + Sn + Fn)/(Rp - R1 - R2 \ldots -Rn) \quad (45)$$

$$Yn \geq Rp \cdot Rn \cdot (S1 + F1 + S2 + F2 + \ldots + Sn + Fn)/(Rp - R1 - R2 \ldots -Rn) \quad (46)$$

In the relations (44), (45), and (46), "Fn" can be replaced by "Fm".

For the continuous playback or recording of the contents of the "n" information signals, it is preferable to satisfy the relations (44), (45), and (46). Specifically, there are parameters including the transfer rate Rp related to the optical pickup 114, the transfer rates R1, R2, . . . , and Rn of the first, second, . . . , and n-th information signals, the intra-layer seek times S1, S2, . . . , and Sn, the inter-layer seek times F1, F2, . . . , and Fn (or Fm), the sizes Y1, Y2, . . . , and Yn of blocks of the first, second, . . . , and n-th information signals, and the recording or playback times T1, T2, . . . , and Tn. For the continuous playback or recording of the contents of the "n" information signals, it is preferable that the previously-indicated parameters satisfy the relations (40a), (41a), (43a), (44), (45), and (46). The relations (40a) and (41a) are the same in substance. The relation (43a) is similar to the relation (41a) except that the seek times are set to the fixed values. Accordingly, it is preferable to satisfy the relations (41a), (44), (45), and (46).

The minimum capacity Ym of the track buffer memory 119 satisfies the following relation.

$$Ym > (T1 + S1 + F1 + T2 + S2 + F2 + \ldots + Tn + Sn + Fn) \cdot (R1 + R2 + \ldots + Rn) \quad (47\text{-}1)$$

where "Fn" can be replaced by "Fm". Combining the relations (42) and (42-1) with the relation (47-1) results in the following relation.

$$Ym > (T1 + T2 + \ldots + Tn + n \cdot S + m \cdot F) \cdot (R1 + R2 + \ldots + Rn) \quad (47\text{-}2)$$

where S denotes the allowable intra-layer seek time, and F denotes the allowable inter-layer seek time (the focus-jump seek time). To provide a system margin for allowing a retry process and a shock-proof memory function, it is preferable that the minimum capacity Ym of the track buffer memory 119 exceeds the value defined by the right-hand side of the relation (47-2).

When the equations and relations (32), (33), (34), (40a), (41a), and (43a) are considered, the relations (47-1) and (47-2) are rewritten as follows.

$$Ym > Rp \cdot \Sigma Rn \cdot (\Sigma Sn + \Sigma Fn)/(Rp - \Sigma Rn) \quad (47a)$$

$$Ym > Rp \cdot \Sigma Rn \cdot (n \cdot S + m \cdot F)/(Rp - \Sigma Rn) \quad (48a)$$

In the relation (47a), "$\Sigma Fn$" can be replaced by "$\Sigma Fm$". The relations (47a) and (48a) are good for the case where two successive areas among the areas 113(1)-113(n) in the optical disc 113 extend on different signal recording layers respectively.

In the case where the areas 113(1)-113(n) in the optical disc 113 extend on one of the signal recording layers L0, L1, and L2, the relations (47a) and (48a) are rewritten as follows.

$$Ym > Rp \cdot \Sigma Rn \cdot \Sigma Sn/(Rp - \Sigma Rn) \quad (47)$$

$$Ym > Rp \cdot \Sigma Rn \cdot n \cdot S/(Rp - \Sigma Rn) \quad (48)$$

It should be noted that a portion of the buffer memory 121 connected to the audio-vide encoding and decoding unit 120 may be used as a track buffer memory substituting for the track buffer memory 119. The track buffer memory 119 may contain a part of the buffer memory 121. Either the track buffer memory 119 or a portion of the buffer memory 121 may be selectively used as an effective track buffer memory depending on the use conditions thereof.

In the case where the optical pickup 114 is required to record the "n" information signals on the optical disc 113 on a time sharing basis, the conditions of unoccupied portions of the first, second, . . . , and n-th areas 113(1), 113(2), . . . , and 113(n) are detected. Specifically, the management area 113x in the optical disc 113 is accessed. Start addresses and end addresses of independent unoccupied regions are calculated on the basis of the start addresses and the end addresses of data-loaded regions which are stored in the management area 113x. Then, the sizes and positions of the unoccupied regions are calculated. The calculated sizes and positions of the unoccupied regions are memorized. For each of the 2-Mbps, 4-Mbps, and 8-Mbps transfer rates concerning the "n" information signals, a decision is made as to whether or not the size of each unoccupied region is sufficient to implement continuous recording of information contents. In addition, the seek time of the optical pickup 114 is calculated as follows. The difference between addresses is calculated. The movement-corresponding track number is computed on the basis of the address difference by referring to a seek table provided in the ROM within the system controller 122. The computation of the movement-corresponding track number is also based on the fact that the rotation of the optical disc 113 undergoes CLV control. Given calculation using the movement-corresponding track number and a given coefficient provides a calculated seek time of the optical pickup 114. It should be noted that the seek time of the optical pickup 114 may be set to a given value depending on the type of the apparatus 110 or a standards-based allowable seek time.

Multiple-Signal Playback Mode

Generally, a multiple-signal playback mode of operation of the apparatus 110 is executed in the case where the optical disc 113 is of the read-only type. The optical disc 113 may be of another type. During the multiple-signal playback mode of operation, the optical pickup 114 reproduces the "n" information signals from the optical disc 113 on a time sharing basis while the contents of the "n" information signals are continuously played back. In the case where at least two of the areas 113(1)-113(n) of the optical disc 113 extend on different signal recording layers respectively, the optical pickup 114 repetitively implements a focus jump between the signal recording layers.

The optical disc 113 has the first area 113(1) divided into the sub-areas on which the blocks of the first information signal are previously recorded respectively. In addition, the optical disc 113 has the second area 113(2) divided into the sub-areas on which the blocks of the second information signal are previously recorded respectively. Similarly, the optical disc 113 has the third and later areas 113(3) . . . on which the third and later information signals are previously recorded. Furthermore, the optical disc 113 has the n-th area 113(n) divided into the sub-areas on which the blocks of the n-th information signal are previously recorded respectively. Each of the blocks of the first information signal has a predetermined size (a predetermined total number of bits) Y1. Each of the blocks of the second information signal has a predetermined size (a predetermined total number of bits) Y2. Similarly, the blocks of the third and later information signals have predetermined sizes Y3. Each of the blocks of the n-th information signal has a predetermined size (a predetermined total number of bits) Yn.

The optical disc 113 has the signal recording layers L0, L1, and L2. According to a first example, the areas 113(1)-113(n) in the optical disc 113 extend on one of the signal recording layers L0, L1, and L2. According to a second example, three among the areas 113(1)-113(n) in the optical disc 113 extend on the signal recording layers L0, L1, and L2, respectively. According to a third example, two among the areas 113(1)-113(n) in the optical disc 113 extend on two of the signal recording layers L0, L1, and L2, respectively.

When the multiple-signal playback mode of operation of the apparatus 110 is started, the optical pickup 114 reproduces management information from the management area 113x in the optical disc 113. The reproduced management information is transmitted from the optical pickup 114 to the system controller 122 via the amplifier unit 116. The system controller 122 detects the locations (addresses) and conditions of the sub-areas in the areas 113(1)-113(n) from the management information. Generally, the system controller 122 also derives information of transfer rates R1, R2, . . . , and Rn from the management information. Then, the optical pickup 114 is moved to a position corresponding to the sub-area A1 in the first area 113(1) of the optical disc 113. The optical pickup 114 reproduces the first information signal from the sub-area A1 in the optical disc 113. The reproduced first information signal is transmitted from the optical pickup 114 to the track buffer memory 119, being stored into the first area 119(1) in the track buffer memory 119 at the predetermined constant transfer rate Rp.

Figure 29:
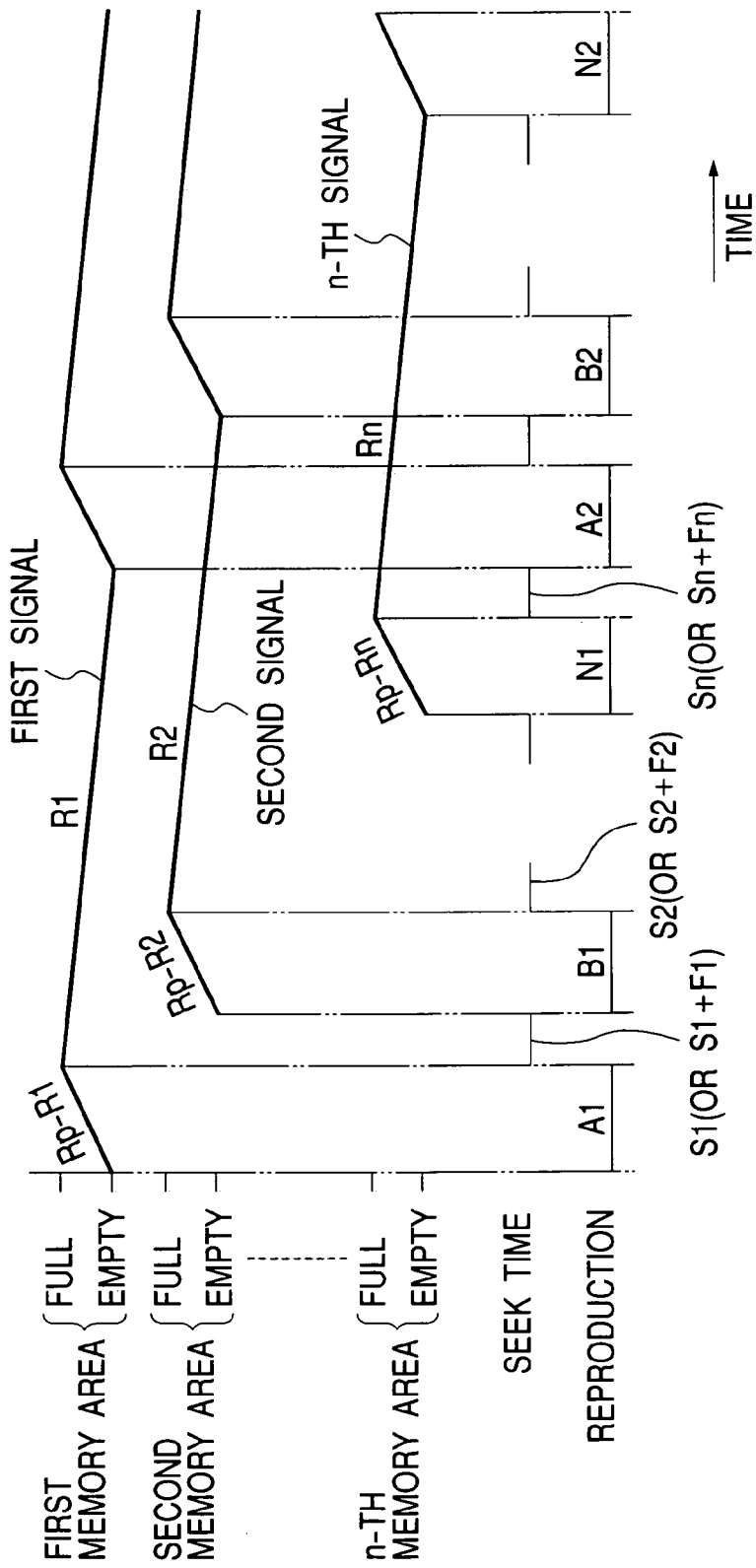
FIG. 29 is a time-domain diagram of the degrees of occupancy of areas in a track buffer memory in FIG. 19 which occur in a multiple-signal playback mode of operation.

As shown in FIG. 29, after the degree of occupancy of the first area 119(1) in the track buffer memory 119 reaches the related empty value, the first information signal is read out from the memory area 119(1) toward the audio-video encoding and decoding unit 120 at the transfer rate R1 and the first information signal continues to be transmitted from the sub-area A1 in the optical disc 113 to the memory area 119(1) at the predetermined constant transfer rate Rp. Thus, during this stage, the degree of occupancy of the memory area 119(1) increases at a rate corresponding to "Rp−R1".

When the degree of occupancy of the memory area 119(1) reaches the related full value, the transmission of the first information signal from the sub-area A1 in the optical disc 113 to the memory area 119(1) is suspended or terminated. Then, the optical pickup 114 is moved to a position corresponding to the sub-area B1 in the second area 113(2) of the optical disc 113. In the case where both the sub-areas A1 and B1 extend on one of the signal recording layers L0, L1, and L2 of the optical disc 113, the seek time (S 1) related to this movement of the optical pickup 114 is exclusive of a focus-jump time and is hence equal to or shorter than, for example, about 0.5 second. In the case where the sub-areas A1 and B1 extend on different signal recording layers respectively, the seek time (S1+F1) related to this movement of the optical pickup 114 is inclusive of a focus-jump time and is hence equal to or shorter than, for example, about 0.7 second. The optical pickup 114 transmits the second information signal from the sub-area B1 in the optical disc 113 to the second area 119(2) of the track buffer memory 119 at the predetermined constant transfer rate Rp. Even after the degree of occupancy of the memory area 119(1) reaches the related full value, the first information signal continues to be read out from the memory area 119(1) at the transfer rate R1. Thus, during this stage, the degree of occupancy of the memory area 119(1) decreases at a rate corresponding to "R1". The read-out of the first information signal from the memory area 119(1) is completed before the optical pickup 114 accesses the sub-area A2 in the first area 113(1) of the optical disc 113.

After the degree of occupancy of the second area 119(2) in the track buffer memory 119 reaches the related empty value, the second information signal is read out from the memory area 119(2) toward the audio-video encoding and decoding unit 120 at the transfer rate R2 and the second information signal continues to be transmitted from the sub-area B1 in the optical disc 113 to the memory area 119(2) at the predetermined constant transfer rate Rp. Thus, during this stage, the degree of occupancy of the memory area 119(2) increases at a rate corresponding to "Rp−R2".

When the degree of occupancy of the memory area 119(2) reaches the related full value, the transmission of the second information signal from the sub-area B1 in the optical disc 113 to the memory area 119(2) is suspended or terminated. Then, the optical pickup 114 is moved to a position corresponding to the first sub-area in the third area 113(3) of the optical disc 113. In the case where both the sub-area B1 and the first sub-area in the third area 113(3) extend on one of the signal recording layers L0, L1, and L2 of the optical disc 113, the seek time (S2) related to this movement of the optical pickup 114 is exclusive of a focus-jump time and is hence equal to or shorter than, for example, about 0.5 second. In the case where the sub-area B1 and the first sub-area in the third area 113(3) extend on different signal recording layers respectively, the seek time (S2+F2) related to this movement of the optical pickup 114 is inclusive of a focus-jump time and is hence equal to or shorter than, for example, about 0.7 second. The optical pickup 114 transmits the third information signal from the first sub-area in the third area 113(3) of the optical disc 113 to the third area 119(3) of the track buffer memory 119 at the predetermined constant transfer rate Rp. Even after the degree of occupancy of the memory area 119(2) reaches the related full value, the second information signal continues to be read out from the memory area 119(2) at the transfer rate R2. Thus, during this stage, the degree of occupancy of the memory area 119(2) decreases at a rate corresponding to "R2". The read-out of the second information signal from the memory area 119(2) is completed before the optical pickup 114 accesses the sub-area B2 in the second area 113(2) of the optical disc 113.

The above-mentioned sequence of steps is iterated while the optical pickup 114 sequentially reproduces the fourth and later information signals from the first sub-areas in the fourth and later areas 113(4)-113(n) of the optical disc 113. After the reproduction of the n-th information signal from the sub-area N1 in the n-th area 113(n) of the optical disc 113 is completed, the optical pickup 114 is moved to a position corresponding to the sub-area A2 in the first area 113(1) of the optical disc 113. During a subsequent term, such processes are iterated. Thus, the contents of the "n" information signals are continuously played back while the optical pickup 114 sequentially accesses the sub-areas in the areas 113(1)-113(n) of the optical disc 113 in the order as "A1, B1, . . . , N1, A2, B2, . . . , N2, . . . ".

During the multiple-signal playback mode of operation of the apparatus 110, the previously-indicated parameters satisfy the equations and relations (31)-(48) or (31)-(48a). In the case where two successive areas among the areas 113(1)-113(n) in the optical disc 113 extend on different signal recording layers respectively, the read-out information amounts Y1, Y2, . . . , and Yn are decided according to the relations (41a), (44), (45), and (46). In the case where the areas 113(1)-113(n) in the optical disc 113 extend on one of the signal recording layers L0, L1, and L2, the relation (41) replaces the relation (41a) in the decision of the read-out information amounts Y1, Y2, . . . , and Yn. In this case, the information-signal-storing region of the track buffer memory 119 can be relatively small so that the remaining portion thereof can be effectively used for other purposes.

In the case where the areas 113(1)-113(n) in the optical disc 113 extend on one of the signal recording layers L0, L1, and L2, the read-out information amounts Y1, Y2, . . . , and Yn may be decided according to the relations (41a), (44), (45), and (46). In this case, the decided read-out information amounts Y1, Y2, . . . , and Yn remain unchanged regardless of whether or not the areas 113(1)-113(n) in the optical disc 113 extend on one of the signal recording layers L0, L1, and L2. Thus, in this case, it is possible to simplify the playback control and reduce the size of the playback control program.

Multiple-Signal Recording Mode

A multiple-signal recording mode of operation of the apparatus 110 is executed in the case where the optical pickup 113 is of the rewritable type. During the multiple-signal recording mode of operation, the "n" information signals are written into the areas 119(1)-119(n) in the track buffer memory 119 at the transfer rates R1-Rn, respectively. The "n" information signals are transmitted from the areas 119(1)-119(n) in the track buffer memory 119 to the optical pickup 114 on a time sharing basis at the predetermined constant transfer rate Rp higher than the transfer rates R1-Rn. The optical pickup 114 records the "n" information signal on the areas 113(1)-113(n) in the optical disc 113 on a time sharing basis at the predetermined constant transfer rate Rp, respectively.

The optical disc 113 is previously provided with the first area 113(1) divided into the sub-areas for storing the respective blocks of the first information signal. The sub-areas in the first area 113(1) have the predetermined size Y1. In addition, the optical disc 113 is previously provided with the second area 113(2) divided into the sub-areas for storing the respective blocks of the second information signal. The sub-areas in the second area 113(2) have the predetermined size Y2. Similarly, the optical disc 113 is previously provided with the third and later areas 113(3) . . . for storing the third and later information signals. Furthermore, the optical disc 113 is previously provided with the n-th area 113(n) divided into the sub-areas for storing the respective blocks of the n-th information signal. The sub-areas in the n-th area 113(n) have the predetermined size Yn. In addition, the optical disc 113 has the management area 113$x$ loaded with the management information representing the locations (addresses) and conditions of the sub-areas in the areas 113(1)-113(n). Unoccupied regions in the optical disc 113 can be detected from the management information.

The optical disc 113 has the signal recording layers L0, L1, and L2. According to a first example, the areas 113(1)-113(n) in the optical disc 113 extend on one of the signal recording layers L0, L1, and L2. According to a second example, three among the areas 113(1)-113(n) in the optical disc 113 extend on the signal recording layers L0, L1, and L2, respectively. According to a third example, two among the areas 113(1)-113(n) in the optical disc 113 extend on two of the signal recording layers L0, L1, and L2, respectively.

During the multiple-signal recording mode of operation of the apparatus 110, the audio-video encoding and decoding unit 120 encodes "n" original signals into the "n" information signals respectively. The "n" information signals are transferred from the audio-vide encoding and decoding unit 120 to the track buffer memory 119 at the rates R1-Rn, respectively. The rates R1-Rn of the transfer of the "n" information signals from the audio-vide encoding and decoding unit 120 to the track buffer memory 119 can be selected from different values according to user's operation of the key input unit 123. The different values include a transfer rate of 8 Mbps which corresponds to a high picture quality, a transfer rate of 4 Mbps which corresponds to a slightly high picture quality, and a transfer rate of 2 Mbps which corresponds to a normal picture quality. The "n" information signals are temporarily stored in the areas 119(1)-119(n) in the track buffer memory 119, respectively. At an initial stage, the optical pickup 114 is in a stand-by state or a kick wait state while being located at a position corresponding to a target track on the optical disc 113. The system controller 122 always monitors the degree of occupancy of each of the memory areas 119(1)-119(n) which varies between the related empty value and the related full value under normal conditions. When the degrees of occupancy of the memory areas 119(1)-119(n) reach the related full values, the "n" information signals start to be read out from the memory areas 119(1)-119(n) on a time sharing basis and at the predetermined constant transfer rate Rp higher than the transfer rates R1-Rn. The optical pickup 114 records the "n" information signals on the areas 113(1)-113(n) of the optical disc 113 respectively on a time sharing basis and at the predetermined constant transfer rate Rp. In this way, the continuously recording of the "n" original signals is implemented.

When the multiple-signal recording mode of operation of the apparatus 110 is started, the optical pickup 114 reproduces management information from the management area 113x in the optical disc 113. The reproduced management information is transmitted from the optical pickup 114 to the system controller 122 via the amplifier unit 116. The system controller 122 detects unoccupied regions in the areas 113(1)-113(n) of the optical disc 113 from the management information. Then, the optical pickup 114 is moved to a position corresponding to the sub-area A1 in the first area 113(1) of the optical disc 113 provided that the sub-area A1 is found to be unoccupied. On the other hand, the first information signal is transmitted from the audio video encoding and decoding unit 120 to the track buffer memory 119, and is stored into the first area 119(1) of the track buffer memory 119 at the transfer rate R1.

Figure 30:
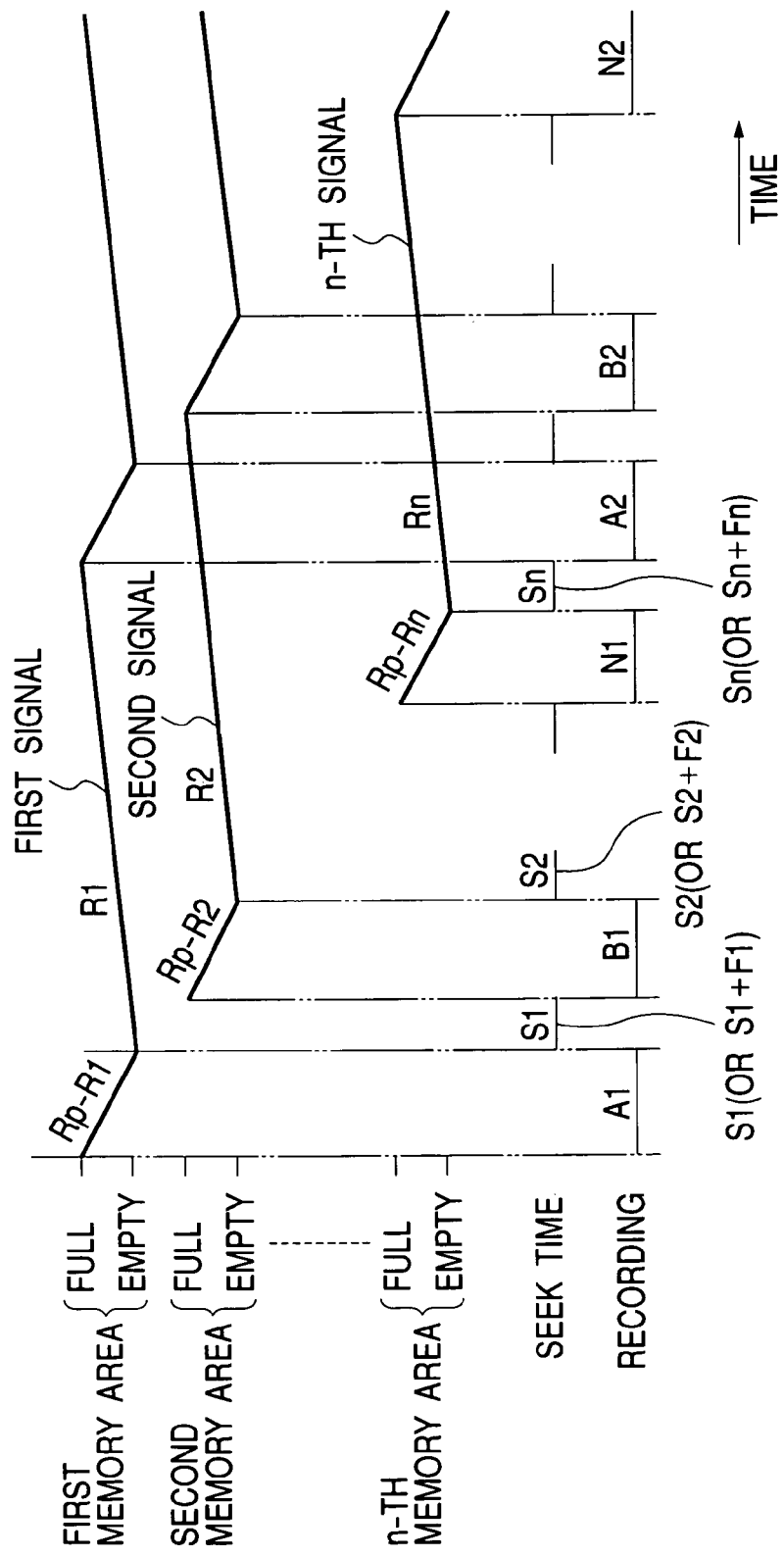
FIG. 30 is a time-domain diagram of the degrees of occupancy of the areas in the track buffer memory in FIG. 19 which occur in a multiple-signal recording mode of operation.

As shown in FIG. 30, after the degree of occupancy of the first area 119(1) in the track buffer memory 119 reaches the related full value, the first information signal is transmitted from the memory area 119(1) to the sub-area A1 in the optical disc 113 via the optical pickup 114 at the predetermined constant transfer rate Rp and the first information signal continues to be stored into the memory area 119(1) from the audio-video encoding and decoding unit 120 at the transfer rate R1. Thus, during this stage, the degree of occupancy of the memory area 119(1) decreases at a rate corresponding to "Rp−R1".

When the degree of occupancy of the memory area 119(1) reaches the related empty value, the transmission of the first information signal from the memory area 119(1) to the sub-area A1 in the optical disc 113 is suspended or terminated. Then, the optical pickup 114 is moved to a position corresponding to the sub-area B1 in the second area 113(2) of the optical disc 113 provided that the sub-area B1 is founded to be unoccupied. In the case where both the sub-areas A1 and B1 extend on one of the signal recording layers L0, L1, and L2 of the optical disc 113, the seek time (S1) related to this movement of the optical pickup 114 is exclusive of a focus-jump time and is hence equal to or shorter than, for example, about 0.5 second. In the case where the sub-areas A1 and B1 extend on different signal recording layers respectively, the seek time (S1+F1) related to this movement of the optical pickup 114 is inclusive of a focus-jump time and is hence equal to or shorter than, for example, about 0.7 second. The second information signal is stored into the second area 119(2) of the track buffer memory 119 from the audio-video encoding and decoding unit 120 at the transfer rate R2. Even after the degree of occupancy of the memory area 119(1) reaches the related empty value, the first information signal continues to be stored into the memory area 119(1) from the audio-video encoding and decoding unit 120 at the transfer rate R1. Thus, during this stage, the degree of occupancy of the memory area 119(1) increases at a rate corresponding to "R1". The degree of occupancy of the memory area 119(1) reaches the related full value before the optical pickup 114 accesses the sub-area A2 in the first area 113(1) of the optical disc 113.

After the degree of occupancy of the second area 119(2) in the track buffer memory 119 reaches the related full value, the second information signal is transmitted from the memory area 119(2) to the sub-area B1 in the optical disc 113 via the optical pickup 114 at the predetermined constant transfer rate Rp and the second information signal continues to be stored into the memory area 119(2) from the audio-video encoding and decoding unit 120 at the transfer rate R2. Thus, during this stage, the degree of occupancy of the memory area 119(2) decreases at a rate corresponding to "Rp−R2".

When the degree of occupancy of the memory area 119(2) reaches the related empty value, the transmission of the second information signal from the memory area 119(2) to the sub-area B1 in the optical disc 113 is suspended or terminated. Then, the optical pickup 114 is moved to a position corresponding to the first sub-area in the third area 113(3) of the optical disc 113 provided that the first sub-area in the third area 113(3) is found to be unoccupied. In the case where both the sub-area B1 and the first sub-area in the third area 113(3) extend on one of the signal recording layers L0, L1, and L2 of the optical disc 113, the seek time (S2) related to this movement of the optical pickup 114 is exclusive of a focus-jump time and is hence equal to or shorter than, for example, about 0.5 second. In the case where the sub-area B1 and the first sub-area in the third area 113(3) extend on different signal recording layers respectively, the seek time (S2+F2) related to this movement of the optical pickup 114 is inclusive of a focus-jump time and is hence equal to or shorter than, for example, about 0.7 second. The third information signal is stored into the third area 119(3) of the track buffer memory 119 from the audio-video encoding and decoding unit 120 at the transfer rate R3. Even after the degree of occupancy of the memory area 119(2) reaches the related empty value, the second information signal continues to be stored into the memory area 119(2) from the audio-video encoding and decoding unit 120 at the transfer rate R2. Thus, during this stage, the degree of occupancy of the memory area 119(2) increases at a rate corresponding to "R2". The degree of occupancy of the memory area 119(2) reaches the related full value before the optical pickup 114 accesses the sub-area B2 in the second area 113(2) of the optical disc 113.

The above-mentioned sequence of steps is iterated while the third and later information signals are stored into the third and later areas 119(3)-119(n) of the track buffer memory 119 from the audio-video encoding and decoding unit 120 at the transfer rates R3-Rn. In addition, the third and later information signals are transmitted from the third and later areas 119(3)-119(n) of the track buffer memory 119 to the optical pickup 114 at the predetermined constant transfer rate Rp and on a time sharing basis. The optical pickup 114 sequentially records the third and later information signals on the first sub-areas in the third and later areas 113(3)-113(n) of the optical disc 113. After the recording of the n-th information signal on the sub-area N1 in the n-th area 113(n) of the optical disc 113 is completed, the optical pickup 114 is moved to a position corresponding to the sub-area A2 in the first area 113(1) of the optical disc 113 provided that the sub-area A2 is found to be unoccupied. During a subsequent term, such processes are iterated. Thus, the "n" original signals inputted into the audio-video encoding and decoding unit 120 are continuously recorded while the optical pickup 114 sequentially accesses the sub-areas in the areas 113(1)-113(n) of the optical disc 113 in the order as "A1, B1, . . . , N1, A2, B2, . . . , N2, . . . ".

During the multiple-signal recording mode of operation of the apparatus 110, the previously-indicated parameters satisfy the equations and relations (31)-(48) or (31)-(48a). In the case where two successive areas among the areas 113(1)-113(n) in the optical disc 113 extend on different signal recording layers respectively, the information amounts Y1, Y2, . . . , and Yn to be recorded are decided according to the relations (41a), (44), (45), and (46). In the case where the areas 113(1)-113(n) in the optical disc 113 extend on one of the signal recording layers L0, L1, and L2, the relation (41) replaces the relation (41a) in the decision of the information amounts Y1, Y2, . . . , and Yn to be recorded. In this case, the information-signal-storing region of the track buffer memory 119 can be relatively small so that the remaining portion thereof can be effectively used for other purposes.

In the case where the areas 113(1)-113(n) in the optical disc 113 extend on one of the signal recording layers L0, L1, and L2, the information amounts Y1, Y2, . . . , and Yn to be recorded may be decided according to the relations (41a), (44), (45), and (46). In this case, the decided information amounts Y1, Y2, . . . , and Yn remain unchanged regardless of whether or not the areas 113(1)-113(n) in the optical disc 113 extend on one of the signal recording layers L0, L1, and L2. Thus, in this case, it is possible to simplify the recording control and reduce the size of the recording control program.

After the recording of the "n" information signals on the optical disc 113 has been completed, the management information in the management area 113x of the optical disc 113 is updated in accordance with the conditions of the recording of the "n" information signals. Generally, the updating of the management information includes the recording of information about the transfer rates R1-Rn on the management area 113x. Preferably, the management area 113x is designed so that all signals recorded on the signal recording layers L0, L1, and L2 of the optical disc 113 can be managed together according to the management information therein. In this case, the management of the recorded signals is relatively easy.

Signal Recording/Playback Mode

A signal recording/playback mode of operation of the apparatus 110 is executed in the case where the optical disc 113 is of the rewritable type. During the signal recording/playback mode of operation, the optical pickup 114 reproduces at least one information signal from first one of the areas 113(1)-113(n) in the optical disc 113 and records at least one information signal on second one of the areas 113(1)-113(n) on a time sharing basis. The reproduced information signal is transmitted from the optical pickup 114 to the track buffer memory 119. The reproduced information signal is written into corresponding one of the areas 119(1)-119(n) in the track buffer memory 119 at the predetermined constant transfer rate Rp. The reproduced information signal is transmitted from the track buffer memory 119 to the audio-video encoding and decoding unit 120 at corresponding one of the transfer rates R1-Rn. On the other hand, at least one information signal to be recorded is transmitted to the track buffer memory 119 from the audio-video encoding and decoding unit 120. The recorded information signal is written into corresponding one of the areas 119(1)-119(n) in the track buffer memory 119 at corresponding one of the transfer rates R1-Rn. The recorded information signal is transmitted from the track buffer memory 119 to the optical pickup 114 at the predetermined constant transfer rate Rp. The optical pickup 114 records the transmitted information signal on corresponding one of the areas 113(1)-113(n) in the optical disc 113.

During the signal recording/playback mode of operation of the apparatus 110, each seek time related to the optical pickup 114 is equal to or shorter than about 0.7 second. Specifically, in the case where the areas 113(1)-113(n) in the optical disc 113 extend on one of the signal recording layers L0, L1, and L2, the seek time is exclusive of a focus-jump time and is hence equal to or shorter than, for example, about 0.5 second. In the case where two successive areas among the areas 113(1)-113(n) in the optical disc 113 extend on different signal recording layers respectively, the seek time is inclusive of a focus-jump time and is hence equal to or shorter than, for example, about 0.7 second.

During the signal recording/playback mode of operation of the apparatus 110, the previously-indicated parameters satisfy the equations and relations (31)-(48) or (31)-(48a). In the case where two successive areas among the areas 113(1)-113(n) in the optical disc 113 extend on different signal recording layers respectively, the read-out or recorded information amounts Y1, Y2, . . . , and Yn are decided according to the relations (41a), (44), (45), and (46). In the case where the areas 113(1)-113(n) in the optical disc 113 extend on one of the signal recording layers L0, L1, and L2, the relation (41) replaces the relation (41a) in the decision of the information amounts Y1, Y2, . . . , and Yn. In this case, the information-signal-storing region of the track buffer memory 119 can be relatively small so that the remaining portion thereof can be effectively used for other purposes.

In the case where the areas 113(1)-113(n) in the optical disc 113 extend on one of the signal recording layers L0, L1, and L2, the information amounts Y1, Y2, . . . , and Yn may be decided according to the relations (41a), (44), (45), and (46). In this case, the decided information amounts Y1, Y2, . . . , and Yn remain unchanged regardless of whether or not the areas 113(1)-113(n) in the optical disc 113 extend on one of the signal recording layers L0, L1, and L2. Thus, in this case, it is possible to simplify the recording control and reduce the size of the recording control program.

After the recording of at least one information signal on the optical disc 113 has been completed, the management information in the management area 113x of the optical disc 113 is updated in accordance with the conditions of the recording of the information signal. Generally, the updating of the management information includes loading the management area 113x with information about at least one of the transfer rates R1-Rn which relates to the recorded information signal. Preferably, the management area 113x is designed so that all signals recorded on the signal recording layers L0, L1, and L2 of the optical disc 113 can be managed together according to the management information therein. In this case, the management of the recorded signals is relatively easy.

It should be noted that the "n" information signals to be recorded or reproduced may be ranked according to priority. In the case where a seek error occurs or transfer rates R1-Rn are changed so that the relations (31)-(48) or (31)-(48a) become unsatisfied, low-priority information signals may be discarded or disregarded to maintain continuous recording or continuous playback of the contents of high-priority information signals.

It should be noted that the apparatus 110 in FIG. 19 may be divided into an optical-disc drive, a solid-state memory unit, and another unit. The solid-state memory unit is detachably connected with the optical-disc drive. Specifically, the solid-state memory unit is connected with the optical-disc drive via a disconnectable connector. The optical-disc drive includes the spindle motor 111, the turntable 112, the optical pickup 114, the driver 115, the amplifier unit 116, and the servo unit 117. The solid-state memory unit includes the signal processor 118, the track buffer memory 119, and the system controller 122. When the solid-state memory unit is disconnected from the optical-disc drive, at least one of "n" information signals in the track buffer memory 119 can be played back via the signal processor 118 and the audio-video encoding and decoding unit 120.

Generally, the "n" information signals contain video data. The "n" information signals may contain audio data, music data, still-picture data, or sub-picture data.

It should be noted that the optical disc 113 may be replaced by a magnetic disc or a plurality of magnetic discs. In this case, an optical-disc drive portion of the apparatus 110 in FIG. 19 is replaced by a magnetic-disc drive portion.

An example of the magnetic-disc drive portion includes a plurality of magnetic heads for accessing magnetic discs each having a spiral track. The magnetic heads and the magnetic discs are periodically changed and selected to record and reproduce information signals on and from the magnetic discs. Each magnetic disc may have a set of concentric tracks.

Fourth Embodiment

Figure 31:
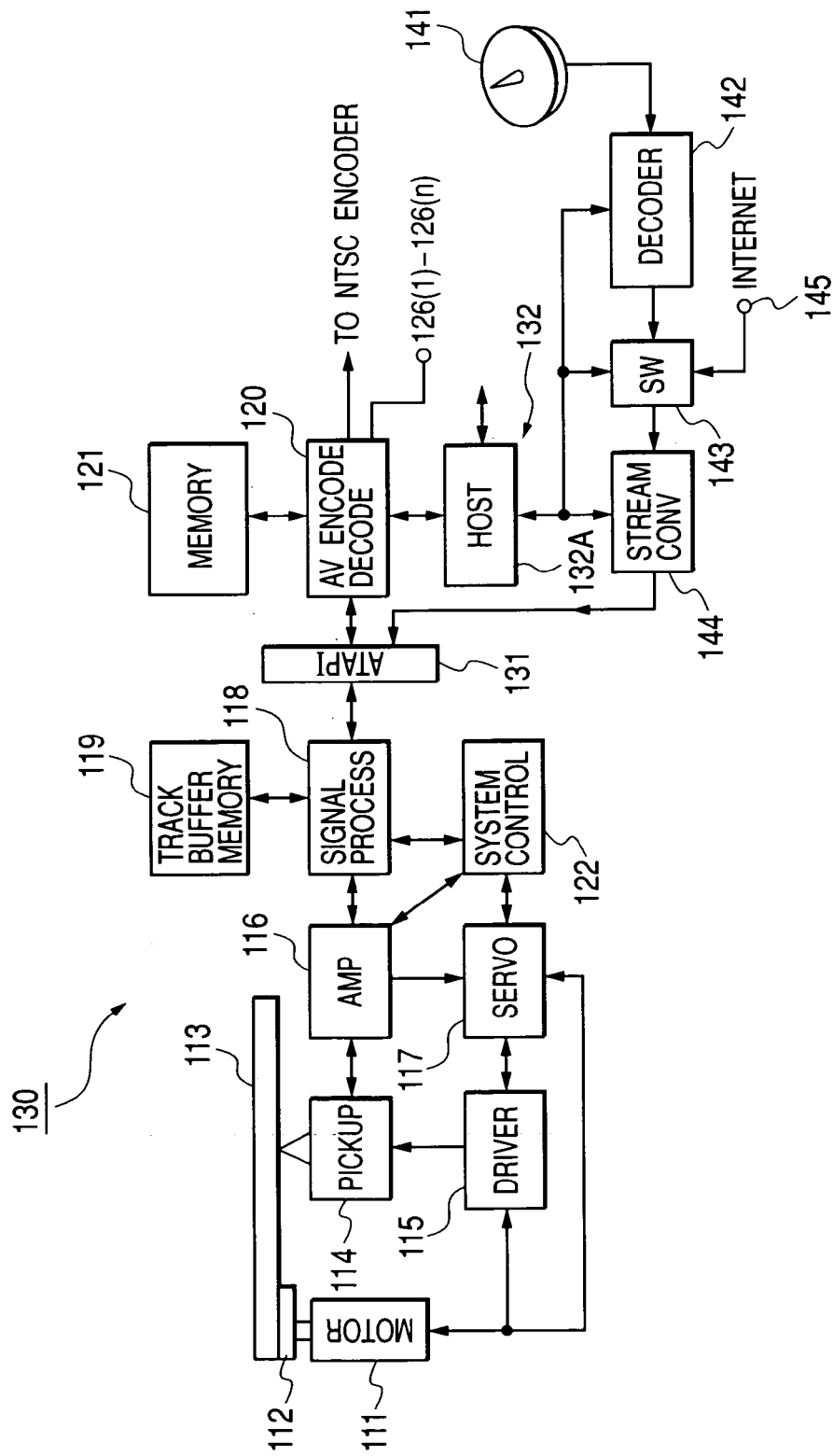
FIG. 31 is a block diagram of an information-signal communication system according to a fourth embodiment of this invention.

FIG. 31 shows an information-signal communication system according to a fourth embodiment of this invention. The system in FIG. 31 includes an information-signal recording and reproducing apparatus 130. The apparatus 130 in FIG. 31 is similar to the apparatus 110 in FIG. 19 except for design changes indicated hereafter.

The apparatus 130 is designed as an optical-disc drive. The apparatus 130 includes a spindle motor 111, a turntable 112, an optical pickup (an optical head) 114, a driver 115, an amplifier unit 116, a servo unit 117, a signal processor 118, a track buffer memory 119, and a system controller 122. The devices 111, 112, 114, 115, 116, 117, 118, 119, and 122 are connected in a manner similar to that in the apparatus 110 of FIG. 19. The apparatus 130 further includes an ATAPI interface 131 connected to the signal processor 118.

A host computer or an external apparatus 132 can be connected with the apparatus 130 via the ATAPI interface 131. The apparatus 132 includes an audio-vide encoding and decoding unit 120, a buffer memory 121, and a host computer unit 132A. The buffer memory 121 and the host computer unit 132A are connected to the audio-video encoding and decoding unit 120. The audio-video encoding and decoding unit 120 can be connected with the signal processor 118 in the apparatus 130 via the ATAPI interface 131.

A satellite digital broadcasting reception antenna 141 is connected to a satellite digital broadcasting decoder 142. The satellite digital broadcasting decoder 142 is connected to a switch 143. The switch 143 is connected to a stream converter 144. The switch 143 is connected to the Internet via a terminal 145. The stream converter 144 can be connected with the signal processor 118 in the apparatus 130 via the ATAPI interface 131. The satellite digital broadcasting decoder 142, the switch 143, the stream converter 144, and the host computer unit 132A are connected to each other.

In more detail, the ATAPI interface 131 includes an interface block. The audio-video encoding and decoding unit 120 includes an interface block which can be connected with the interface block in the ATAPI interface 131. The stream converter 144 includes an interface block which can be connected with the interface block in the ATAPI interface 131. The apparatus 132 can control the apparatus (the optical-disc drive) 130 while using control signals in the Mt. Fuji command system. The host computer unit 132A can control the switch 143. The host computer unit 132A in the apparatus 132 includes a ROM loaded with a computer program for controlling the apparatus 130. This computer program may be transferred to a RAM within the host computer unit 132A from a CD-ROM or a DVD-ROM via a suitable disc drive. The computer program may be downloaded into the RAM within the host computer unit 132A from the Internet or a satellite communication network.

In the case where "n" information signals are requested to be recorded on an optical disc 113, the host computer unit 132A in the apparatus 132 transmits information of transfer rates R1-Rn for the "n" information signals (transfer-rate representing flags) to the apparatus 130 via the audio-video encoding and decoding unit 120 and the ATAPI interface 131. The audio-video encoding and decoding unit 120 in the apparatus 132 transmits the "n" information signals to the signal processor 118 in the apparatus 130 via the ATAPI interface 131. In addition, the host computer unit 132A in the apparatus 132 transmits a recording start command signal and a recording start address signal to the apparatus 130 via the audio-video encoding and decoding unit 120 and the ATAPI interface 131. The apparatus (the optical-disc drive) 130 responds to the flags and the signals from the apparatus 132, and starts recording the "n" information signals on the optical disc 113.

In the case where "n" information signals are requested to be reproduced from an optical disc 113, the host computer unit 132A in the apparatus 132 transmits a playback start command signal to the apparatus 130 via the audio-video encoding and decoding unit 120 and the ATAPI interface 131. The apparatus 130 reproduces a signal (for example, management information, control data, or a video signal) from a predetermined-address portion of the optical disc 113 in response to the playback start command signal. The host computer unit 132A in the apparatus 132 receives the reproduced signal from the apparatus 130 via the ATAPI interface 131 and the audio-video encoding and decoding unit 120, and calculates transfer rates R1-Rn on the basis of the reproduced signal. The host computer unit 132A in the apparatus 132 transmits information of the calculated transfer rates R1-Rn (transfer-rate representing flags) to the apparatus 130 via the audio-video encoding and decoding unit 120 and the ATAPI interface 131. Then, the apparatus (the optical-disc drive) 130 reproduces the "n" information signals from the optical disc 113 while using the transfer rates R1-Rn.

It should be noted that the ATAPI interface 131 may be replaced by an IEEE1394 interface, a wireless interface, a radio-signal interface, or a light-signal interface.

It should be noted that the apparatus 130 in FIG. 31 may be divided into an optical-disc drive, a solid-state memory unit, and another unit. The solid-state memory unit is detachably connected with the optical-disc drive and the ATAPI interface 131. Specifically, the solid-state memory unit is connected with the optical-disc drive and the ATAPI interface 131 via disconnectable connectors. The optical-disc drive includes the spindle motor 111, the turntable 112, the optical pickup 114, the driver 115, the amplifier unit 116, and the servo unit 117. The solid-state memory unit includes the signal processor 118, the track buffer memory 119, and the system controller 122. When the solid-state memory unit is disconnected from the optical-disc drive, at least one of "n" information signals in the track buffer memory 119 can be played back via the signal processor 118 and the audio-video encoding and decoding unit 120.

Fifth Embodiment

A fifth embodiment of this invention is similar to the third embodiment or the fourth embodiment thereof except for design changes mentioned later.

During a recording mode of operation, the system controller 122 periodically checks whether or not the relation (41a) is satisfied. When the system controller 122 finds that the relation (41a) is not satisfied, the system controller 122 selects one of first, second, third, and fourth recording procedures and implements the selected recording procedure.

According to the first recording procedure, when the relation (41a) is not satisfied, two or more information signals are selected from "n" information signals. Non-selected information signals are discarded or disregarded. With respect to the selected information signals, a decision is made as to whether or not the relation (41a) is satisfied. In the case where the relation (41a) is satisfied, the selected information signals are stored into corresponding ones of the areas 119(1)-119(n) in the track buffer memory 119 respectively. The selected information signals are transferred from the track buffer memory 119 to the optical pickup 114 on a time sharing basis. The optical pickup 114 records the selected information signals on corresponding ones of the areas 113(1)-113(n) in the optical disc 113 respectively. When being recorded, the selected information signals may be weighted in response to the differences among the transfer rates for the selected information signals, the channel position, or the genres of the contents of the selected information signals on an automatic basis or a user's setting basis. The non-selected information signals are inhibited from being stored into the track buffer memory 119.

Figure 32:
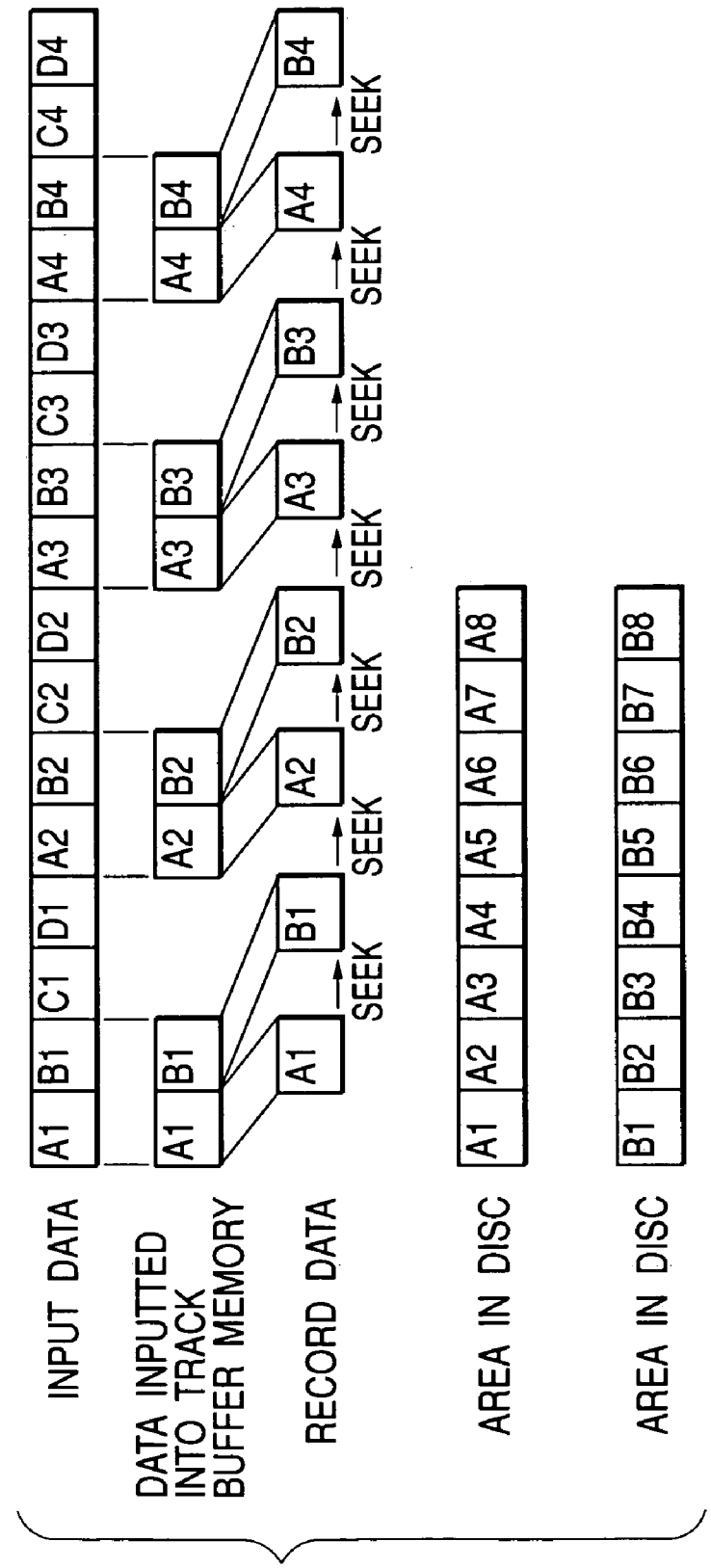
FIG. 32 is a time-domain diagram of conditions of information signals which occur during a first recording procedure in a fifth embodiment of this invention.

With reference to FIG. 32, four information signals "A", "B", "C", and "D" compose input data. The information signal "A" is divided into blocks A1, A2, . . . . The information signal "B" is divided into blocks B1, B2, . . . . The information signal "C" is divided into blocks C1, C2, . . . . The information signal "D" is divided into blocks D1, D2, . . . . The blocks of the four information signals are multiplexed into the input data in the order as "A1, B1, C1, D1, A2, B2, . . . ".

According to the first recording procedure, when the relation (41a) is not satisfied, two information signals "A" and "B" are selected from the four information signals. Regarding the selected information signals "A" and "B", a decision is made as to whether or not the relation (41a) is satisfied. In the case where the relation (41a) is satisfied, the selected information signals "A" and "B" are stored into corresponding ones of the areas 119(1)-119(n) in the track buffer memory 119 respectively. The non-selected information signals "C" and "D" are inhibited from being stored into the track buffer memory 119. The selected information signals "A" and "B" are alternately transferred from the track buffer memory 119 to the optical pickup 114 on a time sharing basis. The optical pickup 114 records the selected information signals "A" and "B" on corresponding ones of the areas 113(1)-113(n) in the optical disc 113 respectively. Specifically, the optical pickup 114 records the block A1 of the information signal "A" on first one of the optical-disc areas 113(1)-113(n). Then, the optical pickup 114 executes seek and moves from first one to second one of the optical-disc areas 113(1)-113(n). The optical pickup 114 records the block B1 of the information signal "B" on second one of the optical-disc areas 113(1)-113(n). Then, the optical pickup 114 executes seek and moves from second one to first one of the optical-disc areas 113(1)-113(n). The optical pickup 114 records the block A2 of the information signal "A" on first one of the optical-disc areas 113(1)-113(n). Such steps are iterated. Accordingly, the blocks A1, A2, . . . of the information signal "A" are sequentially stored into first one of the optical-disc areas 113(1)-113(n). The blocks B1, B2, . . . of the information signal "B" are sequentially stored into second one of the optical-disc areas 113(1)-113(n).

According to the second recording procedure, when the relation (41a) is not satisfied, two or more information signals are selected from "n" information signals. The selected information signals are referred to as the first selected information signals. Non-selected information signals are discarded or disregarded. Two of the first selected information signals are combined into one selected information signal. This selected information signal and the remaining first selected information signal or signals are referred to as the second selected information signals. With respect to the second selected information signals, a decision is made as to whether or not the relation (41a) is satisfied. In the case where the relation (41a) is satisfied, the first selected information signals are stored into corresponding ones of the areas 119(1)-119(n) in the track buffer memory 119 respectively. The first selected information signals are transferred from the track buffer memory 119 to the optical pickup 114 on a time sharing basis while two of the first selected information signals are combined into one selected information signal. Thus, the optical pickup 114 receives the second selected information signals from the track buffer memory 119. The optical pickup 114 records the second selected information signals on ones of the areas 113(1)-113(n) in the optical disc 113 respectively.

Figure 33:
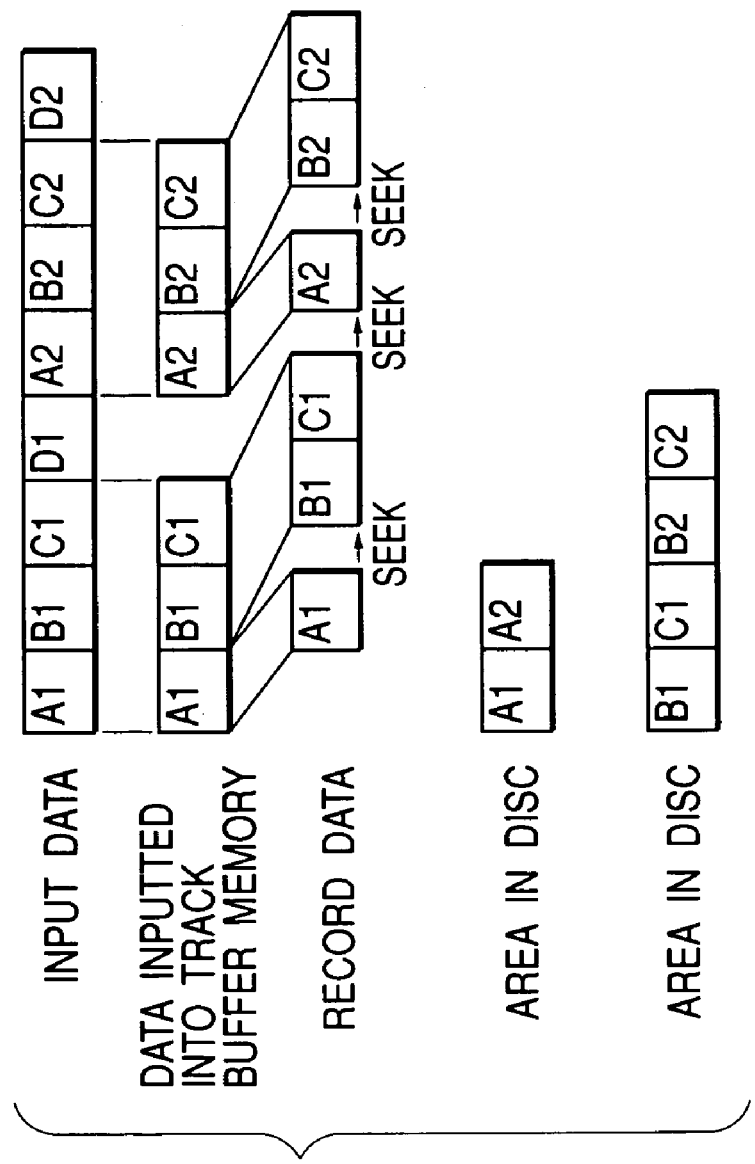
FIG. 33 is a time-domain diagram of conditions of information signals which occur during a second recording procedure in the fifth embodiment of this invention.

With reference to FIG. 33, four information signals "A", "B", "C", and "D" compose input data. The information signal "A" is divided into blocks A1, A2, . . . . The information signal "B" is divided into blocks B1, B2, . . . . The information signal "C" is divided into blocks C1, C2, . . . . The information signal "D" is divided into blocks D1, D2, . . . . The blocks of the four information signals are multiplexed into the input data in the order as "A1, B1, C1, D1, A2, B2, . . . ".

According to the second recording procedure, when the relation (41a) is not satisfied, three information signals "A", "B", and "C" are selected from the four information signals. The selected information signals "B" and "C" are combined into and handled as one selected information signal "B+C". Regarding the selected information signals "A" and "B+C", a decision is made as to whether or not the relation (41a) is satisfied. In the case where the relation (41a) is satisfied, the selected information signals "A", "B", and "C" (the selected information signals "A" and "B+C") are stored into corresponding ones of the areas 119(1)-119(n) in the track buffer memory 119 respectively. The non-selected information signal "D" is inhibited from being stored into the track buffer memory 119. The selected information signals "A" and "B+C" are alternately transferred from the track buffer memory 119 to the optical pickup 114 on a time sharing basis. The optical pickup 114 records the selected information signals "A" and "B+C" on ones of the areas 113(1)-113(n) in the optical disc 113. Specifically, the optical pickup 114 records the block A1 of the information signal "A" on first one of the optical-disc areas 113(1)-113(n). Then, the optical pickup 114 executes seek and moves from first one to second one of the optical-disc areas 113(1)-113(n). The optical pickup 114 records the blocks B1 and C1 of the information signals "B" and "C" on second one of the optical-disc areas 113(1)-113(n). Then, the optical pickup 114 executes seek and moves from second one to first one of the optical-disc areas 113(1)-113(n). The optical pickup 114 records the block A2 of the information signal "A" on first one of the optical-disc areas 113(1)-113(n). Such steps are iterated. Accordingly, the blocks A1, A2, . . . of the information signal "A" are sequentially stored into first one of the optical-disc areas 113(1)-113(n). The blocks B1, C1, B2, C2, . . . of the information signals "B" and "C" are sequentially stored into second one of the optical-disc areas 113(1)-113(n). This design results in a reduction of the total seek time related to the optical pickup 114.

According to the third recording procedure, when the relation (41a) is not satisfied, "n" information signals are stored into corresponding ones of the areas 119(1)-119(n) in the track buffer memory 119 respectively. The "n" information signals are transferred from the track buffer memory 119 to the optical pickup 114 on a time sharing basis. The optical pickup 114 records the "n" information signals on one common area (for example, one of the areas 113(1)-113(n)) in the optical disc 113. Since the optical pickup 114 does not move among the areas 113(1)-113(n) in the optical disc 113, the total seek time related to the optical pickup 114 can be reduced.

Figure 34:
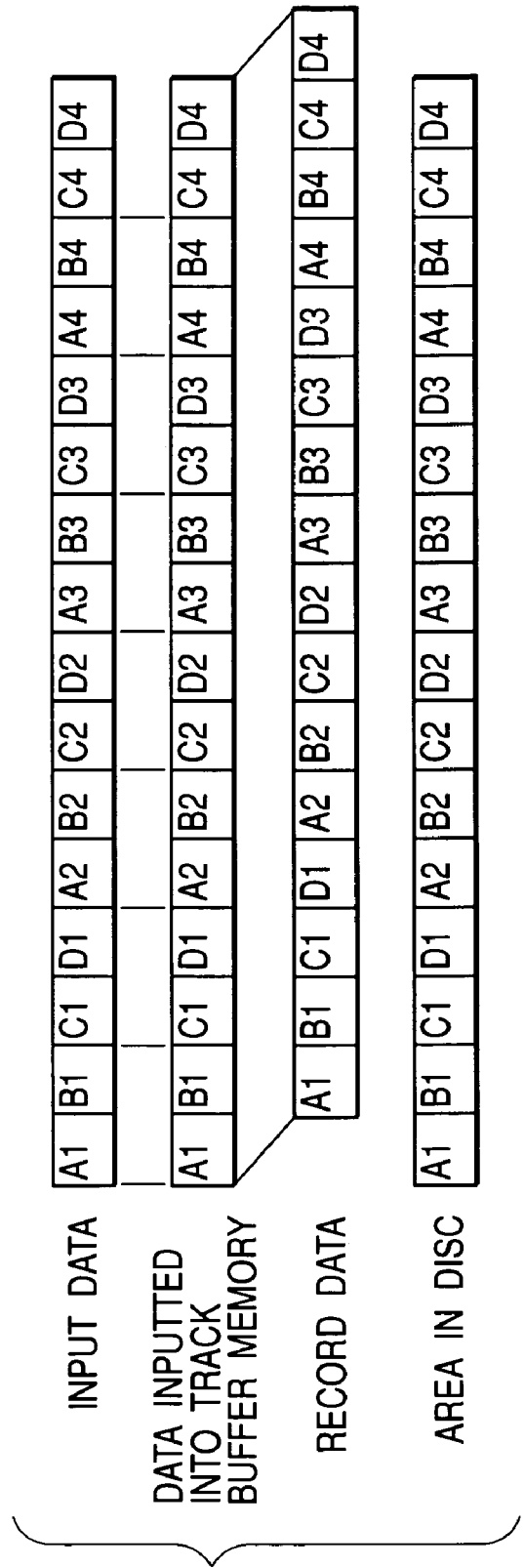
FIG. 34 is a time-domain diagram of conditions of information signals which occur during a third recording procedure in the fifth embodiment of this invention.

With reference to FIG. 34, four information signals "A", "B", "C", and "D" compose input data. The information signal "A" is divided into blocks A1, A2, . . . . The information signal "B" is divided into blocks B1, B2, . . . . The information signal "C" is divided into blocks C1, C2, . . . . The information signal "D" is divided into blocks D1, D2, . . . . The blocks of the four information signals are multiplexed into the input data in the order as "A1, B1, C1, D1, A2, B2, ...".

According to the third recording procedure, when the relation (41a) is not satisfied, the information signals "A", "B", "C", and "D" are stored into corresponding ones of the areas 119(1)-119(n) in the track buffer memory 119 respectively. The information signals "A", "B", "C", and "D" are transferred from the track buffer memory 119 to the optical pickup 114 on a time sharing basis. The optical pickup 114 records the information signals "A", "B", "C", and "D" on one common area (for example, one of the areas 113(1)-113(n)) in the optical disc 113. Specifically, the optical pickup 114 sequentially records the blocks of the information signals "A", "B", "C", and "D" on the common optical-disc area in the order as "A1, B1, C1, D1, A2, B2, ...".

According to the fourth recording procedure, when the relation (41a) is not satisfied, "n" information signals are stored into corresponding ones of the areas 119(1)-19(n) in the track buffer memory 119 respectively. Each of the memory areas 119(1)-19(n) can store two or more blocks of the related information signal. Plural block cycles of the "n" information signals are held in the track buffer memory 119. The "n" information signals are transferred from the track buffer memory 119 to the optical pickup 114 on a time sharing basis. The order in which the blocks of the "n" information signals are read out from the track buffer memory 119 differs from that occurring in the writing into the track buffer memory 119. In other words, the blocks of the "n" information signals are rearranged by the track buffer memory 119. The optical pickup 114 records the "n" information signals on one common area (for example, one of the areas 113(1)-113(n)) in the optical disc 113. Since the optical pickup 114 does not move among the areas 113(1)-113(n) in the optical disc 113, the total seek time related to the optical pickup 114 can be reduced.

Figure 35:
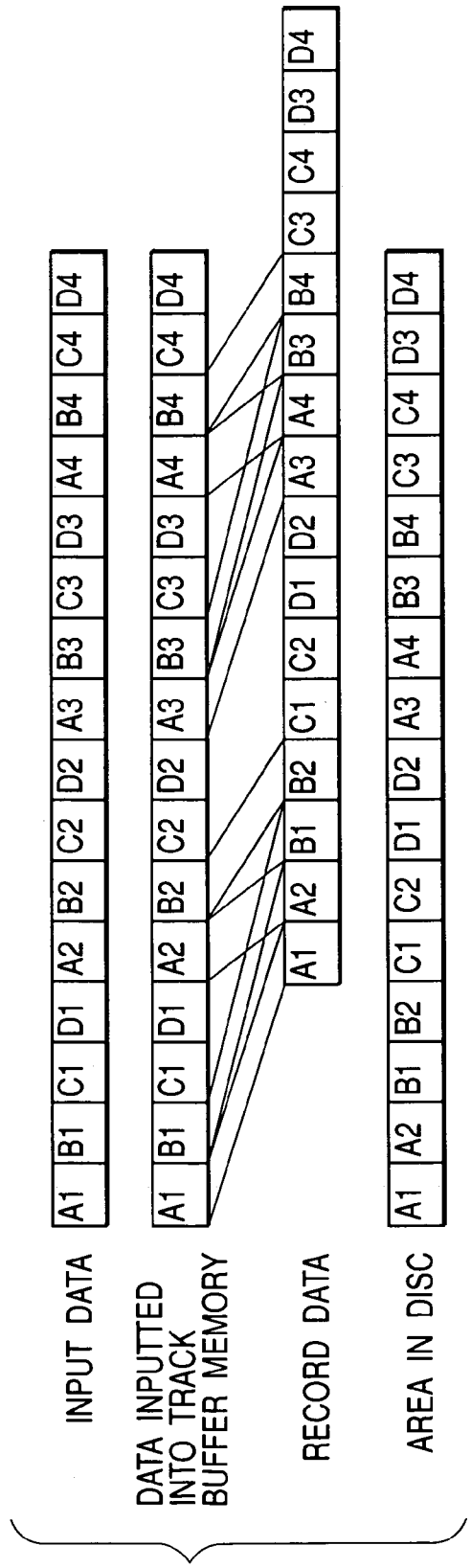
FIG. 35 is a time-domain diagram of conditions of information signals which occur during a fourth recording procedure in the fifth embodiment of this invention.

With reference to FIG. 35, four information signals "A", "B", "C", and "D" compose input data. The information signal "A" is divided into blocks A1, A2, .... The information signal "B" is divided into blocks B1, B2, .... The information signal "C" is divided into blocks C1, C2, .... The information signal "D" is divided into blocks D1, D2, .... The blocks of the four information signals are multiplexed into the input data in the order as "A1, B1, C1, D1, A2, B2, ...".

According to the fourth recording procedure, when the relation (41a) is not satisfied, the information signals "A", "B", "C", and "D" are stored into corresponding ones of the areas 119(1)-119(n) in the track buffer memory 119 respectively. The blocks of the information signals "A", "B", "C", and "D" are sequentially written into the track buffer memory 119 in the order as "A1, B1, C1, D1, A2, B2, ...". Plural block cycles of the information signals "A", "B", "C", and "D" are held in the track buffer memory 119. The information signals "A", "B", "C", and "D" are transferred from the track buffer memory 119 to the optical pickup 114 on a time sharing basis. The track buffer memory 119 rearranges the information signals "A", "B", "C", and "D". Specifically, the blocks of the information signals "A", "B", "C", and "D" are sequentially read out from the track buffer memory 119 in the order as "A1, A2, B1, B2, C1, C2, D1, D2, A3, A4, ...". The optical pickup 114 records the information signals "A", "B", "C", and "D" on one common area (for example, one of the areas 113(1)-113(n)) in the optical disc 113. Specifically, the optical pickup 114 sequentially records the blocks of the information signals "A", "B", "C", and "D" on the common optical-disc area in the order as "A1, A2, B1, B2, C1, C2, D1, D2, A3, A4, ...".

One recording procedure is selected from the first, second, third, and fourth recording procedures in response to the result of calculation concerning the relation (41a) or in response to user's request. Conditions of the selection include the following conditions ①, ②, ③, ④, ⑤, and ⑥.

① Regarding the "n" information signals, a decision is made as to whether or not the relation (41a) is satisfied. When it is decided that the relation (41a) is not satisfied, at least two of the "n" information signals are selected. Regarding the selected information signals, a decision is made as to whether or not the relation (41a) is satisfied. When it is decided that the relation (41a) is satisfied, the first or second recording procedure is selected. On the other hand, when it is decided that the relation (41a) is not satisfied, the third or fourth recording procedure is selected.

② At an initial stage, the user selects one from the first, second, third, and fourth recording procedures by operating the key input unit 123. For example, in the case where the first recording procedure is initially selected, a decision is made as to whether or not the relation (41a) is satisfied. When it is decided that the relation (41a) is satisfied, the system controller 122 controls the display 125 via the audio-video encoding and decoding unit 120 and the NTSC encoder 124 to indicate that the first, second, third, and fourth recording procedures are selectable. Then, the user finally selects one from the first, second, third, and fourth recording procedures by operating the key input unit 123. On the other hand, when it is decided that the relation (41a) is not satisfied, the system controller 122 controls the display 125 via the audio-video encoding and decoding unit 120 and the NTSC encoder 124 to indicate that the third and fourth recording procedures are selectable. Then, the user finally selects one from the third and fourth recording procedures by operating the key input unit 123.

③ One recording procedure is automatically selected from the first, second, third, and fourth recording procedures in response to the types of the "n" information signals or the types of the signal sources. When the "n" information signals are fed from the audio-video encoding and decoding unit 120, the first or second recording procedures is selected. When the "n" information signals are "n" compression-resultant information signals composing a transport stream signal and transmitted from the satellite or the Internet, the third or fourth recording procedure is selected. The signal recording may be responsive to the differences among the transfer rates for the information signals, the channel position, or the genres of the contents of the information signals on a user's setting basis.

④ When the apparatus is driven by an AC power supply, the first or second recording procedure is selected. When the apparatus is driven by a battery, the third or fourth recording procedure is selected. The track buffer memory 119 may be replaceable. When the capacity of the track buffer memory 119 exceeds a reference value, the first or second recording procedure is selected. When the capacity of the track buffer memory 119 does not exceed the reference value, the third or fourth recording procedure is selected.

⑤ The system controller 122 detects the type of the optical disc 113. When the optical disc 113 is a DVD-RAM, the first or second recording procedure is selected. When the optical disc 113 is a DVD-RW, the third or fourth recording procedure is selected.

⑥ The management information is reproduced from the management area 113x in the optical disc 113. The system controller 122 decides the conditions of unoccupied regions in the optical disc 113 on the basis of the reproduced management information. In the presence of unoccupied regions greater in size than a reference value, the first or second recording procedure is selected. In the absence of such great unoccupied regions, the third or fourth recording procedure is selected.

ADVANTAGES PROVIDED BY THE INVENTION

As previously mentioned, an information-signal recording medium (an optical disc) 13 includes two signal recording layers L0 and L1. The recording medium 13 has first areas 13a and second areas 13b extending on the signal recording layers L0 and L1. A first information signal "A" is recorded on or reproduced from the first areas 13a of the recording medium 13. A second information signal "B" is recorded on or reproduced from the second areas 13b of the recording medium 13. A track buffer memory 19 temporarily stores the first and second information signals "A" and "B". A head (a pickup) 14 can move radially with respect to the recording medium 13. The first and second information signals "A" and "B" are transferred between the recording medium 13 and the track buffer memory 19 via the head 14 on a time sharing basis and at a predetermined constant transfer rate Rp. The first and second information signals "A" and "B" are transferred between the track buffer memory 19 and an external device at transfer rates Ra and Rb, respectively. There are parameters, the values of which are chosen to absorb the differences of the predetermined constant transfer rate Rp from the transfer rates Ra and Rb. The parameters include the transfer rates Rp, Ra, and Rb, the size Ya of record blocks of the first information signal "A", the size Yb of record blocks of the second information signal "B", the seek time Tab taken by the head 14 to move from a first area 13a to a second area 13b on one signal recording layer of the recording medium 13, the seek time Tba taken by the head 14 to move from a second area 13b to a first area 13a on one signal recording layer of the recording medium 13, the seek time Fab taken by the head 14 to move its focus from one signal recording layer having a first area 13a to the other signal recording layer having a second area 13b, and the seek time Fba taken by the head 14 to move its focus from one signal recording layer having a second area 13b to the other signal recording layer having a first rear 13a. The values of the parameters are set so as to satisfy a relation as follows.

$$(Ya+Yb) \geq Rp \cdot (Ra+Rb) \cdot (Tab+Tba+Fab+Fba)/(Rp-Ra-Rb)$$

The setting of the parameters enables the maximum transfer performance of the recording medium 13 to be actually used. The track buffer memory 19 can be efficiently divided into areas 19a and 19b assigned to the first and second information signals "A" and "B" respectively. Furthermore, it is possible to smoothly implement the continuous and simultaneous playback of the contents of the first and second information signals "A" and "B", the continuous and simultaneous recording of the contents of the original information signals for the first and second information signals "A" and "B", and the continuous playback of the contents of the first information signal "A" and simultaneously the continuous recording of the contents of the original signal for the second information signal "B".

The track buffer memory 19 is divided into the areas 19a and 19b assigned to the first and second information signals "A" and "B". The sizes of the areas 19a and 19b depend on the transfer rates Ra and Rb related to the first and second information signals "A" and "B". The sizes of the areas 19a and 19b may depend on an apparatus operation mode selected from different modes including a recording mode and a playback mode. The efficiency of use of the track buffer memory 19 can be relatively high.

As previously mentioned, an information-signal recording medium (an optical disc) 113 has first, second, . . . , and n-th areas 113(1), 113(2), . . . , and 113(n) on or from which first, second, . . . , and n-th information signals are recorded or reproduced respectively, where "n" denotes a natural number equal to or greater than 2. The recording medium 113 includes a plurality of signal recording layers. The first, second, . . . , and n-th information signals related to respective transfer rates R1, R2, . . . , and Rn are transmitted between a track buffer memory 119 and an audio-video encoding and decoding unit 120. The track buffer memory 119 temporarily stores the first, second, . . . , and n-th information signals. A head (a pickup) 114 can move radially with respect to the recording medium 113. The first, second, . . . , and n-th information signals are transferred between the recording medium 113 and the track buffer memory 119 via the head 114 on a time sharing basis and at a predetermined constant transfer rate Rp higher than the transfer rates R1, R2, . . . , and Rn. The summation of the transfer rates R1, R2, . . . , and Rn is denoted by $\Sigma Rn$. The seek time taken by the head 114 to move from the first area 113(1) to the second area 113(2) in the recording medium 113 is composed of an intra-layer seek time S1 and an inter-layer seek time F1. The inter-layer seek time F1 is absent when the first and second areas 113(1) and 113(2) extend on a common signal recording layer of the recording medium 113, and is present when the first and second areas 113(1) and 113(2) extend on different signal recording layers respectively. The intra-layer seek time S1 means a time interval taken by the head 114 to move from the first area 113(1) to a position corresponding to the second area 113(2) as viewed on one signal recording layer. The inter-layer seek time F1 means a time interval taken by the head 114 to move its focus from a signal recording layer having the first area 113(1) to a signal recording layer having the second area 113(2). Similarly, the seek time taken by the head 114 to move from the second area 113(2) to the third area 113(3) in the recording medium 113 is composed of an intra-layer seek time S2 and an inter-layer seek time F2. Also, each of the seek times related to head movements among the third and later areas in the recording medium 113 is composed of an intra-layer seek time Sk and an inter-layer seek time Fk, where k=3, 4 . . . . Furthermore, the seek time taken by the head 114 to move from the n-th area 113(n) to the first area 113(1) in the recording medium 113 is composed of an intra-layer seek time Sn and an inter-layer seek time Fm, where "m" denotes a natural number equal or smaller than the number "n". The summation of the intra-layer seek times S1, S2, . . . , and Sn is denoted by $\Sigma Sn$. The summation of the inter-layer seek times F1, F2, . . . , and Fm is denoted by $\Sigma Fm$. The values of the above-indicated parameters are set so as to satisfy a relation as follows.

$$\Sigma Yn \geq Rp \cdot \Sigma Rn \cdot (\Sigma Sn + \Sigma Fn)/(Rp - \Sigma Rn)$$

The setting of the parameters enables the maximum transfer performance of the recording medium 113 to be actually used. The track buffer memory 119 can be efficiently divided into areas assigned to the first, second, . . . , and n-th information signals respectively. Furthermore, it is possible to smoothly implement the continuous and simultaneous playback of the contents of the first, second, . . . , and n-th information signals, the continuous and simultaneous recording of the contents of the original information signals for the first, second, . . . , and n-th information signals, and the continuous playback of the contents of at least first one of the first, second, . . . , and n-th information signals and simultaneously the continuous recording of the contents of at least one original signal for second one of the first, second, . . . , and n-th information signals.

What is claimed is:

1. A method of reproducing information from a recording medium having first and second places on which first and second information signals are recorded respectively, the recording medium including at least first and second signal recording layers accessible from one side, the method comprising the steps of:
   rotating the recording medium;
   enabling a head to reproduce the first and second information signals from the first and second places in the recording medium on a time sharing basis to get first and second reproduced signals respectively;
   temporarily storing the first and second reproduced signals in a buffer memory;
   outputting the first and second reproduced signals from the buffer memory at first and second transfer rates respectively;
   transmitting the first and second reproduced signals from the head to the buffer memory on a time sharing basis and at a third transfer rate higher than the first and second transfer rates; and
   deciding at least one of (1) an information amount of the first reproduced signal continuously transmitted from the head to the buffer memory and (2) an information amount of the second reproduced signal continuously transmitted from the head to the buffer memory on the basis of a given relation among parameters including (a) a time interval taken by the head to move from the first place to the second place as viewed on one of the first and second signal recording layers, (b) a time interval taken by the head to move from the second place to the first place as viewed on one of the first and second signal recording layers, (c) a time interval taken by the head to move its focus from the first signal recording layer to the second signal recording layer, (d) a time interval taken by the head to move its focus from the second signal recording layer to the first signal recording layer, (e) the first transfer rate, (f) the second transfer rate, and (g) the third transfer rate.

2. A method of recording information on a recording medium including at least first and second signal recording layers accessible from one side, the method comprising the steps of:
   rotating the recording medium;
   storing first and second information signals into a buffer memory at first and second transfer rates respectively;
   reading out the first and second information signals from the buffer memory on a time sharing basis to get first and second read-out signals respectively;
   enabling a head to record the first and second read-out signals on first and second places in the recording medium respectively on a time sharing basis and at a third transfer rate higher than the first and second transfer rates; and
   deciding at least one of (1) an information amount of the first read-out signal continuously transmitted from the buffer memory to the head and (2) an information amount of the second read-out signal continuously transmitted from the buffer memory to the head on the basis of a given relation among parameters including (a) a time interval taken by the head to move from the first place to the second place as viewed on one of the first and second signal recording layers, (b) a time interval taken by the head to move from the second place to the first place as viewed on one of the first and second signal recording layers, (c) a time interval taken by the head to move its focus from the first signal recording layer to the second signal recording layer, (d) a time interval taken by the head to move its focus from the second signal recording layer to the first signal recording layer, (e) the first transfer rate, (f) the second transfer rate, and (g) the third transfer rate.

3. A method of recording and reproducing information on and from a recording medium having a first place on which a first information signal is recorded, the recording medium including at least first and second signal recording layers accessible from one side, the method comprising the steps of:
   rotating the recording medium;
   enabling a head to reproduce the first information signal from the first place in the recording medium to get a reproduced signal;
   temporarily storing the reproduced signal in a buffer memory;
   outputting the reproduced signal from the buffer memory at a first transfer rate;
   storing a second information signal into the buffer memory at a second transfer rate;
   transmitting the reproduced signal from the head to the buffer memory at a third transfer rate higher than the first and second transfer rates;
   reading out the second information signal from the buffer memory to get a read-out signal;
   enabling the head to record the read-out signal on a second place in the recording medium which differs from the first place at the third transfer rate and on a time sharing basis with respect to the reproduction of the first information signal from the first place; and
   deciding at least one of (1) an information amount of the reproduced signal continuously transmitted from the head to the buffer memory and (2) an information amount of the read-out signal continuously transmitted from the buffer memory to the head on the basis of a given relation among parameters including (a) a time interval taken by the head to move from the first place to the second place as viewed on one of the first and second signal recording layers, (b) a time interval taken by the head to move from the second place to the first place as viewed on one of the first and second signal recording layers, (c) a time interval taken by the head to move its focus from the first signal recording layer to the second signal recording layer, (d) a time interval taken by the head to move its focus from the second signal recording layer to the first signal recording layer, (e) the first transfer rate, (f) the second transfer rate, and (g) the third transfer rate.

* * * * *